US007772790B2

(12) United States Patent
Nashiki

(10) Patent No.: US 7,772,790 B2
(45) Date of Patent: Aug. 10, 2010

(54) SYSTEM AND METHOD FOR CONTROLLING MOTOR USING PARAMETER ASSOCIATED WITH MAGNETIC FLUX

(75) Inventor: Masayuki Nashiki, Komaki (JP)

(73) Assignee: Denso Corporation, Kariya (JP)

(*) Notice: Subject to any disclaimer, the term of this patent is extended or adjusted under 35 U.S.C. 154(b) by 344 days.

(21) Appl. No.: 11/987,365

(22) Filed: Nov. 29, 2007

(65) Prior Publication Data

US 2008/0129243 A1  Jun. 5, 2008

(30) Foreign Application Priority Data

Nov. 30, 2006  (JP) ............... 2006-324077

(51) Int. Cl.
*H02P 21/00* (2006.01)
(52) U.S. Cl. ............... 318/400.02; 318/400.12
(58) Field of Classification Search ......... 318/727, 318/400.01, 400.02, 400.12, 701
See application file for complete search history.

(56) References Cited

U.S. PATENT DOCUMENTS

| 6,344,725 | B2 * | 2/2002 | Kaitani et al. ............... 318/700 |
| 6,954,050 | B2 | 10/2005 | Tobari et al. |
| 7,145,310 | B2 * | 12/2006 | Ihm et al. ............... 318/717 |
| 2002/0097015 | A1 * | 7/2002 | Kitajima et al. ............ 318/432 |
| 2004/0195993 | A1 * | 10/2004 | Yoshimoto et al. .......... 318/802 |

FOREIGN PATENT DOCUMENTS

JP  A 2004-289959  10/2004

OTHER PUBLICATIONS

Kushima, Y. "Elemental Technologies and Recent Advances in Reluctance Torque Assisted Motors," IEEJ Technical Report, No. 1020, pp. 31-36 (2005).
Ichikawa, S. et al. "Sensorless Control of Synchronous Reluctance Motors based on an Extended Electromotive Force Model and Inductance Measurement in the Model," IEEJ Trans. 1A, vol. 125, No. 1, pp. 16-25 (2005).
Nashiki, M. et al. "Improvements of Power Factor and Torque of a Synchronous Reluctance Motor with a Slit Rotor," IEEJ Trans. 1A, vol. 126, No. 2, pp. 116-123 (2006).
Nashiki, M. et al. "Inductance Calculation and New Modeling of a Synchronous Reluctance Motor Using Flux Linkages," IEEJ Trans. 1A, vol. 127, No. 2, pp. 158-166 (2007).

* cited by examiner

*Primary Examiner*—Rina I Duda
(74) *Attorney, Agent, or Firm*—Oliff & Berridge, PLC

(57) ABSTRACT

A control method for a motor that rotates based on flux linkages to a winding member of the motor when the winding member is energized by a drive current is provided. The method includes storing magnetic-state information indicative of a relationship between each of a plurality of predetermined operating points of the drive current and a magnetic-state parameter associated with the flux linkages. The method includes obtaining at least one of command information associated with an operating state of the motor and detection information associated with the operating state of the motor. The method includes referencing the magnetic-state information with the use of the obtained at least one of the command information and detection information to obtain a value of the magnetic-state parameter based on a result of the reference. The method includes controlling an output of the motor based on the obtained value of the magnetic-state parameter.

36 Claims, 28 Drawing Sheets

FIG. 7
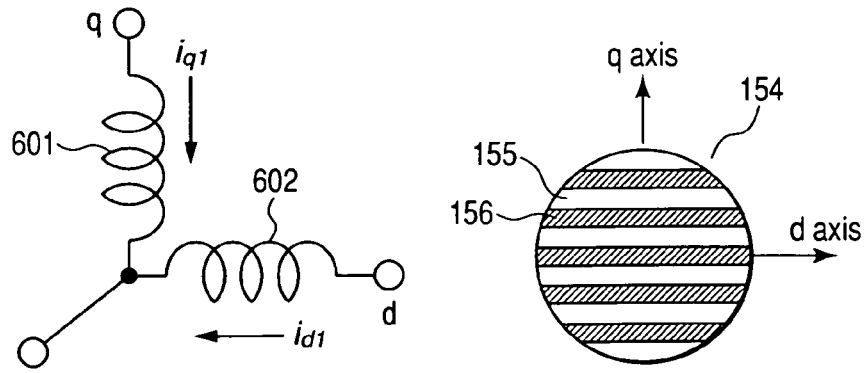
FIG. 8
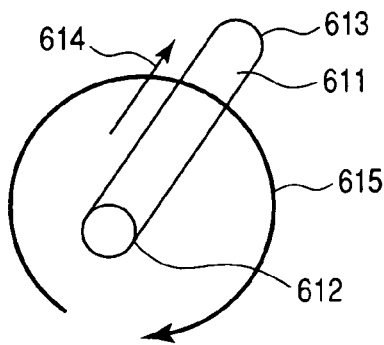
FIG. 9
| $i_q$ \ $i_d$ | $i_{d1}$ | $i_{d2}$ | $\cdots i_{dm} \cdots$ | $i_{dA}$ |
|---|---|---|---|---|
| $i_{q1}$ | $L_{d11}, L_{q11}$ | $L_{d21}, L_{q21}$ | $\cdots L_{dm1}, L_{qm1} \cdots$ | $L_{dA1}, L_{qA1}$ |
| $i_{q2}$ | $L_{d12}, L_{q12}$ | $L_{d22}, L_{q22}$ | $\cdots L_{dm2}, L_{qm2} \cdots$ | $L_{dA2}, L_{qA2}$ |
| $\vdots$ | $\vdots$ | $\vdots$ | $\vdots$ | $\vdots$ |
| $i_{qn}$ | $L_{d1n}, L_{q1n}$ | $L_{d2n}, L_{q2n}$ | $\cdots L_{dmn}, L_{qmn} \cdots$ | $L_{dAn}, L_{qAn}$ |
| $\vdots$ | $\vdots$ | $\vdots$ | | $\vdots$ |
| $i_{qB}$ | $L_{d1B}, L_{q1B}$ | $L_{d2B}, L_{q2B}$ | $L_{dmB}, L_{qmB}$ | $L_{dAB}, L_{qAB}$ |
T2

| $i_q$ \ $i_d$ | $i_{d1}$ | $i_{d2}$ | .... $i_{dm}$ .... | $i_{dA}$ |
|---|---|---|---|---|
| $i_{q1}$ | $\psi_{d11}, \psi_{q11}$ | $\psi_{d21}, \psi_{q21}$ | ... $\psi_{dm1}, \psi_{qm1}$ ... | $\psi_{dA1}, \psi_{qA1}$ |
| $i_{q2}$ | $\psi_{d12}, \psi_{q12}$ | $\psi_{d22}, \psi_{q22}$ | ... $\psi_{dm2}, \psi_{qm2}$ ... | $\psi_{dA2}, \psi_{qA2}$ |
| ⋮ | ⋮ | ⋮ | ⋮ | ⋮ |
| $i_{qn}$ | $\psi_{d1n}, \psi_{q1n}$ | $\psi_{d2n}, \psi_{q2n}$ | ... $\psi_{dmn}, \psi_{qmn}$ ... | $\psi_{dAn}, \psi_{qAn}$ |
| ⋮ | ⋮ | ⋮ | ⋮ | ⋮ |
| $i_{qB}$ | $\psi_{d1B}, \psi_{q1B}$ | $\psi_{d2B}, \psi_{q2B}$ | ... $\psi_{dmB}, \psi_{qmB}$ ... | $\psi_{dAB}, \psi_{qAB}$ |

| T \ ω | ω₁ | ω₂ | .... ωₘ .... | ωₐ |
|---|---|---|---|---|
| $T_1$ | $i_{d11}, i_{q11}$ | $i_{d21}, i_{q21}$ | ... $i_{dm1}, i_{qm1}$ ... | $i_{dA1}, i_{qA1}$ |
| $T_2$ | $i_{d12}, i_{q12}$ | $i_{d22}, i_{q22}$ | ... $i_{dm2}, i_{qm2}$ ... | $i_{dA2}, i_{qA2}$ |
| ⋮ | ⋮ | ⋮ | ⋮ | ⋮ |
| $T_n$ | $i_{d1n}, i_{q1n}$ | $i_{d2n}, i_{q2n}$ | ... $i_{dmn}, i_{qmn}$ ... | $i_{dAn}, i_{qAn}$ |
| ⋮ | ⋮ | ⋮ | ⋮ | ⋮ |
| $T_B$ | $i_{d1B}, i_{q1B}$ | $i_{d2B}, i_{q2B}$ | $i_{dmB}, i_{qmB}$ | $i_{dAB}, i_{qAB}$ |

FIG. 41
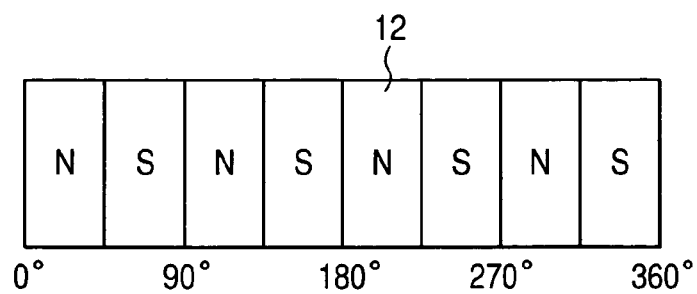
FIG. 42A    FIG. 42B    FIG. 42C
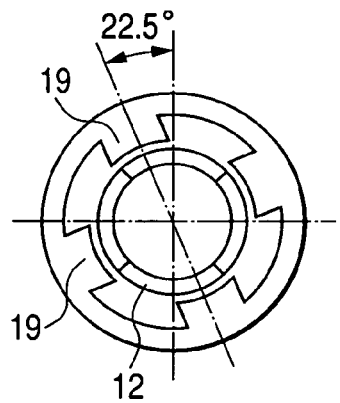 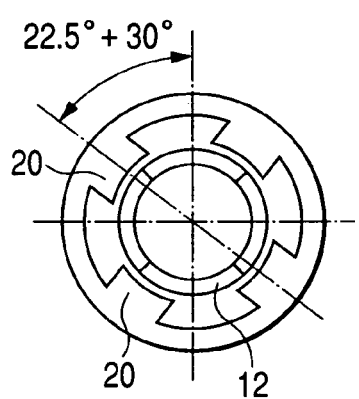 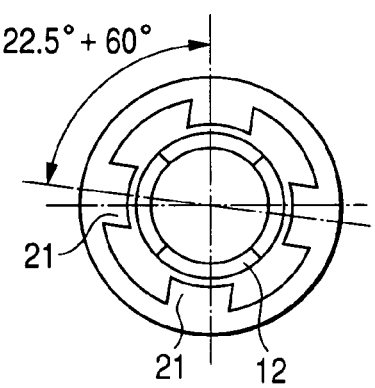
FIG. 43
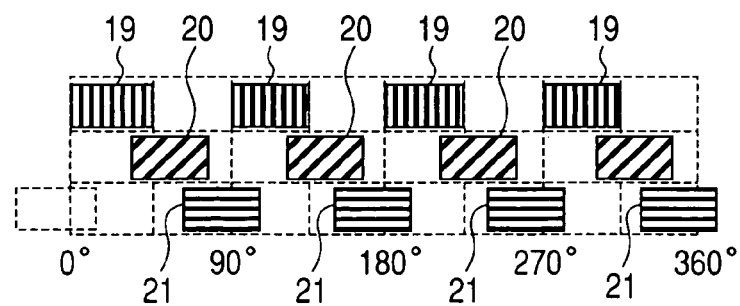

SYSTEM AND METHOD FOR CONTROLLING MOTOR USING PARAMETER ASSOCIATED WITH MAGNETIC FLUX

CROSS REFERENCE TO RELATED APPLICATIONS

This application is based on Japanese Patent Application No. 2006-324077 filed on Nov. 30, 2006. This application claims the benefit of priority from the Japanese Patent Applications, so that the descriptions of which are all incorporated herein by reference.

FIELD OF THE INVENTION

The present invention relates to systems and methods for controlling various types of motors.

BACKGROUND OF THE INVENTION

Motors whose each phase coil is wound around stator poles in full pitch and distributed winding have been widely known. FIG. 34 is a partially axial cross section schematically illustrating an example of the structure of such a conventional motor.

In FIG. 34, the conventional motor is provided with a substantially annular shaped stator core 4, a motor housing 6 in which the stator core 4 is installed, and a pair of coil end portions 5 of stator windings installed in the stator core 4. The motor is also provided with a substantially annular shaped rotor core 2 rotatably disposed inside the stator core 4 with a gap therebetween, and a rotor shaft 1 fixed to the inner periphery of the rotor core 2 and rotatably supported by the motor housing 6 with a pair of bearings 3.

FIG. 37 is a cross sectional view taken on line AA-AA in FIG. 34. In these FIGS. 34 and 37, a four-pole, 24-slot synchronous reluctance motor is illustrated. A full pitch and distributed winding is used as each of the three-phase stator winding. Each of U-, V-, and W-phase coils is distributedly wound around corresponding stator poles at 180-degree pitches in electric angle. In FIG. 37, reference character 35J represents a back yoke of the stator, and reference character 35H represents teeth of the stator.

In one area of 360 degrees electric angle of the stator between the first slot ① and the twelfth slot ⑫, reference characters 351 and 352 represent a +U-phase winding, and reference characters 357 and 358 represent a −U-phase winding. The +U-phase winding and −U-phase winding are installed in the corresponding slots ①, ②, ⑦, and ⑧ of the stator to form a first U-phase coil. In the specification, these signs "+" and "−" represents a reversed phase therebetween.

Similarly, referenced characters 355 and 356 represent a +V-phase winding, and reference characters 35B and 35C represent a −V-phase winding. The +V-phase winding and −V-phase winding are installed in the corresponding slots ⑤, ⑥, ⑪, and ⑫ of the stator to form a first V-phase coil.

In addition, referenced characters 359 and 35A represent a +W-phase winding, and reference characters 353 and 354 represent a −W-phase winding. The +W-phase winding and −W-phase winding are installed in the corresponding slots ⑨, ⑩, ③, and ④ of the stator to form a first W-phase coil.

As well as the one area of 360 degrees electric angle of the stator, in the other area of 360 degrees electric angle of the stator between the thirteenth slot and the twenty-fourth slot, a second U-phase coil, a second V-phase coil, and a second W-phase coil are formed.

Each of the rotor core 2 and the stator core 4 is composed of a plurality of magnetic steed sheets laminated in an axial direction of the rotor shaft 1.

The rotor core 2 has a salient structure. Specifically, the rotor core 2 is formed with first to fourth groups of chordal flux barriers 35F punched out in slit by press working. The first to fourth groups of the flux barriers 35F are symmetrically arranged with respect to the axial direction of the rotor shaft 1 such that:

each of the first to fourth groups of the flux barriers 35F is circumferentially spaced apart from another adjacent group thereof;

the flux barriers of each of the first to fourth groups are aligned in a corresponding radial direction of the rotor core 2 at intervals therebetween; and both ends of each of the flux barriers of each of the first to fourth groups extend toward the outer periphery of the rotor core 2 with predetermined thin edges thereof left between the both ends and the outer periphery.

The first to fourth groups of the flux barriers 35F provide thin magnetic paths 35E therebetween. The thin edges of the rotor core 2 are continued to each other, this supports the thin magnetic paths 35E.

A direct axis (d-axis) and a quadrature axis (q-axis) are normally defined in the rotor as a rotating coordinate system (rotor coordinate system); these d-q axes are rotated as the rotor is rotated. The d-axis has a high magnetic permeability, and the q-axis has a low magnetic permeability because of the flux barriers 35F.

The configuration of the motor illustrated in FIG. 37 creates a reluctance torque based on the difference between the magnetic impedance in the d-axis and that in the q-axis, thus rotating the rotor (rotor core 2 and the rotor shaft 1).

FIG. 39 is a block diagram schematically illustrating an example of the circuit structure of a control system for relatively precisely controlling such a motor.

The control system illustrated in FIG. 39 includes an encoder (E) 592, an interface (E-IF) 593, a current sensor (not shown), and a converter 59H.

The encoder 592 detects information indicative of a rotational position θr and a rotational speed (angular velocity) ω of a motor (rotor) 591. The interface (E-IF) 593 for the encoder 592 converts the detected information to the rotational position θr and rotational speed ω of the motor 591 and passing them to the converter 59H.

The current sensor detects instantaneous U- and W-phase winding currents $i_u$ and $i_w$ respectively flowing through the U-phase winding and W-phase winding of the stator of the motor 591.

The converter 59H converts a stationary coordinate system (u-v-w coordinate system) into the d-q coordinate system. Specifically, the converter 59H receives the instantaneous U- and W-phase winding currents $i_u$ and $i_w$ passed from the current sensor and the rotational position θr of the rotor passed from the interface 593 and converts the instantaneous U- and W-phase winding currents $i_u$ and $i_w$ into instantaneous d- and q-axis current components $i_d$ and $i_q$ on respective d- and q-axis of the d-q coordinate system based on the rotational position θr of the rotor.

The control system includes a speed difference detector 594, a speed controller 595, and a command current determiner 596.

The speed difference detector 594 receives a command indicative of a target speed ω* of the motor 591 and externally input thereto, and subtracts the detected rotational speed ω from the target speed ω* to detect a speed difference therebetween.

The speed controller 595 receives the speed difference detected by the speed error detector 594, and executes a compensating operation by calculating a proportional term and an integral term based on the calculated speed difference so as to obtain a torque demand T*. The command current determiner 596 determines a d-axis command current $i_d$* and q-axis command current $i_q$* based on the torque demand T* and the detected rotational speed ω.

The control system includes a feedforward voltage determiner 597 and a current-control loop gain determiner 59B.

The voltage signal generator 597 receives the determined d-axis command current $i_d$*, q-axis command current $i_q$*, and the detected rotational speed ω, and determines a d-axis feedforward voltage command FFd and q-axis feedforward voltage command FFq based on the received d-axis command current $i_d$* q-axis command current $i_q$*, and the detected rotational speed ω.

The current-control loop gain determiner 59B has stored therein a loop gain $G_d$ for a d-axis current control loop and a loop gain $G_q$ for a q-axis current control loop; these loop gains $G_d$ and loop gain $G_q$ have determined by default.

The control system includes a d-axis current difference detector 598, a d-axis current controller 599, and a d-axis voltage controller 59A.

The d-axis current difference detector 598 subtracts the d-axis current component $i_d$ from the d-axis command current $i_q$* to calculate a d-axis current difference therebetween.

The d-axis current controller 599 receives the d-axis current difference calculated by the d-axis current difference detector 598. The d-axis current controller 599 executes a compensating operation by calculating a proportional term and an integral term based on the received d-axis current difference so as to obtain a d-axis current control voltage command proportional to the current-loop gain $G_d$. The obtained d-axis current control voltage command is passed to the d-axis voltage controller 59A.

Similarly, the control system includes a q-axis current difference detector 59C, a q-axis current controller 59D, and a q-axis voltage controller 59E.

The q-axis current difference detector 59C subtracts the q-axis current component $i_q$ from the q-axis command current $i_q$* to calculate a q-axis current difference therebetween.

The q-axis current controller 59D receives the q-axis current difference calculated by the q-axis current difference detector 59C. The q-axis current controller 59D executes a compensating operation by calculating a proportional term and an integral term based on the received q-axis current difference so as to obtain a q-axis current control voltage command proportional to the current-loop gain $G_q$. The obtained q-axis current control voltage command is passed to the q-axis voltage controller 59E.

The control system includes a converter 59F and a three-phase inverter 59G.

The d-axis voltage controller 59A serves as an adder. Specifically, the d-axis voltage controller 59A calculates the sum of the d-axis current control voltage command passed from the d-axis current controller 599 and the d-axis feedforward voltage command FFd. In addition, the d-axis voltage controller 59A passes, as a d-axis command voltage $v_d$*, the calculated sum of the d-axis current control voltage command and the d-axis feedforward voltage command FFd to the converter 59F.

Similarly, the q-axis voltage controller 59E serves as an adder. Specifically, the q-axis voltage controller 59E calculates the sum of the q-axis current control voltage command passed from the q-axis current controller 59D and the q-axis feedforward voltage command FFq. In addition, the q-axis voltage controller 59E passes, as a q-axis command voltage $v_q$*, the calculated sum of the q-axis current control voltage command and the q-axis feedforward voltage command FFq to the converter 59F.

The converter 59F converts the d-axis command voltage $v_d$* and q-axis command voltage $v_q$* on the respective d and q awes into U-, V-, and W-phase voltage commands $v_u$*, $v_v$*, and $v_w$* in the stationary coordinate system, and outputs the converted U-, V-, and W-phase voltage commands $v_u$*, $v_v$*, and $v_w$* to the three-phase inverter 59G.

FIG. 38 is a circuit diagram schematically illustrating an example of the structure of the three-phase inverter 59G.

The three-phase inverter 59G is composed of a direct current (DC) battery N95, a first pair of series-connected power semiconductor elements N96 and N9A, a second pair of series-connected power semiconductor elements N97 and N9B, and a third pair of series-connected power semiconductor elements N98 and N9C. As the power semiconductor elements, power transistors, such as IGBTs (Insulated Gate Bipolar Transistors) or MOSFETs can be preferably used, respectively.

For example, the first pair (N96 and N9A), second pair (N97 and N9B), and third pair (N98 and N9C) of power semiconductor elements are parallely connected to each other in bridge configuration.

A connecting point through which the power semiconductor elements of each pair are connected to each other in series is connected to an output lead extending from the other end of a corresponding one of the U-, V-, and W-phase winding of the motor 591.

One end of the series-connected power semiconductor elements of each pair is connected to a positive terminal of the DC battery N95, and the other end thereof is connected to a negative terminal thereof.

Each of the power transistor elements N96, N97, N98, N9A, N9B, and N9C is individually driven ON and OFF based on a corresponding PWM (Pulse Width Modulation) drive signal input thereto. This allows a higher DC voltage of the DC battery N95 to be chopped so that U-, V-, and W-phase voltages corresponding to the U-, V-, and W-phase voltage commands $v_u$*, $v_v$*, and $v_w$* are supplied to the U-, V-, and W-phase windings N92, N93, and N94 of the motor 591, respectively (see FIG. 38).

The duty cycles of the PWM drive signals to be supplied to the respective power transistor elements N96, N97, N98, N9A, N9B, and N9C are individually controlled. This can control the U-, V-, and W-phase voltages to be supplied to the U-, V-, and W-phase windings N92, N93, and N94 of the motor 591 to thereby control the rotational speed and the output of the motor 591.

Note that the functional blocks illustrated in FIG. 39 except for the motor 591, the three-phase inverter 59G, the encoder 592, and the interface 593 can be implemented by tasks to be executable by a microprocessor (microcomputer) in accordance with a program.

Such a control system, for example, illustrated in FIG. 39, is disclosed in U.S. Pat. No. 6,954,050 corresponding to Japanese Patent Application Publication No. 2004-289959. As described above, a microprocessor-based control system designed to execute the motor output control based on the rotating coordinate system (d-q coordinate system) has been normally used as motor control systems.

Control for various types of motors including such a synchronous reluctance motor and an interior permanent magnet motor is normally executed by such a control system illustrated in FIG. 39.

However, characteristic curves of a motor with respect to armature current are not represented as ideally linear curves. This may result various problems associated with the motor output.

Such various problems associated with the nonlinear motor characteristic curves will be described hereinafter.

As described above, the rotor core and the stator core of a motor are normally comprised of a plurality of soft magnetic steel sheets laminated in their thickness directions. The rotor core is formed with a plurality of permanent magnets installed therein as needed. One of causes that make the motor control difficult is a nonlinear magnetic property of the soft magnetic steel sheets.

As is generally known, a magnetic steel sheet has a nonlinear magnetic property; this nonlinear magnetic property represents that a magnetic steel sheet has a magnetic saturation property. In order to reduce a motor in size and in manufacturing cost, an armature current range in which a nonlinear characteristic curve of the motor is saturated due to the magnetic saturation property of the magnetic steel sheets is used to control the motor output.

Specifically, such control of the motor output is executed based on control parameters, such as a d-axis inductance $L_d$ and a q-axis inductance $L_q$, required to execute the motor output control on the supposition that the control parameters are each constant despite of the nonlinear characteristic curves of the motor. This may cause the motor output to be inaccurately controlled when the armature current lies within a nonlinear region of a characteristic curve of the motor; there is the possibility that control errors occur in the motor-output control routines.

For example, in the block diagram of FIG. 39, when the armature current lies within a nonlinear region of a magnetic property curve of the motor, the control system cannot address:

the control sensitivity of the d-axis current controller 599 is changed depending on the magnitude of the armature current;

the control sensitivity of the q-axis current controller 59D is changed depending on the magnitude of the armature current; and the d- and q-axis feedforward voltage commands FFd and FFq each represent an inaccurate value.

In addition, the control system also cannot meet that the d-axis command current $i_d^*$ and q-axis command current $i_q^*$ determined by the command current determiner 596 each represent an inaccurate value due to the nonlinearity of the magnetic property of the output torque of the motor.

When the armature current lies within a specific linear portion of a characteristic curve of the motor, such as a motor speed curve or motor output torque curve thereof, therefore, the motor output can be properly controlled. However, when the armature current lies within a nonlinear region of the characteristic curve of the motor, the motor output can be improperly controlled.

Specifically, it may be difficult for the control system to properly control, in the whole region of the motor speed curve or of the motor-output torque curve, the three-phase voltages outputted from the inverter 59G and supplied to the three-phase windings of the motor.

In order to address the problems set forth above, the conventional control system illustrated in FIG. 39 is designed to compensate the three-phase voltages based on the fed-back actual rotational speed of the motor, the fed-back instantaneous d-axis current $i_d$, and the fed-back q-axis current $i_q$ by eliminating:

the difference between the fed-back actual rotational speed of the motor and the target speed;

the difference between the fed-back d-axis current component $i_d$ and the d-axis command current $i_d^*$; and the difference between the fed-back q-axis current component $i_q$ and the q-axis command current $i_q^*$.

However, when high-speed responsibility is required for the motor control and/or a motor is controlled to be rapidly rotated, the range of the three-phase voltages output from the inverter 59G that can be compensated by the feedback control set forth above is limited. This may not meet the need of the high-speed responsibility of the motor and also may not meet the rapid rotation of the motor.

When permanent magnets are additionally installed in a rotor core of a motor, a magnetic flux created by each of the permanent magnets depends on magnetomotive force based on the armature current and applied to the rotor core. This may cause the motor control to become complicated.

In recent years, in order to reduce such a motor control system in manufacturing cost and improve the reliability thereof, various types of sensorless (encoder-less) motor control have been widely used. In the various types of sensorless motor control, however, because no encoder (rotational position sensor) is provided therein, it may be difficult to properly grasp the rotational position of the rotor.

SUMMARY OF THE INVENTION

In view of the foregoing circumstances, an object of at least one aspect of the present invention is to solve at least some of the problems described beforehand.

A specific object of at least another one aspect of the present invention is to implement accurate control of a motor even if an armature current range to be used for the motor control lies within a nonlinear characteristic curve of the motor.

Another specific object of at least a further aspect of the present invention is to provide sensor-less motor control systems, which are capable of reliably grasping a rotational position of a rotor of a motor even if they have no rotational position sensors (encoders).

According to one aspect of the present invention, there is provided a control method for a motor that rotates based on flux linkages to a winding member of the motor when the winding member is energized by a drive current is provided. The method includes storing magnetic-state information indicative of a relationship between each of a plurality of predetermined operating points of the drive current and a magnetic-state parameter associated with the flux linkages. The method includes obtaining at least one of command information associated with an operating state of the motor and detection information associated with the operating state of the motor. The method includes referencing the magnetic-state information with the use of the obtained at least one of the command information and detection information to obtain a value of the magnetic-state parameter based on a result of the reference. The method includes controlling an output of the motor based on the obtained value of the magnetic-state parameter.

According to another aspect of the present invention, there is provided a control system for a motor that rotates based on flux linkages to a winding member of the motor when the winding member is energized by a drive current. The control system includes a storing unit that stores magnetic-state information indicative of a relationship between each of a plurality of predetermined operating points of the drive current and a magnetic-state parameter associated with the flux linkages. The control system includes an obtaining unit to obtain at least one of command information associated with an operating state of the motor and detection information associated with the operating state of the motor. The control system includes a reference unit to reference the magnetic-state information stored in the storage unit with the use of the obtained at least one of the command information and detection information to obtain a value of the magnetic-state parameter based on a result of the reference. The control system includes a controller to control an output of the motor based on the obtained value of the magnetic-state parameter.

In a preferred embodiment of the one and another aspects, the magnetic-state parameter is a plurality of values of the number of the flux linkages to the winding member, and each of the predetermined operating points of the drive current corresponds to one of the values of the number of the flux linkages.

In a preferred embodiment of the one and another aspects, the magnetic-state parameter is an inductance associated with the winding member, and the inductance is composed of a plurality of inductance values each corresponding to one of the plurality of predetermined operating points of the drive current. The inductance has a nonlinear characteristic with respect to change in the drive current.

In a preferred embodiment of the one and another aspects, each of the operating points of the drive current is composed of a d-axis current component $i_d$ and a q-axis current component $i_q$ on a d-q axis coordinate system defined in the motor. The d-q-axis coordinate system is rotated with rotation of the motor. Each of the values of the number of the flux linkages to the winding member is composed of one of values of the number $\Psi_d$ of d-axis flux linkages and one of values of the number $\Psi_q$ of q-axis flux linkages in the d-q-axis coordinate system. The d-axis and q-axis current components ($i_d$ and $i_q$) of each of the operating points of the drive current correspond to one of the values of the number $\Psi_d$ of the d-axis flux linkages and one of the values the number $\Psi_q$ of the q-axis flux linkages. The controlling or controller is configured to control the output of the motor based on, as the obtained value of the magnetic-state parameter, one of the values of the number $\Psi_d$ of the d-axis flux linkages and one of the values of the number $\Psi_q$ of the q-axis flux linkages.

In a preferred embodiment of the one and another aspects, the controlling or controller is configured to sensorlessly detect at least one of a rotational position of the motor and an angular velocity thereof based on the stored magnetic-state information.

BRIEF DESCRIPTION OF THE DRAWINGS

Other objects and aspects of the invention will become apparent from the following description of embodiments with reference to the accompanying drawings in which:

FIG. 7 is a view schematically illustrating a motor model consisting of d-axis and q-axis windings equivalent to U-phase, V-phase, and W-phase windings illustrated in FIG. 6 according to the first embodiment;

FIG. 8 is an enlarged view schematically illustrating a winding and a total magnetic flux containing a current-related flux due to a current flowing through the winding according to the first embodiment;

FIG. 9 is a view schematically illustrating a data table representing a relationship between d-axis and q-axis inductances and corresponding each operating point of the armature current according to the first embodiment;

FIG. 41 is a developed view of the outer periphery of a rotor of the motor illustrated in FIG. 40 in a circumferential direction thereof;

FIG. 42 is a cross sectional view of the motor taken on line AA-AA in FIG. 40;

FIG. 42B is a cross sectional view of the motor taken on line AB-AB in FIG. 40;

FIG. 42C is a cross sectional view of the motor taken on line AC-AC in FIG. 40;

FIG. 43 is a developed view of the inner periphery of a stator of the motor illustrated in FIG. 40 in a circumferential direction thereof;

DETAILED DESCRIPTION OF EMBODIMENTS OF THE INVENTION

Embodiments of the present invention will be described hereinafter with reference to the accompanying drawings. In each embodiment, the present invention is, for example, applied to a control system for a three-phase synchronous reluctance motor; this three-phase synchronous reluctance motor is an example of various types of multiphase rotary electric machines.

First Embodiment

Figure 1:
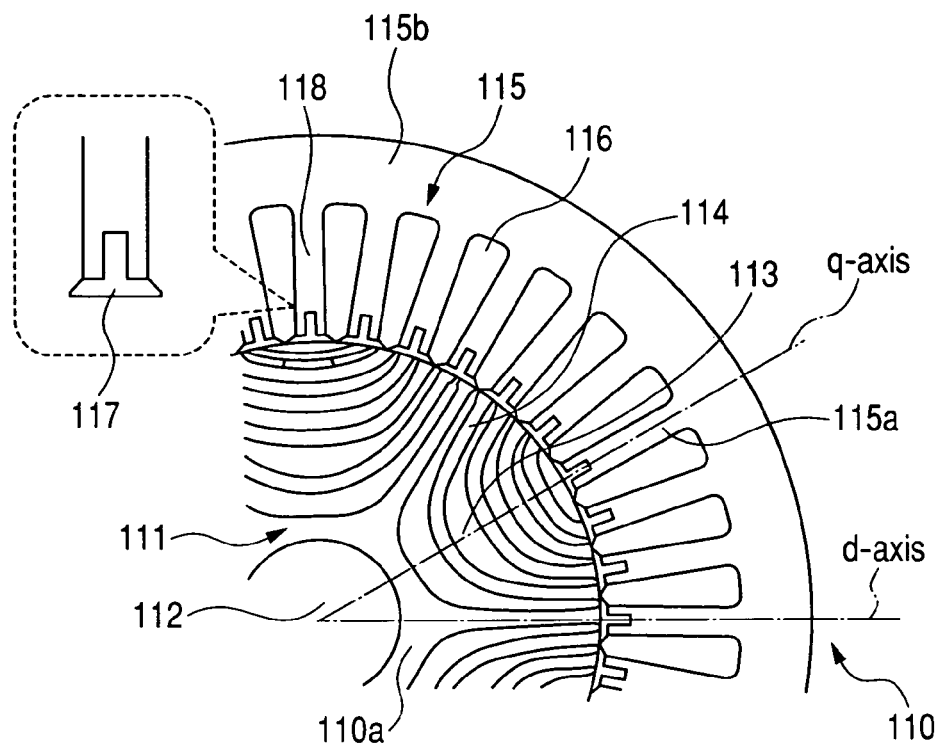
FIG. 1 is a partially lateral cross sectional view of an example of the structure of a synchronous reluctance motor according to a first embodiment of the present invention.

Referring to the drawings, in which like reference characters refer to like parts in several figures, particularly to FIG. 1, there is illustrated a three-phase and 36-slot synchronous reluctance motor, referred to simply as "motor" 110 with six poles.

The motor 110 is provided with a salient rotor 111 defined as a multi flux-barrier rotor.

Specifically, the rotor 111 consists of a substantially annular shaped rotor core 111a, a rotor shaft 112 fixed to the inner periphery of the rotor core 111a, and a plurality of groups of flux barriers (slits) 113 formed in the rotor core 111a.

The rotor core 111a has an external diameter of, for example, 100 mm, and comprises a plurality of magnetic steel sheets and a plurality of non-magnetic stainless sheets each of which has a substantially same annular shape. The magnetic steel sheets and the stainless sheets are so laminated in their axial directions in one stainless sheet in every twenty magnetic steel sheets as to be strongly fixed to each other by a proper adhesive. Each of the stainless sheets works to reinforce the rotor core 111a.

The plurality of groups of the flux barriers 113 are penetrated through the magnetic-sheet laminated rotor core 111a in the axial direction thereof.

Specifically, the plurality of groups of the flux barriers 113 are symmetrically arranged with respect to the anal direction thereof such that:

each of the plurality of groups of the flux barriers 113 is circumferentially spaced apart from another adjacent group thereof;

the flux barriers of each of the groups are aligned in a corresponding radial direction of the rotor core 111a at intervals therebetween; and both ends of each of the flux barriers of each of the groups extend up to the outer periphery of the rotor core 111a.

The groups of the flux barriers provide thin magnetic paths 114 therebetween such that the thin magnetic paths 114 are separated from each other.

A direct axis (d-axis) and a quadrature axis (q-axis) are normally defined in the rotor 111 as one of rotating coordinate systems (rotor coordinate systems); these d-q axes are rotated as the rotor is rotated.

The d-axis has a high magnetic permeability, and the q-axis has a low magnetic permeability because of the flux barriers 113.

Specifically, a magnetic flux passes through the rotor core 111a in the d-axis easier than through the rotor core 111a in the q-axis.

The motor 110 is also provided with a stator 115. The stator 115 consists of a substantially annular shaped stator core 115a having an external diameter of, for example, 172 mm. Like the rotor core 111a, the stator core 115a comprises a plurality of magnetic steel sheets each with a substantially same annular shape. The magnetic steel sheets are so laminated in their axial directions as to be strongly fixed to each other by a proper adhesive. The magnetic-steel laminated stator core 115a has a length of, for example, 95 mm in its axial direction.

The rotor core 111a is arranged such that the outer periphery of the rotor core 111a faces the inner periphery of the stator core 115a with a gap therebetween.

The stator 115 consists of a number of, such as 36, slots 116 formed through the stator core 115a in an axial direction thereof and circumferentially arranged with regular intervals. Reference character 115b represents a back yoke of the stator core 115a. The stator 115 also consists of three-phase winding (not shown) wound in the corresponding slots 116. The slots 116 provide a plurality of stator teeth 118 therebetween. One inner edge of each of the stator teeth 118 is formed with a T-shaped partial tooth 117 in its lateral cross section. The T-shaped partial tooth 117 of each of the stator teeth 118 is formed by, for example, pressing soft magnetic powders into the T-shape.

The motor 110 is configured to have more improved characteristics. Specifically, the widths of the flux barriers 113 of each of the groups are wide as much as possible; this provides a q-axis inductance as low as possible. In addition, the area of the T-shaped partial tooth 117 opposing the outer periphery of the rotor core 111a is wide as much as possible; this provides a d-axis magnetic resistance as low as possible. The gap between the outer periphery of the rotor core 111a and the inner periphery of the stator core 115a has a short length of 0.13 mm.

Specifically, the motor 110 is designed to have a d-axis inductance as high as possible and a q-axis inductance as low as possible. The nonmagnetic stainless sheets inserted in the laminated magnetic steel sheets of the rotor core 111a reinforce the rotor 111 with little electromagnetic influence on the motor 110 to thereby improve the saliency ratio ($L_d/L_q$) thereof. The configuration of the motor 110 is disclosed in M. Nashiki et al. "*Improvements of Power Factor and Torque of a Synchronous Reluctance Motor with a Slit Rotor*" IEEJ Transactions on Industry Applications, January 2006 Volume 126-D No. 2. p. 116-123.

Figure 2:
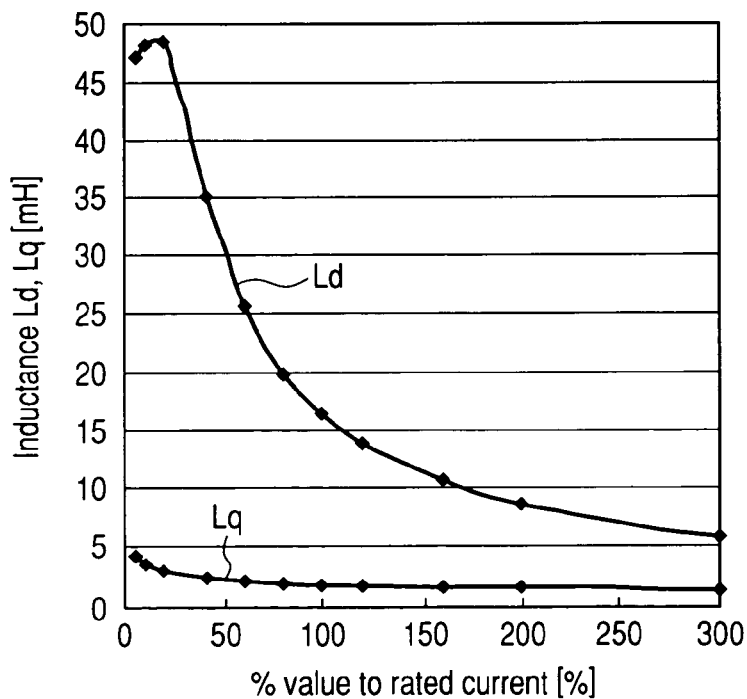
FIG. 2 is a graph schematically illustrating a result of analysis of a d-axis inductance and a q-axis inductance using nonlinear finite element method according to the first embodiment.
Figure 37:
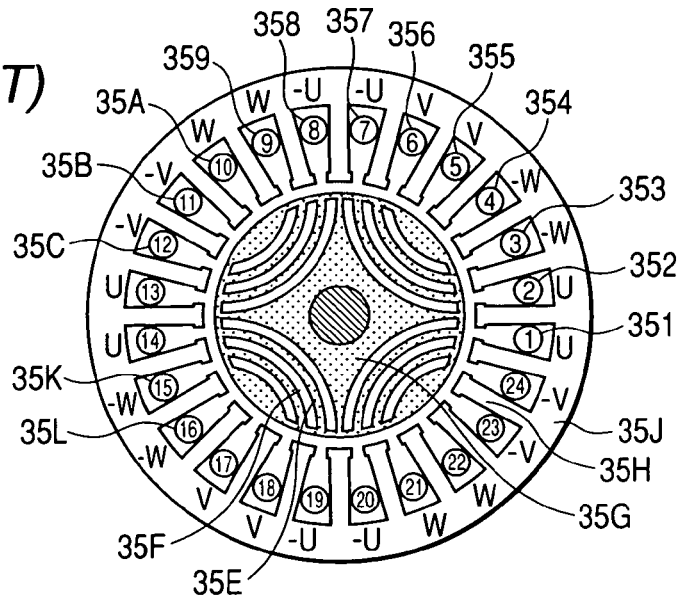
FIG. 37 is a cross sectional view taken on line AA-AA in FIG. 34.
Figure 38:
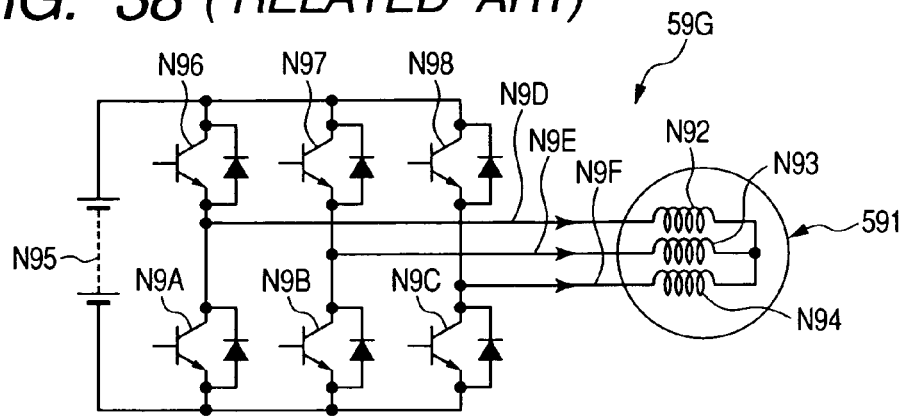
FIG. 38 is a circuit diagram schematically illustrating an example of the structure of a three-phase inverter illustrated in FIG. 39.

The motor 110 illustrated in FIG. 1 can improve the power factor and the efficiency as compared with the motor illustrated in FIG. 37. The result of analysis of the d-axis inductance $L_d$ and the q-axis inductance $L_q$ using nonlinear finite element method is illustrated in FIG. 2. In FIG. 2, the horizontal axis represents ratio (%) of armature current to continuous rated current, and the vertical axis represents inductance.

FIG. 2 clearly shows that the d-axis inductance $L_d$ and q-axis inductance $L_q$ have nonlinear characteristic curves with respect to change in the armature current, in other words, they have magnetic saturation curves with respect to change in the armature current.

In addition, the number of flux linkages created by the d-axis current $i_d$ and that of flux linkages created by the q-axis current $i_q$ are affected by the mutual interference between the d-axis current $i_d$ and q-axis current $i_q$ of the armature current. The number of flux linkages created by the d-axis current $i_d$ will be referred to as "d-axis flux-linkage number $\Psi_d$" hereinafter, and the number of flux linkages created by the q-axis current $i_q$ will be referred to as "q-axis flux-linkage number $\Psi_q$" hereinafter.

When changing the armature current to control the output of a motor, a control system needs to grasp the magnitude of the impedance at an operating point of the armature current, in other words, that of the inductance within a narrow range of the armature current.

Figures 3, 4:
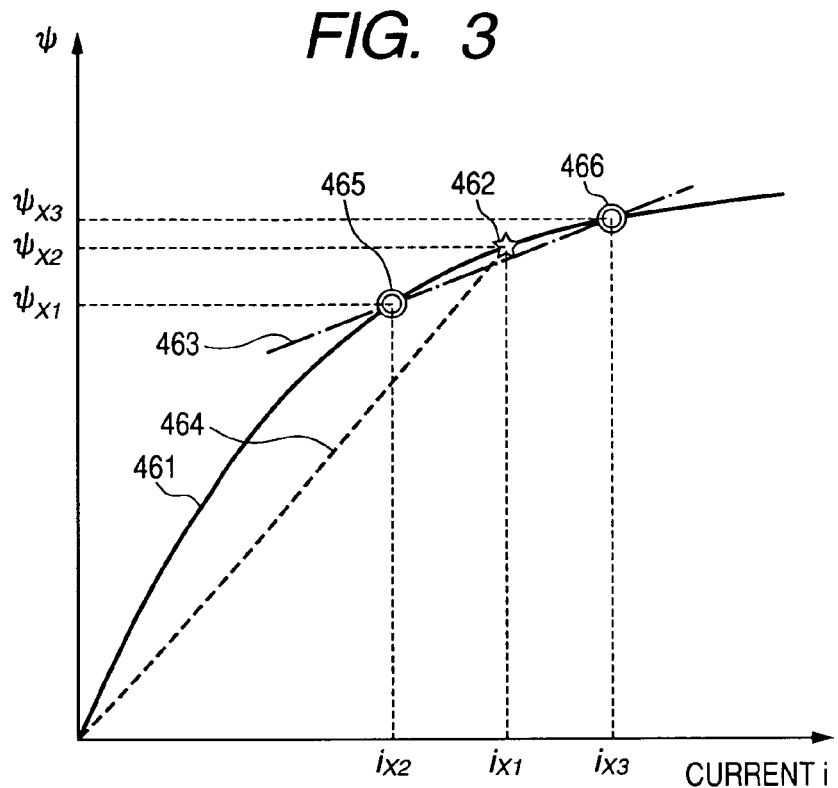
FIG. 3 is a graph schematically illustrating a relationship between armature current and the number of flux linkages created by the armature current according to the first embodiment.
FIG. 4 is a block diagram schematically illustrating an example of the circuit structure of a control system for controlling an output of a motor illustrated in FIG. 1 according to the first embodiment of the present invention.

FIG. 3 schematically illustrates a relationship between armature current i and the number of flux linkages $\Psi$ created by the armature current. As illustrated in FIG. 3, the relationship shows a nonlinear characteristic curve 461.

When an operating point 462 of the armature current i is located at the armature current $i=i_{x1}$, an average inductance $L_{ave}$ is represented as a gradient of a line 464. A narrow-range inductance $L_{st}$ within a narrow range between one adjacent operating point 465 located at the armature current $i=i_{x2}$ and the other adjacent operating point 466 located at the armature current $i=i_{x3}$ is represented as a gradient of a line 463.

Specifically, the average inductance $L_{ave}$ is required to obtain the number of flux linkages $\Psi$, winding voltage v of the motor, and output torque T thereof, and the narrow-range inductance $L_{st}$ is required to accurately execute the motor-output control by changing the armature current.

The operating point of the armature current i is changed with variation in the average inductance $L_{ave}$ and the narrow-range inductance $L_{st}$.

Such a magnetic nonlinearity of a motor has a relationship with the magnitude of magnetomotive force based on armature current, and therefore with the motor size. Schematically, the number of ampere-turns of each phase winding of a motor whose outer diameter (outer diameter of its stator) is equal to or lower than 100 mm is maintained comparatively low; this allows the motor to be rotatably driven without respect to an extreme amount of magnetic saturation.

In contrast, the number of ampere-turns of each phase winding of a motor whose outer diameter (outer diameter of its stator) is equal to or greater than 150 mm increases enough to magnetically saturate the magnetic circuit of the motor. This may cause magnetic nonlinearity problems set forth above to become obvious.

Thus, the first embodiment of the present invention provides a system and method for controlling a motor whose behaviors are complicated set forth above with high accuracy.

Schematic procedures of the motor control method according to the first embodiment will be described as follows:

In the first step, the d-axis and q-axis flux-linkage numbers $\Psi_d$ and $\Psi_q$ defined at each operating point $(i_d, i_q)$ of the armature current to be supplied to the three-phase stator windings of a motor as a control target is computed by a computer using at least one of various analysis techniques, such as nonlinear finite element method. The d-axis flux-linkage number $\Psi_d$ defined at each operating point $(i_d, i_q)$ of the armature current will also be referred to as the d-axis flux-linkage number $\Psi_d(i_d, i_q)$ and similarly, the q-axis flux-linkage number $\Psi_q$ defined at each operating point $(i_d, i_q)$ of the armature current will also be referred to as the q-axis flux-linkage number $\Psi_q(i_d, i_q)$.

Figures 10, 11:
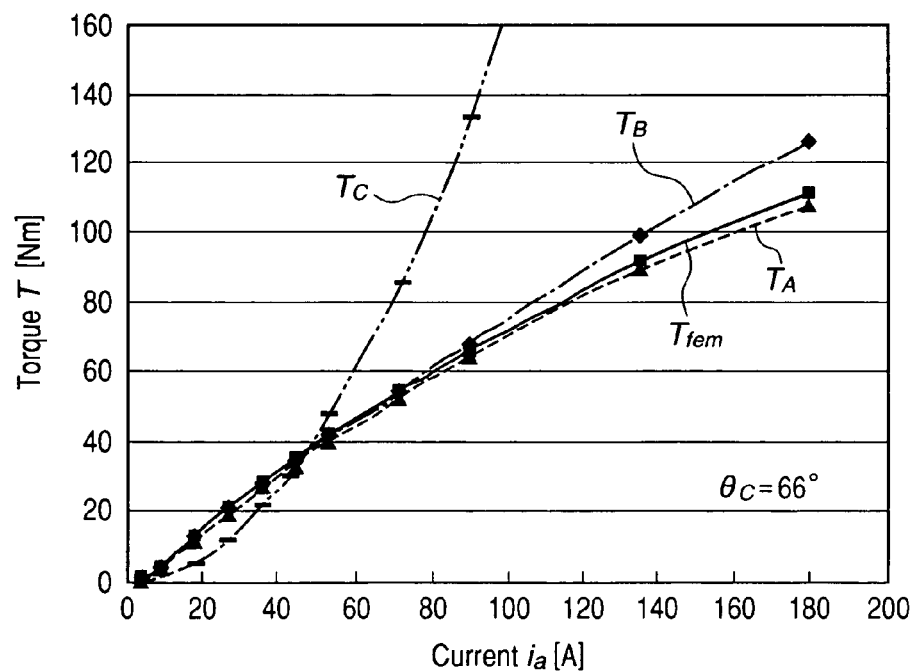
FIG. 10 is a view schematically illustrating a data table representing a relationship between d-axis and q-axis flux-linkage numbers and corresponding each operating point of the armature current according to the first embodiment.
FIG. 11 is a graph schematically illustrating a torque-current characteristic of the motor illustrated in FIG. 1 according to the first embodiment.

In the second step, a data table T1 representing a relationship between the d-axis and q-axis flux-linkage numbers $\Psi_d$ and $\Psi_q$ and corresponding each operating point $(i_d, i_q)$ of the armature current is generated; this data table T1 is illustrated in FIG. 10.

In the third step, a data table T2 representing d-axis and q-axis command currents $i_d^*$ and $i_q^*$ as a function of torque demand T* and rotational speed ω of the target motor.

In the fourth step, the d-axis and q-axis command currents $i_d^*$ and $i_q^*$ corresponding to an input of the torque demand T* and that of the rotational speed ω of the target motor are computed by a control system for controlling the target motor based on the data table T2.

In the fifth step, the d-axis and q-axis feedforward voltage commands FFd and FFq respectively corresponding to the d-axis and q-axis command currents $i_d^*$ and $i_q^*$ computed in the fourth step are determined by the control system.

In the sixth step, the loop gains $G_d$ and $G_q$ respectively corresponding to the d-axis and q-axis command currents $i_d^*$ and $i_q^*$ computed in the fourth step are determined by the control system.

In the seventh step, control of the d-axis command voltage $v_d^*$ and the q-axis command voltage $v_q^*$ (the three-phase voltage commands $v_u^*$, $v_v^*$, and $v_w^*$) are executed by the control system based on: the d-axis and q-axis command currents $i_d^*$ and $i_q^*$ computed in the fourth step; the d-axis and q-axis feedforward voltage commands FFd and FFq computed in the fifth step; and the loop gains $G_d$ and $G_q$ computed in the sixth step. This allows the armature current and the three-phase voltages corresponding thereto, which are supplied to the target motor, to be controlled.

These schematic procedures based on the d-axis and q-axis flux-linkage numbers $\Psi_d$ and $\Psi_q$ defined at each operating point $(i_d, i_q)$ of the armature current can improve the responsibility and accuracy of the motor control, and properly control the output of the motor that is rapidly rotating.

In addition, these specific procedures based on the d-axis and q-axis flux-linkage numbers $\Psi_d$ and $\Psi_q$ defined at each operating point $(i_d, i_q)$ of the armature current can control an output of a motor with a rotor in which a plurality permanent magnets are installed without regard to whether or not the permanent magnets are embedded in the rotor.

Next, specific structure of the system and method for controlling a motor based on the schematic procedures according to the first embodiment will be described hereinafter.

FIG. 4 is a block diagram schematically illustrating an example of the circuit structure of a control system CS for controlling the output of the motor 110 illustrated in FIG. 1 as an example of a target motor according to the first embodiment of the present invention. Some of blocks of the control system CS for controlling the output of the motor 110 can be implemented by tasks to be executable by a microprocessor (microcomputer) in accordance with software (at least one program) or by a hardwired logic circuit including, for example, gate arrays.

Figure 39:
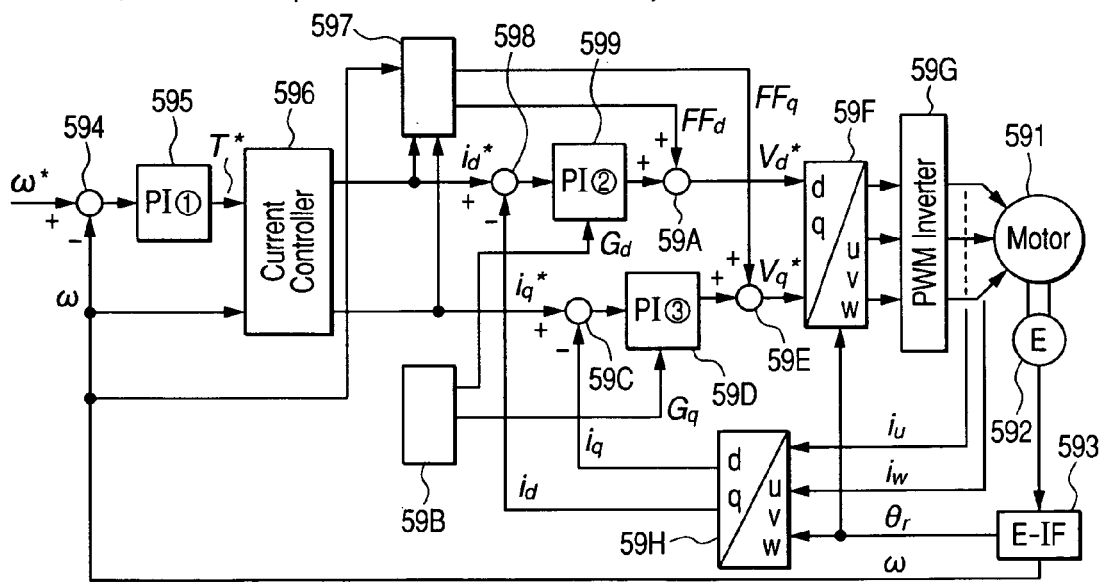
FIG. 39 is a block diagram schematically illustrating an example of the circuit structure of a control system for relatively precisely controlling such a motor.

Like elements (blocks) between the control system CS and the control system illustrated in FIG. 39, to which like reference characters are assigned, are omitted or simplified in description.

As illustrated in FIG. 4, the control system CS is composed of a data table T1 representing a relationship between the d-axis and q-axis flux-linkage numbers $\Psi_d$ and $\Psi_q$ and corresponding each operating point $i_d, i_q$) of an armature current. The data table T1 has been stored in a storage unit 131 of the control system CS.

The control system CS is composed of a data table T2 representing d-axis and q-axis command currents $i_d^*$ and $i_q^*$ as a function of torque demand T* and rotational speed ω of the motor 110.

The control system CS is composed of a command current determiner 133, a feedforward voltage determiner 134 and a current-control loop gain determiner 135.

The command current determiner 133 determines a d-axis command current $i_d^*$ and q-axis command current $i_q^*$ based on the torque demand T* and at least one of the data tables T1 and T2.

The feedforward voltage determiner 134 works to generate a d-axis feedforward voltage command FFd and q-axis feedforward voltage command FFq based on the d-axis and q-axis flux-linkage numbers $\Psi_d$ and $\Psi_q$ corresponding to the d-axis and q-axis command currents $i_d^*$ and $i_q^*$ and the detected rotational speed ω; these d-axis and q-axis command currents $i_d^*$ and $i_q^*$ correspond to an actual operating point $(i_d, i_q)$ of the armature current.

The current-control loop gain determiner 135 works to:

determine a narrow-range inductance corresponding to a narrow range of the armature current around the d-axis and q-axis command currents $i_d^*$ and $i_1^*$ based on information of change in the d-axis and q-axis flux-linkage numbers with respect to the narrow range of the armature current around the d-axis and q-axis command currents $i_d^*$ and $i_q^*$; and determine the loop gain $G_d$ for a d-axis current control loop and the loop gain $G_q$ for a q-axis current control loop based on the determined narrow-range inductance.

The control system CS is composed of a d-axis current controller 136 and a q-axis current controller 137.

The d-axis current controller 136 works to:

receive the d-axis current difference calculated by the d-axis current difference detector 59B;

execute a compensating operation by calculating a proportional term and an integral term based on the received d-axis current difference so as to obtain a d-axis current control voltage command proportional to the current-loop gain $G_d$; and pass the obtained d-axis current control voltage command to the d-axis voltage controller 59A.

Similarly, the q-axis current controller 137 works to:

receive the q-axis current difference calculated by the q-axis current difference detector 59C;

execute a compensating operation by calculating a proportional term and an integral term based on the received q-axis current difference so as to obtain a q-axis current control voltage command proportional to the current-loop gain $G_q$; and pass the obtained q-axis current control voltage command to the q-axis voltage controller 59E.

Next, specific operations of the components of the control system CS illustrated in FIG. 4 will be described hereinafter.

First, various state parameters representing the behaviors of the motor 1 will be given by the following equations:

$$\begin{bmatrix} v_d \\ v_q \end{bmatrix} = \begin{bmatrix} R+pL_d & -\omega L_q \\ \omega L_d & R+pL_q \end{bmatrix} \begin{bmatrix} i_d \\ i_q \end{bmatrix} \quad \text{[Equation 1]}$$

$$T = P_n(L_d - L_q)i_q i_d \quad \text{[Equation 2]}$$

$$\text{Power} = vd \times id + vq \times iq \quad \text{[Equation 3]}$$

$$\text{Power} = \omega T + P_{loss} \quad \text{[Equation 4]}$$

$$\text{Power} \doteqdot \omega T \quad \text{[Equation 5]}$$

where $v_d$ represents the d-axis voltage, $v_q$ represents the q-axis voltage, $i_d$ represents the d-axis current, $i_q$ represents the q-axis current, p represents a differential operator, $\omega$ represents the angular velocity of the rotor 111, R represents the resistance of each winding of the stator 115, T represents the output torque of the motor 110, Power represents the input power to the motor 110, Pn represents the number of pole pair, Ploss represents the internal loss of the motor 110.

The input power Power to the motor 110 represents the sum of the product of the d-axis voltage and d-axis current and that of the q-axis voltage and q-axis current; this input power Power is expressed by the equation [3], and also expressed by the equation [4] using a mechanical output $\omega T$ of the motor 110 and the internal loss Ploss of the motor 110.

Assuming that the resistance R is negligible in magnitude and the internal loss Ploss of the motor 110 is zero, the equation [5] can be obtained. The d-axis and q-axis flux-linkage numbers $\Psi_d$ and $\Psi_q$ are given by the following equations:

$$\Psi_d = L_d i_d \quad \text{[Equation 6]}$$

$$\Psi_q = L_q i_q \quad \text{[Equation 7]}$$

As seen in the equations 6 and 7, the d-axis inductance $L_d$ is simply defined as a proportional coefficient between the d-axis flux-linkage number $\Psi_d$ and the d-axis current $i_d$. Similarly, the q-axis inductance $L_q$ is simply defined as a proportional coefficient between the q-axis flux-linkage number $\Psi_q$ and the q-axis current $i_q$. Specifically, in the first embodiment, each of the d-axis inductance $L_d$ and q-axis inductance $L_q$ shall not be separated into a self-inductance and a mutual inductance.

Substituting the equations [6] and [7] into each of the equations [1] and [2] obtains the following equations [8] and [9]:

$$\begin{bmatrix} v_d \\ v_q \end{bmatrix} = \begin{bmatrix} p & -\omega \\ \omega & p \end{bmatrix} \begin{bmatrix} \psi_d \\ \psi_q \end{bmatrix} + \begin{bmatrix} R & 0 \\ 0 & R \end{bmatrix} \begin{bmatrix} i_d \\ i_q \end{bmatrix} \quad \text{[Equation 8]}$$

$$T = P_n(\Psi_d i_q - \Psi_q i_d) \quad \text{[Equation 9]}$$

When the motor 110 has a comparatively grate capacity, the resistance R of each winding of the stator 115 has a comparatively low magnitude; this allows the equation [8] to be simplified as the equation [10]:

$$\begin{bmatrix} v_d \\ v_q \end{bmatrix} \doteqdot \begin{bmatrix} p & -\omega \\ \omega & p \end{bmatrix} \begin{bmatrix} \psi_d \\ \psi_q \end{bmatrix} \quad \text{[Equation 10]}$$

Let us further consider the equations [1] and [2]. The equations [1] and [2] mean that the d-axis inductance $L_d$ and q-axis inductance $L_q$ have a nonlinear characteristic curve as illustrated in FIG. 2 and do not a constant value. Specifically, assuming the d-axis inductance $L_d$ and q-axis inductance $L_q$ as a constant value causes each of the equations [1] and [2] to have a significant error in the most of the armature current range.

The equations [2] and [9] representing the output torque T of the motor 110 can be derived from the equations [1], [3], and [5] assuming that the winding resistance R is negligible in magnitude and the internal loss Ploss of the motor 110 is zero.

Note that, in the first embodiment, the output torque T of the motor 110 is represented by an approximate expression, such as the equation [2] or the equation [9]. The output torque T can be, however, determined based on strict calculations using the winding resistance R, an iron loss, and a leakage inductance.

Thus, defining the d-axis inductance $L_d$ as a function $L_d(i_d, i_q)$ of the armature current $(i_d, i_q)$ allows the accuracy of the equations [1] and [2] to be respectively handled as accurate equations. Similarly, the q-axis inductance $L_q$ is defined as a function $L_q(i_d, i_q)$ of the armature current $(i_d, i_q)$.

In contrast, conventional motor control systems are designed on condition that the d-axis inductance $L_d$ and q-axis inductance $L_q$ are each assumed as a constant value; this deteriorates the accuracy of motor control. In other words, the conventional motor control systems had to use a limited range of the armature current within which the d-axis inductance $L_d$ and q-axis inductance $L_q$ are assumed to be substantially constant.

Figure 18:
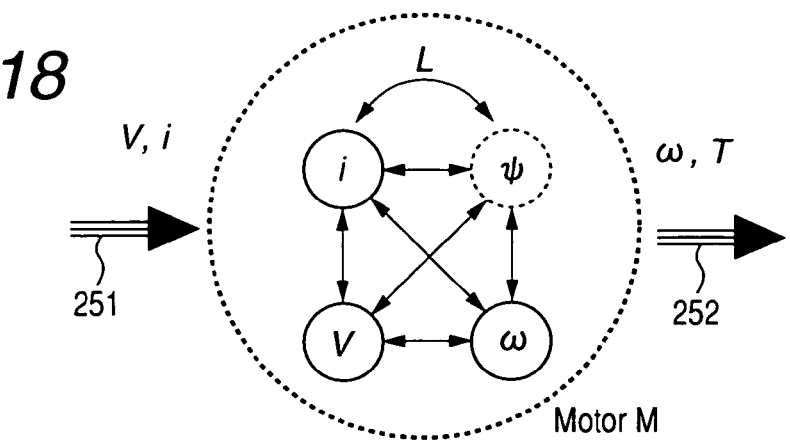
FIG. 18 is a view schematically illustrates a basic model of a motor according to the first embodiment.

FIG. 18 is a view schematically illustrates a basic electromagnetic model of a motor M. Input to the motor M includes a winding voltage v and an armature current i. The winding voltage to be supplied to a winding of the motor M is modeled by the following equation [11] using the input armature current i, the number of flux linkages created by the armature current i, and the angular velocity $\omega$ of the motor M:

$$v = d\Psi/dt = d(Li)/dt \quad \text{[Equation 11]}$$

An output of the motor M includes the angular velocity ω and the torque T. In FIG. 18, when the motor M is controlled in the range of the armature current i within which the inductance L is substantially kept constant, the flux linkage number Ψ created by the armature current i can be represented by the equations [6] and [7]. This allows the winding voltage v to be controlled without grasping the flux linkage number Ψ.

However, when the motor M is controlled in the range of the armature current i within which the inductance L is non-linearly changed, the d-axis and q-axis flux-linkage numbers $\Psi_d$ and $\Psi_q$ defined at each operating point ($i_d$, $i_q$) of the armature current need be grasped. In place of or in addition to the flux-linkage numbers $\Psi_d$ and $\Psi_q$, the d-axis and q-axis inductances $L_d(i_d, i_q)$ and $L_q(i_d, i_q)$ defined at each operating point ($i_d$, $i_q$) of the armature current need be grasped.

Concerning this matter, because each of the d-axis and q-axis inductances $L_d(i_d, i_q)$ and $L_q(i_d, i_q)$ is variable, it has a comparatively low unity value, and the winding-voltage equation can be represented by the equation [8] or equation [9]. In addition, the output torque T of the motor M can be represented by the equation [10] without using the d-axis and q-axis inductances.

When the armature current ($i_d$, $i_q$) and the d-axis and q-axis flux-linkage numbers $\Psi_d$ and $\Psi_4$ have been obtained using finite element electromagnetic-field analysis or the like, the d-axis and q-axis inductances $L_d(i_d, i_q)$ and $L_q(i_d, i_q)$ are not necessarily obtained in accordance with the equations [6] and [7].

Specifically, when the d-axis and q-axis flux-linkage numbers $\Psi_d$ and $\Psi_9$ and/or the d-axis and q-axis inductances $L_d(i_d, i_q)$ and $L_q(i_d, i_q)$ defined at each operating point ($i_d$, $i_q$) of the armature current have been grasped, the state model of the motor M can be represented thereby; this allows the output of the motor M to be controlled.

FIG. 10 schematically illustrates the data table T1 representing a relationship between the d-axis and q-axis flux-linkage numbers $\Psi_d(i_d, i_q)$ and $\Psi_q(i_d, i_q)$ and corresponding each operating point ($i_d$, $i_q$) of the armature current.

FIG. 9 schematically illustrates the data table T2 representing a relationship between the d-axis and q-axis inductances $L_d(i_d, i_q)$ and $L_q(i_d, i_q)$ and corresponding each operating point ($i_d$, $i_q$) of the armature current.

In FIG. 9, the horizontal axis of the table T2 represents values ($i_{d1}, i_{d2}, \ldots i_{dm}, \ldots, i_{dA}$) of the d-axis current $i_d$, and corresponding values ($i_{q1}, i_{q2}, \ldots i_{qn}, \ldots, i_{qB}$) of the q-axis current $i_q$. A data field of the table T2 is allocated to each operating point of a corresponding pair of one value of the d-axis current $i_d$ and that of the q-axis current $i_q$. The d-axis and q-axis inductances $L_d(i_d, i_q)$ and $L_q(i_d, i_q)$ corresponding to one specified operating point ($i_d$, $i_q$) are stored in one of the data field defined by the one specified operating point ($i_d$, $i_q$). The number of the data fields in the table T2 can be selected such that the more the accuracy of motor control increases, the more the selected number of the data fields in the table T2 increases.

The values ($i_{d1}, i_{d2}, \ldots i_{dm}, \ldots, i_{dA}$; m, A is an integer greater 1) of the d-axis current $i_d$ and those ($i_{q1}, i_{q2}, \ldots i_{qn}, \ldots, i_{qB}$; is an integer greater than 1) of the q-axis current iq are discrete pieces of data. For this reason, the d-axis and q-axis inductances $L_d(i_d, i_q)$ and $L_q(i_d, i_q)$ corresponding to one specified operating point ($i_d$, $i_q$) that exists among the discrete values of the table T2 can be estimated by interpolation from some of the discrete values around the one specified operating point. As the interpolation, linear interpolation and/or curve interpolation, such as spline interpolation, for improving the accuracy thereof can be used. In the estimation process, part of the interpolation can be replaced into extrapolation.

When the armature current lies within a comparatively linear portion of a magnetic characteristic curve of the motor, the intervals between the discrete pieces of each of the d-axis current $i_d$ and q-axis current $i_q$ can be determined to be comparatively wide because of comparatively low interpolation error.

In contrast, in a range of a comparatively low level of the armature current, a B-H characteristic of each of the magnetic steel sheets corresponding to the low-level range may have a nonlinear curve. Similarly, in a range of a comparatively high level of the armature current, a B-H characteristic of each of the magnetic steel sheets corresponding to the high-level range may have a nonlinear curve.

For this reason, in the range of either a comparatively low level or a comparatively high level of the armature current, the intervals between the discrete pieces of each of the d-axis current $i_d$ and q-axis current $i_q$ are determined to be as narrow as possible.

The specific configuration of the data table T2 can reduce its size while maintaining high accuracy of the motor control.

Soft magnetic materials to be used to form each of the rotor core and the stator core commonly have a predetermined nonlinear characteristic; this characteristic may roughly partition the scope of the armature current corresponding to the nonlinear characteristic into:

a first range around an original point;

a second range of a comparatively low level of the armature current;

a third range approaching a magnetic saturation region of the predetermined nonlinear characteristic; and a fourth range corresponding to the magnetic saturation region and close to the upper limit of the armature current.

Four representative values of the armature current within the respective first to fourth ranges can be therefore determined as the operating points of the armature current. This allows the data table T2 to have a matrix size with a 4 by 4 (4×4) array, thus snipping the data table T2 in size. Naturally, the data table T2 whose size is greater than the (4×4) array size can increase the accuracy of the motor control. Use of an interpolation method capable of reducing interpolation error allows the data table T2 to be reduced in size.

Referring to the data table T2 using a specified operating point ($i_d$, $i_q$) clearly determines the d-axis and q-axis inductance $L_d(i_d, i_q)$ and $L_q(i_d, i_q)$ corresponding to the specified operating point ($i_d$, $i_q$). This accurately controls the d-axis and q-axis currents $i_d$ and $i_q$, the d-axis and q-axis voltages $v_d$ and $v_q$, and the output torque of the motor expressed by the equation [2].

The descriptions of the data table T2 illustrated in FIG. 9 set forth above can be similarly applied to the data table T1 illustrated in FIG. 10. Referring to the data table T1 using a specified operating point ($i_d$, $i_q$) therefore determines clearly the d-axis and q-axis flux-linkage numbers $\Psi_d(i_d, i_q)$ and $\Psi_q(i_d, i_q)$ corresponding to the specified operating point ($i_d$, $i_q$). This accurately controls the d-axis and q-axis currents $i_d$ and $i_q$, the d-axis and q-axis voltages $v_d$ and $v_q$, and the output torque of the motor expressed by the equation [2].

In at least one of the data tables T1 and T2, another data useful for controlling another motor state variable at each operating point ($i_d$, $i_q$) of the armature current can be stored.

As described above, in the motor control method (motor control system CS) according to the first embodiment, the operating state of the motor 110 at a specified operating point ($i_d$, $i_q$) of the armature current can be modeled as the data table T2 representing the behavior of the pair of d-axis and q-axis inductances $L_d$ and $L_q$ depending on the d-axis and q-axis currents $i_d$ and $i_q$ as a parameter (see FIG. 9).

In addition, in the motor control method (motor control system CS) according to the first embodiment, the operating state of the motor 110 at a specified operating point ($i_d$, $i_q$) of the armature current can be modeled as the data table T1 representing the behavior of the pair of d-axis and q-axis flux linkage numbers $\Psi_d$ and $\Psi_q$ depending on the d-axis and q-axis currents $i_d$ and $i_q$ as a parameter (see FIG. 10).

In other words, the model of the motor 110 is presented in the function of the pair of d-axis and q-axis flux linkage numbers $\Psi_d$ and $\Psi_q$ and the variable of the pair of d-axis and q-axis currents $i_d$ and iq. The control method (control system CS) works to obtain the operating state of the motor 110 based on the presented motor model.

In the first embodiment, the d-axis and q-axis flux-linkage numbers $\Psi_d(i_d, i_q)$ and $\Psi_q(i_d, i_q)$ defined at each of the operating points ($i_d$, $i_q$) and/or the d-axis and q-axis inductances $L_d$ and $L_q$ defined thereat are obtained based on finite element method (FEM).

In addition, in the first embodiment, the motor model can be represented on the d-q coordinate system (rotating coordinate system) (see FIG. 4). In other words, for example, the d-axis and q-axis currents $i_d$ and $i_q$ and the d-axis and q-axis flux-linkage numbers $\Psi_d(i_d, i_q)$ and $\Psi_q(i_d, i_q)$ are represented on the d-q coordinate system, and certainly represented on a stationary coordinate system (α-β coordinate system) defined in the stator 115 of the motor 110.

Next, how to specifically obtain the data table T1 representing the relationship between the d-axis and q-axis flux-linkage numbers $\Psi_d(i_d, i_q)$ and $\Psi_q(i_d, i_q)$ and corresponding each operating point ($i_d$, $i_q$) of the armature current illustrated in FIG. 4 will be described hereinafter.

The motor 110 is determined as a motor for control target. It is possible to compute and analyze a flux passing through each portion in the motor 110 with the use of a computer. As a method of the computing, an infinite element method is mainly used, and especially, a nonlinear infinite element method is effectively used when the motor 110 having the nonlinear magnetic characteristic curves is determined as the control target.

Except for the infinite element method, various types of computing methods with the use of a computer can be applied to compute and analyze the number of flux linkages passing through each portion in the motor 110.

For example, one computing method is to:

compute a magnetic impedance at each portion in the motor 110; and compute, based on the computed magnetic impedance at each portion in the motor 110, a magnetic flux passing through each portion, a total magnetic flux, a motor output torque, and a winding voltage to be supplied to the motor 110.

In each of the infinite element method and various types of computing methods, various motor-specific constants and motor-specific data required for the computing can have been collected in a database. The database allows the computer to rapidly compute the number of flux linkages passing through each portion in the motor 110 and/or compute the magnetic impedance thereat.

Figure 5:
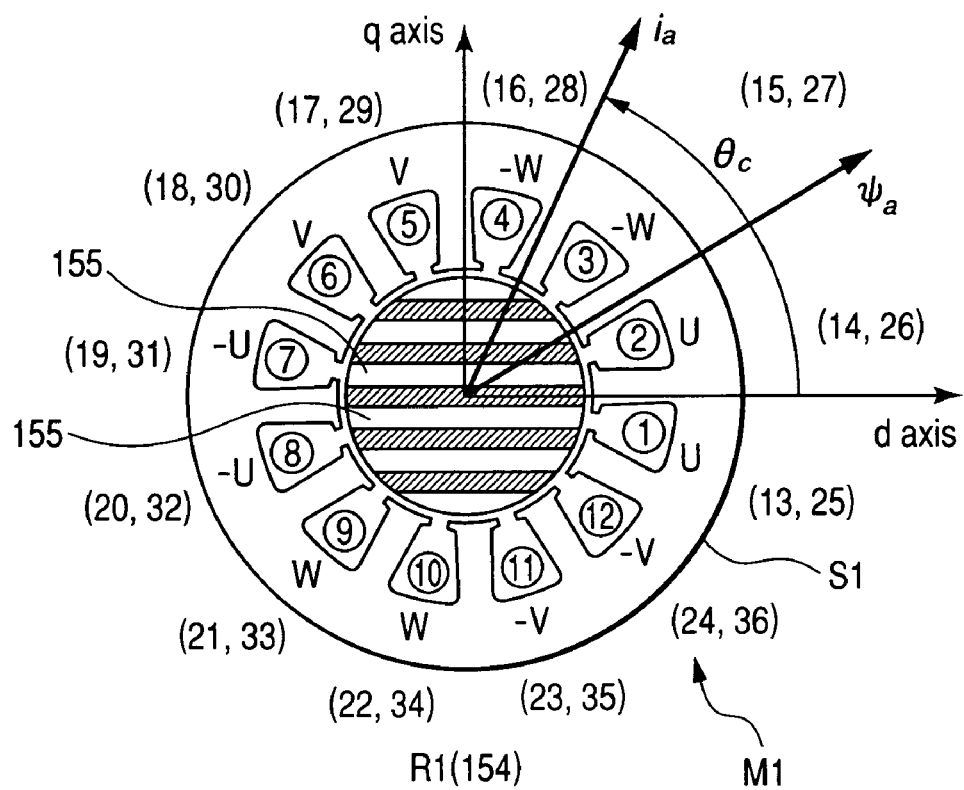
FIG. 5 is a lateral cross sectional view of an example of the structure of a synchronous reluctance motor that is a simplification of the synchronous reluctance motor illustrated in FIG. 1 according to the first embodiment.

In order to facilitate understanding of how to obtain the data table T1, the six-pole and 36-slot three-phase motor 110 is simplified to a two-pole and 12-slot three-phase motor M1 illustrated in FIG. 5. In other words, let us consider that the motor 110 illustrated in FIG. 1 is integrated with three motors M1.

As illustrated in FIG. 5, a U-phase winding 151 is distributedly wound in the first, second, seventh, and eighth slots ①, ②, ⑦ and ⑧ of a stator core S1 to form a U-phase coil. A V-phase winding 152 is distributedly wound in the fifth, sixth, eleventh, and twelfth slots ⑤, ⑥, ⑪, and ⑫ of the stator core S1 to form a V-phase coil. A W-phase winding 153 is distributedly wound in the ninth, tenth, third, and fourth slots ⑨, ⑩, ③, and ④ of the stator core S1 to form a W-phase coil. At an exterior of the outer periphery of the stator core S1, arrangement of the thirteenth slot (13) to the twenty-fourth slot (24) of another one motor, and arrangement of the twenty-five slot (25) to the thirty-sixth slot (36) of the last one motor are schematically illustrated.

A plurality of flux barriers (slits) 155 are so formed in a rotor core R1 of a rotor 154 as to be arranged at intervals therebetween in parallel to one diameter of the rotor core R1. These flux barriers 155 causes the rotor core R1 to have a salient structure.

Specifically, the configuration of the rotor core R1 defines a direct axis (d-axis) with high magnetic permeability therein to be directed in the one diameter of the rotor core R1.

A quadrature axis (q-axis) with a low magnetic permeability is arranged such that its phase is 90 degrees (π/2 radian) electric angle leading with respect to the d-axis.

Figure 6:
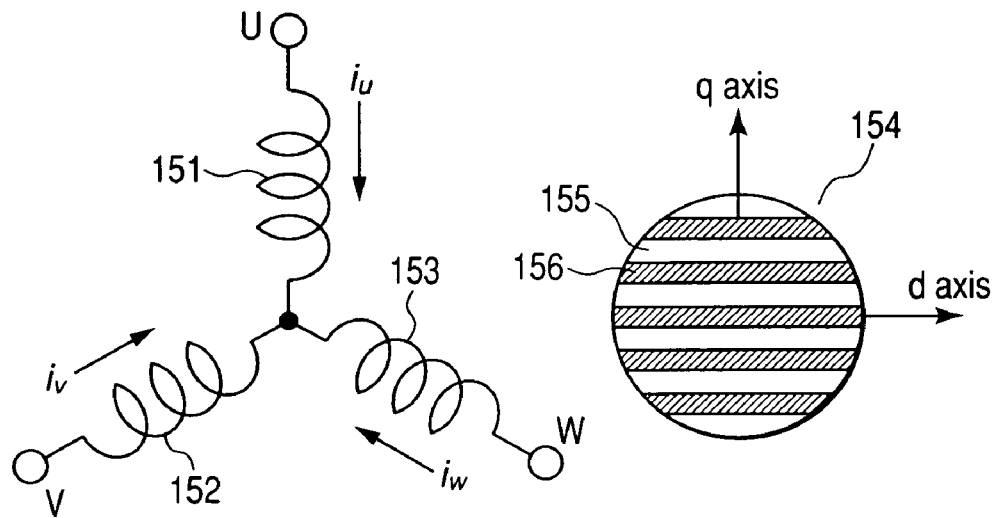
FIG. 6 is a view schematically illustrating a positional relationships between U-phase, V-phase, and W-phase windings, U-phase, V-phase, and W-phase currents, the rotational position of the a rotor illustrated in FIG. 5, and d and q axes illustrated in FIG. 5 according to the first embodiment.

FIG. 6 schematically illustrates positional relationships between the U-phase, V-phase, and W-phase windings 151, 152, and 153, U-phase, V-phase, and W-phase winding currents $i_u$, $i_v$, and $i_w$, the rotational position of the rotor 154, and the d and q axes on a stationary coordinate system.

When an arbitral amplitude of an armature current composed of the three-phase winding currents $i_u$, $i_v$, and $i_w$ is assumed to $i_a$ and a controlled phase angle of the armature current $i_a$ with respect to the d-axis is assumed to θc, a d-axis current $i_{d1}$ and a q-axis current $i_{q1}$ at that time are given by the following equations:

$$i_{d1} = i_a \cdot \cos \theta c \qquad \text{[Equation 12]}$$

$$i_{q1} = i_a \cdot \sin \theta c \qquad \text{[Equation 13]}$$

These d-axis current $i_{d1}$ and q-axis current $i_{q1}$ can be equivalent to ones flowing through a d-axis winding 601 and q-axis winding 602 on a d-q coordinate system (rotating coordinate system) illustrated in FIG. 7. FIG. 7 also illustrates positional relationships between the d-axis and q-axis windings 601 and 602, the d-axis and q-axis currents $i_{d1}$ and $i_{q1}$, and the rotational position of the rotor 154.

Under the positional relationships between the d-axis and q-axis currents $i_{d1}$ and $i_{q1}$ and the rotational position of the rotor 154, in the first embodiment, 10 points of the d-axis current $i_d(i_{d1})$ and 10 points of the q-axis current $i_q(i_{q1})$ are for example selected. Thereafter, any possible combinations of the 10 points of the d-axis current $i_d(i_{d1})$ and those of the q-axis current $i_q(i_{q1})$, up to 100 points (operating points) thereof, are computed by the computer.

Thus, based on the selected up to 100 operating points of the d-axis and q-axis currents $i_d$ and $i_q$, the d-axis and q-axis flux-linkage numbers $\Psi_d(i_d, i_q)$ and $\Psi_q(i_d, i_q)$ at the respective up to 100 operating points are computed by the computer. This result of the computing allows the data table T1 illustrated in FIG. 10 to be created, and the created data table T1 has been stored in the control system CS (see FIG. 4).

Note that the computation amount required to obtain the d-axis and q-axis flux-linkage numbers $\Psi_d(i_d, i_q)$ and $\Psi_q(i_d, i_q)$ at the respective up to 100 operating points can be executed in a comparatively short time at a currently normal processing rate; this can place a little burden on the design development of the control system CS. Similarly, the data capacity of the table T1 can also place little burden on the actual level of the storage capacity of a normal memory installed in the control system CS.

Note that an interval between any adjacent two points of the 10 points of the d-axis current $i_d$ or the q-axis current $i_q$ can be determined at a regular one or a irregular one.

Some of the intervals of the two points of the 10 points of at least one of the d-axis and q-axis currents $i_d$ and $i_q$ contained in a range corresponding to a rapid change in a corresponding one of the d-axis inductance and q-axis inductance are determined to become short. In contrast, some of the intervals of the two points of the 10 points of at least one of the d-axis and q-axis currents $i_d$ and $i_q$ contained in a range corresponding to a linear change in a corresponding one of the d-axis inductance and q-axis inductance are determined to become wide. This provides motor control with high accuracy based on the data table T1 whose data capacity is as low as possible.

In the first embodiment, the armature current composed of the three-phase winding currents $i_u$, $i_v$, and $i_w$ is converted into the d-axis and q-axis currents on d-q coordinate system, and the d-axis and q-axis flux-linkage numbers $\Psi_d(i_d, i_q)$ and $\Psi_q(i_d, i_q)$ on the d-q coordinate system are computed to be stored in the data table T1.

The armature current composed of the three-phase winding currents $i_u$, $i_v$, and $i_w$ can be converted into a plurality of current components on a corresponding three or more dimensional coordinate system. The armature current composed of the three-phase winding currents $i_u$, $i_v$, and $i_w$ can also be converted into an α-axis current and a β-axis current on an α-axis and β-axis coordinate system defined in the stator of the motor 110 (M1).

For example, each operating point of the armature current to be supplied to the stator of the motor can be represented by two or more current variables $i_a, i_b, i_c, \ldots$. The number of the flux linkages defined at each operating point of the armature current can be represented as the function of the two or more current variables $i_a, i_b, i_c, \ldots$ by two or more flux-linkage number variables $\Psi_1(i_a, i_b, i_c, \ldots), \Psi_2(i_a, i_b, i_c, \ldots), \Psi_3(i_a, i_b, i_c, \ldots), \ldots$. These two or more flux-linkage number variables $\Psi_1(i_a, i_b, i_c, \ldots), \Psi_2(i_a, i_b, i_c, \ldots), \Psi_3(i_a, i_b, i_c, \ldots), \ldots$ can be stored in the data table T1. This configuration increase the storage capacity of the data table T1, but more increase the accuracy of motor control.

Particularly, in the first embodiment, because the control target of the control system CS is the U-phase, V-phase, and W-phase motor, the armature current to be supplied to the three-phase windings is represented by a U-phase winding current $i_u$, V-phase current $i_v$, and W-phase current $i_w$. When the W-phase current $i_w$ can be expressed by "$i_w = i_u - i_v$". In this case, the number of the flux linkages defined at each operating point of the armature current can be represented as the function of the U-phase and V-phase winding currents $i_u$ and $i_v$ by U-phase, V-phase, and W-phase flux-linkage numbers $\Psi_u(i_u, i_v), \Psi_v(i_u, i_v),$ and $\Psi_w(i_u, i_v)$.

In the first embodiment, the motor 110 illustrated in FIG. 1 is provided with the rotor 111 in which no permanent magnets are installed, but various types of PM (Permanent Magnet) motors can be applied as the control target of the control system CS. These PM motors can increase its efficiently and its size.

Figure 13:
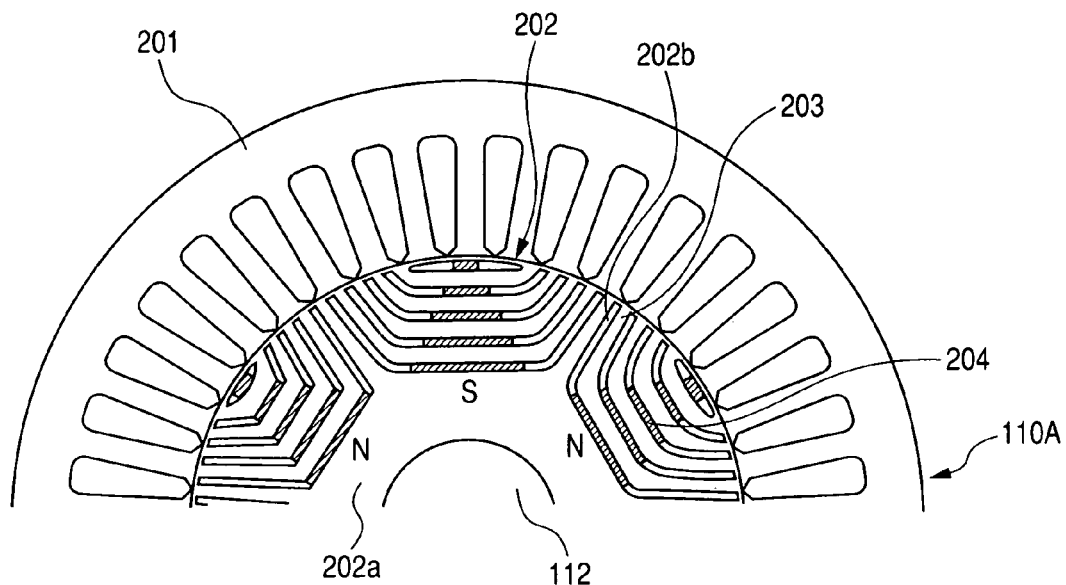
FIG. 13 is a lateral cross sectional view of an example of the structure of a permanent magnet motor according to the first embodiment.

In FIG. 13, a motor 110A is provided with a stator core 201 and a multi flux-barrier rotor 202.

Specifically, the rotor 202 consists of a substantially annular shaped rotor core 202a, a rotor shaft 112 fixed to the inner periphery of the rotor core 202a, and a plurality of flux barrier slits 203 formed in the rotor core 202a like the flux barriers 113 of the motor 110. The rotor 202 also consists of a plurality of permanent magnets, such as NdFeB permanent magnets 104 each installed in the center of a corresponding one of the flux barrier slits 203.

Figure 52:
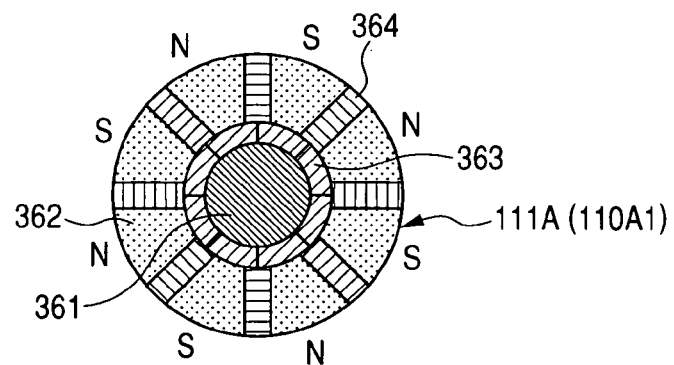
FIG. 52 is a lateral cross sectional view of another example of the structure of a permanent magnet motor according to the first embodiment.

In FIG. 52, a rotor 111A1 of a motor 110A1 consists of a substantially annular shaped rotor core 362 made of a soft magnetic material, a rotor shaft 361 fixed to the inner periphery of the rotor core 362, and a plurality of permanent magnets 363 and 364 radially embedded in the rotor core 362.

Figure 53:
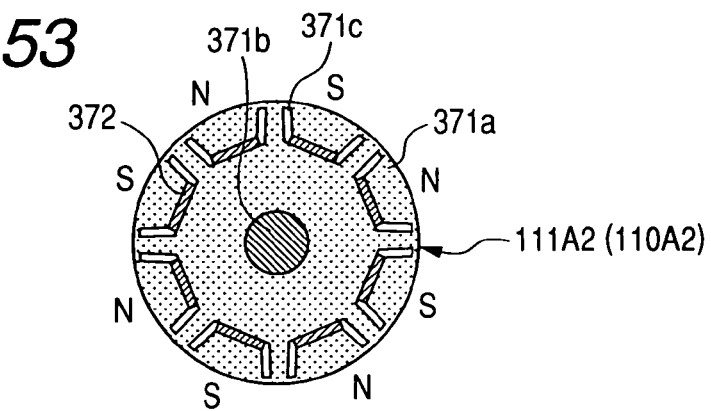
FIG. 53 is a lateral cross sectional view of a further example of the structure of a permanent magnet motor according to the first embodiment.

In FIG. 53, a rotor 111A2 of a motor 110A2 consists of a substantially annular shaped rotor core 371a made of a soft magnetic material, a rotor shaft 371b fixed to the inner periphery of the rotor core 371a, and a plurality of flux barrier slits 371c formed in the rotor core 371a. Each of the flux barriers 371c has a substantially C-shape in its lateral cross section. The flux barrier slits 371c are circumferentially arranged at regular intervals. The rotor 111A2 also consists of a plurality of permanent magnets 372 each installed in the center of a corresponding 6 one of the flux barrier slits 371c.

Figure 54:
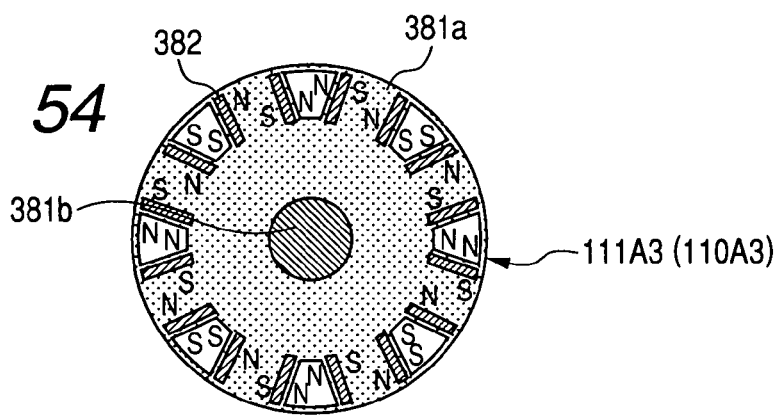
FIG. 54 is a lateral cross sectional view of a still further example of the structure of a permanent magnet motor according to the first embodiment.

In FIG. 54, a rotor 111A3 of a motor 110A3 consists of a substantially annular shaped rotor core 381a made of a soft magnetic material, a rotor shaft 381b fixed to the inner periphery of the rotor core 381a, and a plurality of permanent magnets 382 embedded in the rotor core 381a to be circumferentially arranged at irregular intervals.

Figure 55:
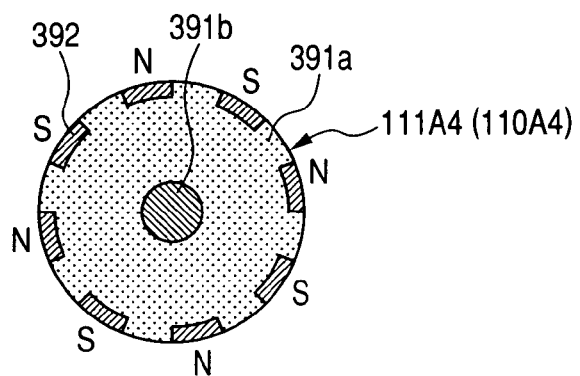
FIG. 55 is a lateral cross sectional view of a still further example of the structure of a permanent magnet motor according to the first embodiment.
Figure 56:
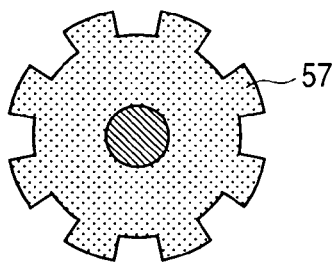
FIG. 56 is a lateral cross sectional view of a still further example of the structure of a salient rotor with salient poles 57 according to the first embodiment.

In FIG. 55, a rotor 111A4 of a motor 110A4 consists of a substantially annular shaped rotor core 391a made of a soft magnetic material, a rotor shaft 391b fixed to the inner periphery of the rotor core 391a, and a plurality of permanent magnets 392 mounted on the outer periphery of the rotor core 391a to be circumferentially arranged at regular intervals.

In each of the PM motors, such as the motors 110A and 110A1 to 110A4, the equation [1] set forth above can be given by the following equation [14] or [15]:

$$\begin{bmatrix} v_d \\ v_q \end{bmatrix} = \begin{bmatrix} R + pL_d & -\omega L_q \\ \omega L_d & R + pL_q \end{bmatrix} \begin{bmatrix} i_d \\ i_q \end{bmatrix} + \begin{bmatrix} -\omega\Psi_{mq} \\ \omega\Psi_{md} \end{bmatrix} \quad \text{[Equation 14]}$$

$$= \begin{bmatrix} p & -\omega \\ \omega & p \end{bmatrix} \begin{bmatrix} \psi_d \\ \psi_q \end{bmatrix} + \begin{bmatrix} -\omega\Psi_{mq} \\ \omega\Psi_{md} \end{bmatrix} + \begin{bmatrix} R & 0 \\ 0 & R \end{bmatrix} \begin{bmatrix} i_d \\ i_q \end{bmatrix} \quad \text{[Equation 15]}$$

Note that the number of flux linkages based on permanent magnet component in d-axis is represented as "$\Psi_{md}$", and the number of flux linkages based on permanent magnet component in q-axis based on permanent magnet is represented as "$\Psi_{mq}$".

Magnetic flux component of permanent magnet that links to d-axis winding is expressed by "d-axis flux linkage component" $\Phi_{md}$, and magnetic flux component of permanent magnet that links to q-axis winding is expressed by q-axis flux linkage component $\Phi_{mq}$. The number of turns of each of d-axis winding and q-axis winding is expressed by "$N_{ss}$".

These parameters expressed set forth above allow the d-axis flux linkage number $\Psi_{md}$ to be represented by the equation "$\Psi_{md} = N_{ss} \times \Psi_{md}$". Similarly, these parameters expressed set forth above allow the q-axis flux linkage number $\Psi_{mq}$ to be represented by the equation "$\Psi_{mq} = N_{ss} \times \Psi_{mq}$".

The magnetic fluxes generated by a permanent magnet directed in a d-axis causes the q-axis flux linkage number $\Psi_{mq}$ to become zero. Note that, strictly speaking, the d-axis flux linkage component $\Psi_{md}$ depends on portions of corresponding d-axis winding, and similarly, the q-axis flux linkage component $\Psi_{mq}$ depends on portions of corresponding q-axis winding. In the first embodiment, the d-axis flux linkage component $\Psi_{md}$ is defined as an average value of the respective d-axis magnetic flux components at the portions of the d-axis. Similarly, the q-axis flux linkage component $\Psi_{mq}$ is defined as an average value of the respective q-axis magnetic flux components at the portions of the q-axis.

In each of the PM motors, such as the motors 110A and 110A1 to 110A4, the equation [2] indicative of the output torque can be converted into the following equation [16] or [17] because of existence of the d-axis flux linkage number $\Psi_{md}$ and the q-axis flux linkage number $\Psi_{mq}$:

$$T = P_n\{(L_d i_d + \Psi_{md})i_q - (L_q i_q + \Psi_{mq})i_d\} \quad \text{[Equation 16]}$$

$$= P_n\{(\Psi_{rd} + \Psi_{md})i_q - (\Psi_{rq} + \Psi_{mq})i_d\} \quad \text{[Equation 17]}$$

$$\Psi_d = \Psi_{rd} + \Psi_{md} \quad \text{[Equation 18]}$$

$$\Psi_q = \Psi_{rq} + \Psi_{mq} \quad \text{[Equation 19]}$$

where $\Psi_{rd}$ represents the d-axis flux linkage number $\Psi_d$ except for the d-axis flux linkage number $\Psi_{md}$, and $\Psi_{rq}$ represents the q-axis flux-linkage number $\Psi_q$ except for the q-axis flux linkage number $\Psi_{mq}$. As described above, Regarding the d-axis flux-linkage number $\Psi_d$ as the sum of the d-axis flux linkage numbers $\Psi_{md}$ and $\Psi_{rd}$ and regarding the q-axis flux-linkage number $\Psi q$ as the sum of the flux linkage numbers $\Psi rq$ and $\Psi_{mq}$ allows the equations [1] to [10] and the data table T1 to be applied to each of the PM motors.

However, in the first embodiment, the d-axis and q-axis flux linkage numbers $\Psi_{md}$ and $\Psi_{mq}$ based on permanent magnet can be handled together with the d-axis and q-axis flux linkage numbers $\Psi_d$ and $\Psi_q$.

Specifically, in this structure of the control system according to the first embodiment, the output torque T and the d-axis and q-axis voltages $v_d$ and $v_q$ of an PM motor as the control target of the control system can be respectively computed in accordance with the equations [8] and/or [10]. This allows the d-axis and q-axis flux linkage numbers $\Psi_{md}$ and $\Psi_{mq}$ to be contained in the d-axis and q-axis flux linkage numbers $\Psi_d$ and $\Psi_q$, respectively. This motor control method (first motor control method) using the d-axis and q-axis flux linkage numbers $\Psi_d$ and $\Psi_q$ respectively containing the d-axis and q-axis flux linkage numbers $\Psi_{md}$ and $\Psi_{mq}$ can simplify the data computing based on the infinite element method and the computing required to control the PM motor as compared with the motor control method (second motor control method) using the d-axis and q-axis flux linkage numbers $\Psi_{md}$ and $\Psi_{mq}$ respectively separated from the d-axis and q-axis flux linkage numbers $\Psi_d$ and $\Psi_q$.

A comparison between the first and second motor control methods is performed. Permanent magnets to be used for motors are designed such that their thicknesses is as thin as possible; this results that the amount of magnet tends to be reduced. Magnetic circuit deign for IPMSMs (Interior Permanent Magnet Synchronous Motors) has used a nonlinear magnetic property and/or magnetic saturation of soft magnetic materials; this can be determined that it is unnecessary to separate the d-axis and q-axis flux linkage numbers $\Psi_{md}$ and $\Psi_{mq}$ from the d-axis and q-axis flux linkage numbers $\Psi_d$ and $\Psi_q$.

The voltage equation [14] using the $\Psi_{md}$ and $\Psi_{mq}$ can be designed by separating the d-axis and q-axis flux linkage components $\Phi_{md}$ and $\Phi_{mq}$ from the number $\Psi$ of flux linkages created by the armature current i; this flux linkage number $\Psi$ is expressed by "$\Psi = L \times i$".

In contrast, using the motor control method, under the inductance L having a nonlinear characteristic curve, based on the table T1 including the d-axis and q-axis flux-linkage numbers $\Psi_{md}(i_d, i_q)$ and $\Psi_{mq}(i_d, i_q)$ allows the d-axis and q-axis flux linkage numbers $\Psi_{md}$ and $\Psi_{mq}$ based on permanent magnet and the d-axis and q-axis flux linkage numbers $\Psi_d$ and $\Psi_q$ based on the armature current to be handled together.

A plurality of points on a predetermined function of the flux linkage number $\Psi$ ($\Psi_d$ and $\Psi_q$), such as a function relative to the flux linkage number $\Psi$, can be stored in the data table T1. As an example of the predetermined function, the fraction of the flux linkage number $\Psi$ over the armature current i, expressed by "$\Psi/i$" can be used; this fraction represents the inductance L.

In addition, the sum of the flux linkage numbers $\Psi_d$ and $\Psi_q$ and constant values corresponding to the d-axis and q-axis flux linkage numbers $\Psi_{md}$ and $\Psi_{mq}$ for each operating point can be stored in the data table T1. As another example of the predetermined function, the function of the flu linkage number $\Psi$ and the number of turns of d-axis and q-axis windings can be used; this can practically represent the flux linkage number $\Psi$. As a further example of the predetermined function, an averaged magnetic flux density relative to the flux linkage number $\Psi$ can be used.

Specifically, when using the data table T1 to compute the equations set forth above, the control system CS can generate a new data table based on the data table T1 and store it; this new data table, for example, allows the control system CS to more easily compute the equations set forth above.

For example, the d-axis flux-linkage number $\Psi_d(i_d, i_q)$ and the q-axis flux-linkage number $\Psi_q$ can be respectively converted into the d-axis and q-axis inductances $L_d(i_d, i_q)$ and $L_q(i_d, i_q)$ in accordance with the relationships therebetween shown in the equations [6] and [7].

The d-axis and q-axis inductances $L_d(i_d, i_q)$ and $L_q(i_d, i_q)$ stored in the data table T2 and expressed by the equations [6] and [7] represents d-axis and q-axis average inductances at each operating point ($i_d, i_q$) of the armature current. For the motor current control, d-axis and q-axis narrow-range inductances in response to respective minimal changes of the d-axis and q-axis currents $i_d$ and $i_q$ are required. Thus, d-axis and q-axis narrow-range inductances within narrow ranges of the d-axis and q-axis currents $i_d$ and $i_q$ of each operating point can be stored in the data table T2 in addition to the d-axis and q-axis average inductances or in place thereto.

The number of flux linkages can be individually handled as the flux linkage number based on permanent magnet and the flux linkage number except therefor (see the equations [18] and [19]). For this reason, the flux linkage numbers $\Psi_d$ and $\Psi_q$ and constant values corresponding to the d-axis and q-axis flux linkage numbers $\Psi_{md}$ and $\Psi_{mq}$ for each operating point can be stored in the data table T1.

The number $\Psi_1$ of flux linkages at a portion of a phase winding is represented by the product of a flux linkage component $\Phi_1$ linking thereto and the number $N_{s1}$ of turns of the phase winding; this is expressed by the following equation:

$$\Psi_1 = \Phi_1 \times N_{s1} \quad \text{[Equation 20]}$$

For example, the d-axis flux-linkage number $\Psi_d(i_d, i_q)$ to a d-axis winding can be generated as the d-axis flux linkage components $\Phi_d(i_d, i_q)$; these d-axis flux linkage components $\Phi_d(i_d, i_q)$ can be easily obtained by dividing the $\Psi_d(i_d, i_q)$ by the number of turns of the d-axis winding.

The flux linkage component $\Phi_1$ can be expressed as the product of an averaged magnetic flux density $B_1$ and an area $S_1$ of the d-axis winding; this product is expressed by the following equation [21]:

$$\Psi_1 = B_1 \times S_1 \times N_{s1} \quad \text{[Equation 21]}$$

The d-axis and q-axis inductances $L_d$ and $L_q$ can be expressed in another format because of the simplicity of the computing to be executed by the control system CS. For example, the d-axis and q-axis inductances $L_d$ and $L_q$ can be expressed by the following equations:

$$Ld = Li + Lm \quad \text{[Equation 22]}$$

$$Lq = Li - Lm \quad \text{[Equation 23]}$$

These inductances $L_i$ and $L_m$ can be referred to as "mirror-phase inductances". The d-axis and q-axis inductances $L_d(i_d, i_q)$ and $L_q(i_d, i_q)$ stored in the data table T2 can be converted into the mirror-phase inductances $L_d$ and $L_m$.

Use of the d-axis and q-axis flux-linkage numbers $\Psi_d(i_d, i_q)$ and $\Psi_q(i_d, i_q)$ stored in the table T1 allows them to be converted into a function or an approximate function of the d-axis and q-axis currents $i_d$ and $i_q$. For example, the d-axis and q-axis flux-linkage numbers $\Psi_d(i_d, i_q)$ and $\Psi_q(i_d, i_q)$ can be expressed by the following function expressions:

$$\Psi_d(i_d, i_q) = (A - B \times i_d - C \times i_d^2) L_1 + (D - E \times i_q^2) L_2 \quad \text{[Equation 24]}$$

$$\Psi_q(i_d, i_q) = (F - G \times i_d) L_3 + (H - I \times i_q) L_4 \quad \text{[Equation 25]}$$

where A, B, C, D, E, F, G, H, and I, and L1, L2, L3, and L4 are each constant. These constants A, B, C, D, E, F, G, H, and I, and L1, L2, L3, and L4 are obtained by simulating a computer-based motor model as the control target for the control system CS with the use of, for example, the infinite element method. These constants A, B, C, D, E, F, G, H, and I, and L1, L2, L3, and L4 are stored, as control parameters (CP), in the control system CS in place of or in addition to the data tables T1 and T2. The control system CS works to compute the d-axis and q-axis flux-linkage numbers $\Psi_d(i_d, i_q)$ and $\Psi_q(i_d, i_q)$ or the d-axis and q-axis inductances $L_d(i_d, i_q)$ and $L_q(i_d, i_q)$ at the respective up to 100 operating points based on the control parameters CP stored in the control system CS (see FIG. 4).

At least one of the equations [24] and [25] has a nonlinear magnetic characteristic curve, or depends on the mutual interference between the d-axis current $i_d$ and q-axis current $i_q$ of the armature current.

As described above, the d-axis and q-axis currents $i_d$ and $i_q$, the d-axis and q-axis flux-linkage numbers $\Psi_d(i_d, i_q)$ and $\Psi_q(i_d, i_q)$ at the respective up to 100 operating points are stored in the data table T1 as discrete pieces of data. For this reason, when the d-axis and q-axis flux-linkage numbers $\Psi_d(i_d, i_q)$ and $\Psi_q(i_d, i_q)$ corresponding to one specified operating point $(i_d, i_q)$ that exists among the discrete values of the table T1, they can be estimated by interpolation from some of the discrete values around the one specified operating point set forth above.

As a specific example of the interpolation, when the values $(i_{dk}, i_{qk})$ is specified as one operating point (0<k<n, m; k is an integer), the control system CS extracts the pair of $\Psi_d(i_{dk-1}, i_{qk})$ and $\Psi_q(i_{dk-1}, i_{qk})$, the pair of $\Psi_d(i_{dk-1}, i_{qk-1})$ and $\Psi_q(i_{dk-1}, i_{qk-1})$, the pair of $\Psi_d(i_{dk+1}, i_{qk})$ and $\Psi_q(i_{dk+1}, i_{qk})$, and the pair of $\Psi_d(i_{dk}, i_{qk+1})$ and $\Psi_q(i_{dk+1}, i_{qk+1})$ from the data table T1.

Next, the control system CS computes interpolation based on the extracted four pairs to obtain the d-axis and q-axis flux-linkage numbers $\Psi_d(i_{dk}, i_{qk})$ and $\Psi_q(i_{dk}, i_{qk})$ based on the result of interpolation. Normal methods of approximately computing the d-axis and q-axis flux-linkage numbers $\Psi_d(i_d, i_q)$ and $\Psi_q(i_d, i_q)$ at a specified operating point based on pieces of discrete flux-linkage numbers corresponding to a range around the specified operating point can be applied to the control system CS.

Next, an example of how to compute the d-axis and q-axis flux-linkage numbers $\Psi_d(i_d, i_q)$ and $\Psi_q(i_d, i_q)$ in one of the motors illustrated in FIGS. 1, 5, 6, and 7 will be described hereinafter.

For example, as illustrated in FIGS. 5 to 7, the number of magnetic fluxes linked to each of the U-phase, V-phase, and W-phase windings 151, 152, and 153 is measured. The d-axis and q-axis flux-linkage numbers $\Psi_d(i_d, i_q)$ and $\Psi_q(i_d, i_q)$ are obtained based on the measured number of magnetic fluxes linked to each of the U-phase, V-phase, and W-phase windings 151, 152, and 153.

Next, how to obtain the number of magnetic fluxes linked to a winding will be described hereinafter.

FIG. 8 is a schematically illustrates a modeled winding 611 having one end 612 and the other end 613 and a total magnetic flux 615 containing: a current-related flux due to a current 614 flowing through the winding; and another flux.

The modeled winding 611 is installed in the rotor of the motor model illustrated in FIG. 1 or 5, and therefore the length between the one and the other ends of the winding 611 corresponds to a laminated thickness t of the stator core.

A value A of a vector potential is created at each point of the winding 611 by a total magnetic field therearound. The vector potential A at each point of the winding 611 is integrated from the one end 612 to the other end 613; this integration provides a total flux linkage component $\Phi$. As described above, the number $\Psi_1$ of flux linkages at a portion of the winding 611 is represented by the product of a flux linkage component $\Phi_1$ linking thereto and the number $N_{s1}$ of turns of the winding 611; this is expressed by "$\Psi 1 = \Phi 1 \times Ns1$".

Because the winding model 611 is to be installed in the two-dimensional motor, it is not a closed circuit, A model per unit length of the laminated thickness t of the stator core and the vector potential based on the model are analyzed by the infinite element method, and the laminated thickness t of the stator core is proportionally multiplied to the analyzed vector potential; this provides the integrated value of the vector potential.

Note that, when a winding has a closed circuit structure, integration of the vector potential A therealong provides a flux linkage component $\Phi$ linking to the closed-circuit winding; this results that the number $\Psi$ of flux linkages at the closed-circuit winding is obtained as the product of the flux linkage component $\Phi$ linking thereto and the number $N_s$ of turns of the closed-circuit winding; this is expressed by "$\Psi = \Phi \times Ns$".

As well as FIG. 8, a total flux linkage component $\Phi 1$ linking to a portion of the U-phase winding 151 installed in the slot ① is obtained by integrating the vector potential of the ①-slot installed portion of the U-phase winding 151 along the ①-slot installed portion thereof.

Similarly, a total flux linkage component $\Phi_7$ linking to a portion of the U-phase winding 151 installed in the slot ⑦ is obtained by integrating the vector potential of the ⑦-slot installed portion of the U-phase winding 151 along the ⑦-slot installed portion thereof.

Thus, the total magnetic flux linking to the ①-slot installed portion and ⑦-slot installed portion of the U-phase winding 151 is represented by the difference between the total flux linkage component $\Phi_1$ and the total flux linkage component $\Phi_7$; this total flux linkage component linking to the ①-slot installed portion and ⑦-slot installed portion is expressed by "$\Phi 1 - \Phi 7$".

Similarly, the total magnetic flux lining to the ①-slot installed portion and ⑦-slot installed portion of the U-phase winding 151 is represented by the difference between a total flux linkage component $\Phi_2$ and the total flux linkage component $\Phi_8$ obtained in the same manner as the total flux linkage component $\Phi_1$ and the total magnetic flux $\Phi_7$; this total magnetic flux linking to the ②-slot installed portion and ⑧-slot installed portion is expressed by "$\Phi_2 - \Phi_8$".

Specifically, assuming that the number of turns of each portion of the U-phase winding 151 in a corresponding one of the slots of the stator core is $N_s$, the number $\Psi_u$ of flux linkages to the U-phase winding 151 is represented by the following equation:

$$\Psi_u = (\phi_1 - \phi_7)Ns + (\phi_2 - \phi_8)Ns$$

The number $\Psi_v$ of flux linkages to the V-phase winding 152 and the umber $\Psi_w$ of flux linkages to the W-phase winding 153 can be obtained in the same manner as the number $\Psi_u$ of flux linkages to the U-phase winding 151.

Next, how to specifically obtain the d-axis and q-axis flux-linkage numbers $\Psi_d(i_d, i_q)$ and $\Psi_q(i_d, i_q)$ using pieces of analyzed data obtained using the infinite element method and the model of the three-phase full-pitch or short-pitch winding motor illustrated in FIGS. 1, 5, 6, and 7 will be described hereinafter as the following steps (a) to (g).

Step (a)

As the computing of d-axis and q-axis current components in the d-q coordinate system, d-axis and q-axis current components $i_{d1}$ and $i_{q1}$ at an operating point of an armature current to be valued on the d-q coordinate system are given by the equations [12] and [13] set forth above based on an amplitude $i_a$ and controlled phase angle $\theta c$ of an armature current.

Step (b)

Next, the amplitude of each of the d-axis and q-axis current components $i_{d1}$ and $i_{q1}$ is converted into an amplitude thereof on the d-q coordinate system as d-axis and q-axis current components $i_{d2}$ and $i_{q2}$; this conversion of each of the d-axis and q-axis current components $i_{d1}$ and $i_{q1}$ is expressed by the following equations:

$$i_{d2} = mt;epmrl;\sqrt{2/3}rlxmx \cdot i_{d1} \qquad \text{[Equation 27]}$$

$$i_{q2} = mt;epmrl;\sqrt{2/3}rlxmx \cdot i_{q1} \qquad \text{[Equation 28]}$$

Step (c)

The d-axis and q-axis current components $i_{d2}$ and $i_{q2}$ are converted into d-axis and q-axis current components $i_{d3}$ and $i_{q3}$ whose phase allows the amplitude value of current in the U-phase winding entirely flows toward the V-phase winding in accordance with the following equations.

In other words, the d-axis and q-axis current components $i_{d2}$ and $i_{q2}$ are converted into d-axis and q-axis current components $i_{d3}$ and $i_{q3}$ such that the maximum value of the d-axis and q-axis current components $i_{d2}$ and $i_{q2}$ leads at 30 degrees electric angle in phase in accordance with the following equations:

$$i_{d3} = \sqrt{3}/2 \cdot i_{d2} \qquad \text{[Equation 29]}$$

$$i_{q3} = \sqrt{3}/2 \cdot i_{q2} \qquad \text{[Equation 30]}$$

Step (d)

In order to execute analysis based on the infinite element method, the d-axis and q-axis current components $i_{d3}$ and $i_{q3}$ are converted in three-phase winding currents $i_u$, $i_v$, and $i_w$ based on the amplitude $i_a$ and controlled phase angle $\theta c$ of the armature current in accordance with the following equations:

$$i_u = mt;epmrl;\sqrt{2/3}rlxmx \cdot i_s \cdot \sin\theta c \qquad \text{[Equation 31]}$$

$$i_v = mt;epmrl;\sqrt{2/3}rlxmx \cdot i_n \cdot \sin(\theta c - 2\pi/3) \qquad \text{[Equation 32]}$$

$$i_w = mt;epmrl;\sqrt{2/3}rlxmx \cdot i_s \cdot \sin(\theta c - 4\pi/3) \qquad \text{[Equation 33]}$$

While these three-phase currents $i_u$, $i_v$, and $i_w$ are respectively supplied to the three-phase windings of the motor model 110 illustrated in FIG. 10, an analysis with the infinite element method is carried out; this results that the output torque $T_1$ of the motor 110 and flux linkage components $\Phi_1$ to $\Phi_{36}$ to the respective three-phase windings per unit length of the laminated thickness to of the stator core illustrated in FIG. 1 are computed.

Note that, as an analysis condition, the rotor is fixed such that the d and q axes are located at the rotational position illustrated in FIG. 5. In other words, the d-axis of the rotor is directed to the intermediate portion between the slots ① and ②. At the rotor being located at the rotational position illustrated in FIG. 5, the flux linkage components $\Phi_1$ to $\Phi_{36}$ to the respective three-phase windings per unit length of the laminated thickness to of the stator core are computed by integrating the vector potential A at each point of each of the three-phase windings therealong. The same is true in three-dimensional three-phase windings of the stator.

Step (e)

As a d-axis flux linkage number $\Psi_{d3}$, a d-axis flux linkage number to two-phase series-connected windings of the star configuration of the three-phase windings directed in the d-axis is computed. For example, this computing of the d-axis flux linkage number $\Psi_{d3}$ uses a relationship in that the half of an inductance $L_{xy}$ between two terminals of the star configuration is equivalent to the d-axis inductance $L_d$, this relationship is expressed by "$L_d = \frac{1}{2} L_{xy}$".

Note that, while the rotational position of the rotor is changed, when an inductance between the two terminals of the three-phase windings in the star configuration becomes a maximum value, this maximum inductance is referred to as "$L_{max}$", and when it becomes a minimum value, this minimum inductance is referred to as "$L_{min}$. Using the maximum and minimum inductances $L_{max}$ and $L_{min}$ allows the d-axis inductance $L_d$ to be represented as "$L_d = L_{max}/2$", and the q-axis inductance $L_q$ to be represented as "$L_q = L_{min}/2$".

As described above, in the first embodiment, a first rotational position of the rotor when the inductance between the two terminals of the three-phase windings in the star configuration becomes the maximum inductance $L_{max}$ and a second rotational position of the rotor when the inductance between the two terminals of the three-phase windings in the star configuration becomes the minimum inductance $L_{min}$ are used. When the rotor is located at an intermediate rotational position $\theta x$ of the rotor between the first and second rotational positions, the metered inductances $L_u$, $L_v$, and $L_w$ of the U-phase, V-phase, and W-phase windings have a predetermined relationship to the d-axis and q-axis inductances $L_d$ and $L_q$. The predetermined relationship therefore allows the d-axis and q-axis inductances $L_d$ and $L_q$ to be obtained based on the measured inductances $L_u$, $L_v$, and $L_w$ of the U-phase, V-phase, and W-phase windings.

Note that the d-axis current component $i_{d3}$ expressed by the equation [29] is assumed to flow from the ⑨, ⑩, ⑪, and ⑫ slot-installed portions to the ③, ④, ⑤, and ⑥ slot-installed portions, respectively.

At that time, the d-axis flux linkage number $\Psi_{d3}(i_{d1}, i_{q1})$ is given by the following equation:

$$\Psi_{d3}(i_{d1}, i_{q1}) = \{(\phi_9 - \phi_3) + (\phi_{10} - \phi_4) + (\phi_{11} - \phi_5) + (\phi_{12} - \phi_6)\} \times N_S \times t_C/t_0 \times Pn \qquad \text{[Equation 34]}$$

where $\Phi_9$, $\Phi_{10}$, $\Phi_{11}$, $\Phi_{12}$, $\Phi_5$, $\Phi_6$, $\Phi_7$, and $\Phi_8$ respectively correspond to flux linkage components linked to the ⑨, ⑩, ⑪, ⑫, ③, ④, ⑤, and ⑥ slot-installed portions, $N_S$ represents the number of turns of each of the ⑨, ⑩, ⑪, ⑫, ③, ④, ⑤, and ⑥ slot-installed portions in a corresponding one of the slots, $t_c$ represents the laminated thickness of the stator core, $P_n$ represents the number of pole pair, such as "6/2=3" in the motor 110 illustrated in FIG. 1.

In order to reduce ripples contained in the output torque of the motor, the rotor can be designed to have different shapes individually determined based on the respective pole pairs. In this case, the computing of the equation [34] are repeatedly executed for the respective 36 slots; this can reduce the term of $P_n$ from the equation [34].

Similarly, a q-axis flux-linkage number $\Psi_{q3}(i_{d1}, i_{q1})$ to two-phase series-connected windings of the star configuration of the three-phase windings directed in the q-axis is computed in accordance with the following equation [35] assuming that the d-axis current component $i_{d3}$ expressed by the equation [29] flows from the ⑫, ①, ②, and ③ slot-installed portions to the ⑥, ⑦, ⑧, and ⑨ slot-installed portions:

$$\Psi_{q3}(i_{d1},i_{q1})=\{(\phi_{12}-\phi_6)+(\phi_1-\phi_7)+(\phi_2-\phi_8)+(\phi_3-\phi_9)\} \times N_S \times t_c/t_0 \times Pn \quad \text{[Equation 35]}$$

where $\Phi_{12}$, $\Phi_1$, $\Phi_2$, $\Phi_3$, $\Phi_6$, $\Phi_7$, $\Phi_8$, and $\Phi_9$ respectively correspond to flux linkage components linked to the ⑫, ①, ②, and ③ slot-installed portions to the ⑥, ⑦, ⑧, and ⑨ slot-installed portions; $N_S$ represents the number of turns of each of the ⑫, ①, ②, ③, ⑥, ⑦, ⑧, and ⑨ slot-installed portions in a corresponding one of the slots.

Step (f)

D-axis and q-axis inductances $L_d$ and $L_q$ between two terminals of the three-phase windings 151, 152, and 153 in the star configuration on the stationary coordinate system illustrated in FIG. 6 are computed in accordance with the following equations:

$$L_{d3}(i_{d1},i_{q1})=\Psi_{d3}(i_{d1},i_{q1})/i_{d3} \quad \text{[Equation 36]}$$

$$L_{q3}(i_{d1},i_{q1})=\Psi_{q3}(i_{d1},i_{q1})/i_{q3} \quad \text{[Equation 37]}$$

Step (g)

The d-axis and q-axis inductances $L_d$ and $L_q$ are computed in accordance with the following equations using the relationship representing that the d-axis inductance $L_d$ is the half of the maximum inductance $L_{max}$ and the relationship representing that the q-axis inductance $L_q$ is the half of the maximum inductance $L_{min}$:

$$L_d(i_{d1},i_{q1})=\tfrac{1}{2} \times L_{d3}(i_{d1},i_{q1}) \quad \text{[Equation 38]}$$

$$L_q(i_{d1},i_{q1})=\tfrac{1}{2} \times L_{q3}(i_{d1},i_{q1}) \quad \text{[Equation 39]}$$

The descriptions associated with the equations [34] and [35] set forth above show how to obtain the number of flux linkages created in the configuration of the motor M1 whose cross section is illustrated in FIG. 5.

Specifically, when a d-axis current component is supplied to flow through a winding, a d-axis flux linkage component linked to the winding is detected so that the flux linkage number $\Psi_{d3}(i_{d1}, i_{q1})$ is obtained based on the detected d-axis flux component.

Similarly, when a q-axis current component is supplied to flow through a winding, a q-axis flux linkage component linked to the winding show how to obtain the number of flux linkages created in the configuration of the motor M1 whose cross section is illustrated in FIG. 5, is detected so that the flux linkage number $\Psi_{q3}(i_{d1}, i_{q1})$ is obtained based on the detected q-axis flux component.

Other methods physically and technically equivalent to the flux-linkage number obtaining method in accordance with the equations [34] and [35] set forth above can be shown in their respective other expression forms.

One of the other methods of obtaining the number of flux-linkages will be schematically described hereinafter. The one of the other methods is configured first to redefine the positive and negative signs assigned to the flux linkages respectively to the ① to ⑫ slot-installed portions of the U-phase, V-phase, and W-phase windings.

Next, the one of the other methods is configured to obtain the number of d-axis flux linkages and that of q-axis flux linkages based on the redefined flux linkages respectively to the ① to ⑫ slot-installed portions of the U-phase, V-phase, and W-phase windings.

How to define the sign of each of the flux linkages $\Phi_1$ to $\Phi_{12}$ respectively to the ① to ⑫ slot-installed portions of the U-phase, V-phase, and W-phase windings will be described hereinafter.

Specifically, the sign of each of the flux linkages $\Phi_1$ to $\Phi_{12}$ is determined such that the d-axis flux linkage component of a corresponding one of the flux linkages $\Phi_1$ to $\Phi_{12}$ becomes positive based on the geometric positional relationship between each of the slots ① to ⑫ and the d-axis.

For example, in FIG. 5, the flux age components $\Phi_8$, $\Phi_9$, $\Phi_{10}$, $\Phi_{11}$, $\Phi_{12}$, and $\Phi_1$ respectively to the ⑧, ⑨, ⑩, ⑪, ⑫, and ① slot-installed portions of the U-phase, V-phase, and W-phase windings are kept unchanged in sign of measurement; these ⑧, ⑨, ⑩, ⑪, ⑫, and ① slot-installed portions are arranged at one side (for example, lower side in FIG. 5) with respect to the d-axis.

In contrast, the flux linkage components $\Phi_7$, $\Phi_6$, $\Phi_5$, $\Phi_4$, $\Phi_3$, and $\Phi_2$ respectively to the ⑦, ⑥, ⑤, ④, ③, and ② slot-installed portions of the U-phase, V-phase, and W-phase windings are changed in sign of measurement by multiplying them by −1; these ⑦, ⑥, ⑤, ④, ③, and ② slot-installed portions are arranged at the other side (for example, upper side in FIG. 5) with respect to the d-axis.

Multiplying each of the flux linkage components $\Phi_1$ to $\Phi_{12}$ some of which are changed in sign of measurement set forth above by the number $N_S$ of turns of a corresponding on of the ① to ⑫ slot-installed portions of the three-phase windings provides the number of each of the flux linkage components $\Phi_1$ to $\Phi_{12}$ linking to a corresponding one of the ① to ⑫ slot-installed portions of the three-phase windings.

Thereafter, the flux linkage components $\Phi_1$ to $\Phi_{12}$ linking to a corresponding one of the ① to ⑫ are added to each other, and the result value of the addition is multiplied by the number $P_n$ of pole pair and by the ratio "$t_c/t_0$" of the laminated thickness $t_c$ of the stator core to the unit length $t_0$ of the laminated thickness thereof. These calculations allows $\Psi_{d3}(i_{d1}, i_{q1})$ to be obtained.

The upper side of the d-axis and the lower side thereof represent the direction of each of the ① to ⑫ slot-installed portions of the three-phase windings. In this sense, in FIG. 5, the U-phase winding composed of the ① slot-installed portion and the ⑦ slot-installed portion and the U-phase winding composed of the ② slot-installed portion and the ⑧ slot-installed portion are connected to each other in series to form the U-phase coil. For this reason, it is impossible to separate the pair of ① slot-installed portion and the ⑦ slot-installed portion from the pair of the ② slot-installed portion and the ⑧ slot-installed portion and to individually change their signs of the respective pairs.

Specifically, in FIG. 5, the electromagnetic force induced by the U-phase current is directed to the q-axis, and therefore, the U-phase current flowing through the U-phase coil does not induce the d-axis current component. For this reason, the d-axis flux linkage component linked to the pair of ① and ⑦ slot-installed portions of the U-phase winding and that linked to the pair of ② and ⑧ slot-installed portions of the U-phase winding are cancelled out each other. Because the pair of ① and ⑦ slot-installed portions of the U-phase winding and the pair of ② and ⑧ slot-installed portions of the U-phase winding are connected to each other in series, the positive and negative signs to be assigned to the respective ① and ⑦ slot-installed portions and ② and ⑧ slot-installed portions of the U-phase winding are redetermined.

These descriptions can be expressed by the following equation:

$$\Psi_{d3}(i_{d1},i_{q1})=\{(\phi_9+\phi_{10}+\phi_{11}+\phi_{12}-\phi_6-\phi_5-\phi_4-\phi_3)+(\phi_1-\phi_7+\phi_2-\phi_8)\}\times N_F\times(t_c/t_0)\times P_n \quad \text{[Equation 39A]}$$

In FIG. 5, the term $(\phi_1-\phi_7+\phi_2-\phi_8)$ becomes zero so that the equation [39A] is matched with the equation [34].

These descriptions for the d-axis can be established for the q-axis. Specifically, the following equation [39B] can be effected:

$$\Psi_{q3}(i_{d1},i_{q1})=\{(\phi_{12}+\phi_1+\phi_2+\phi_3-\phi_6-\phi_7-\phi_8-\phi_9)+(\phi_4-\phi_{10}+\phi_5-\phi_{11})\}\times N_s\times(t_c/t_0)\times P_n \quad \text{[Equation 39B]}$$

In FIG. 5, the term $(\phi_4-\phi_{10}+\phi_5-\phi_{11})$ corresponding to the pair of ④ and ⑩ slot-installed portions of the W-phase winding and the pair of ⑤ and ⑪ slot-installed portions of the W-phase winding becomes zero so that the equation [39B] is matched with the equation [35].

Next, let us consider that, from the rotor state illustrated in FIG. 5, the rotor is rotated clockwise by an angle lower than a predetermined angle corresponding to 1 slot pitch. In this state, a positive d-axis current component flows through the ① and ⑦ slot-installed portions and ② and ⑧ slot-installed portions of the U-phase winding so that the term $(\phi_1-\phi_7+\phi_2-\phi_8)$ is unequal to zero; this results that the second term $(\phi_1-\phi_7+\phi_2-\phi_8)$ in the braces of the equation [39A] becomes effective.

In contrast, let us consider that, from the rotor state illustrated in FIG. 5, the rotor is rotated counterclockwise by an angle lower than the predetermined angle corresponding to 1 slot pitch. In this state, a negative d-axis current component flows through the ① and ⑦ slot-installed portions and ② and ⑧ slot-installed portions of the U-phase winding so that the sign of the term $(\phi_1-\phi_7+\phi_2-\phi_8)$ need to be reversed; this results that the number $\Psi_{d3}(i_{d1}, i_{q1})$ of d-axis flux linkage components is represented by the following equation:

$$\Psi_{d3}(i_{d1},i_{q1})=[(\phi_9+\phi_{10}+\phi_{11}+\phi_{12}-\phi_6-\phi_5-\phi_4-\phi_3)-(\phi_1-\phi_7+\phi_2-\phi_8)]\times N_s\times(t_c/t_0)\times P_n \quad \text{[Equation 39C]}$$

The same is true in the q-axis. Specifically, let us consider that, from the rotor state illustrated in FIG. 5, the rotor is rotated clockwise by an angle lower than a predetermined angle corresponding to 1 slot pitch. In this state, a positive q-axis current component flows through the ④ and ⑩ slot-installed portions and ⑤ and ⑪ slot-installed portions of the W-phase winding so that the term $(\phi_4-{}_{10}+\phi_5-\phi_{11})$ is unequal to zero; this results that the second term $(\phi_4-\phi_{10}+\phi_5-\phi_{11})$ in the braces of the equation [39B] becomes effective.

In contrast, let us consider that, from the rotor state illustrated in FIG. 5, the rotor is rotated counterclockwise by an angle lower than the predetermined angle corresponding to 1 slot pitch. In this state, a negative q-axis current component flows through the ④ and ⑩ slot-installed portions and ⑤ and ⑪ slot-installed portions of the W-phase winding so that the sign of the term $(\phi_4-\phi_{10}+\phi_5-\phi_{11})$ need to be reversed; this results that the number $\Psi_{q3}(i_{d1}, i_{q1})$ of q-axis flux linkage components is represented by the following equation:

$$\Psi_{q3}(i_{d1},i_{q1})=\{(\phi_{12}+\phi_1+\phi_2+\phi_3-\phi_6-\phi_7-\phi_8-\phi_9)-(\phi_4-\phi_{10}+\phi_5-\phi_{11})\}\times N_s\times(t_c/t_0)\times P_n \quad \text{[Equation 39D]}$$

As set forth above, even if the d-axis flux linkage number $\Psi_{d3}(i_{d1}, i_{q1})$ and q-axis flux linkage number $\Psi_{q3}(i_{d1}, i_{q1})$ need to be obtained when the rotor is slightly rotated clockwise or counterclockwise from the rotor state illustrated in FIG. 5, it is possible to compute them with the use of at least one of the equations [39A] to [39D].

In addition, when the rotor is rotated clockwise or counterclockwise by the predetermined angle of 1 slot pitch, it is possible to compute the d-axis flux linkage number $\Psi_{d3}(i_{d1}, i_{q1})$ and q-axis flux linkage number $\Psi_{q3}(i_{d1}, i_{q1})$ while the motor model based on the analysis of the infinite element method is returned to the rotor state illustrated in FIG. 5.

The value of each of the d-axis flux linkage number $\Psi_{d3}(i_{d1}, i_{q1})$ q-axis flux linkage number $\Psi_{q3}(i_{d1}, i_{q1})$, the d-axis inductance $L_{d3}(i_{d1}, i_{q1})$, and q-axis inductance $L_{q3}(i_{d1}, i_{q1})$ can be used to be converted by at least one predetermined rule within the scope of the descriptions set forth above.

Note that a spreadsheet for computing the d-axis and q-axis inductances $L_d$ and $L_q$ can be provided. Input of the flux linkage components $\Phi_1$ to $\Phi_{36}$ and the vector potential A computed by the analysis with the infinite element method to the spreadsheet allows the equations [27] to [39] to be simply calculated. Therefore, the d-axis and q-axis inductances $L_d(i_{d1}\ i_{q1})$ and $L_q(i_{d1}\ i_{q1})$ of the armature current $(i_{d1}, i_{q1})$ is obtained as the data table T1 illustrated in FIG. 9.

The $L_d(i_{d1}, i_{q1})$ of the armature current $(i_{d1}, i_{q1})$ allows the d-axis and q-axis flux linkage numbers $\Psi_d(i_{d1}, i_{q1})$ and $\Psi_q(i_{d1}, i_{q1})$ to be calculated in accordance with the following equations:

$$\Psi_d(i_{d1},i_{q1})=L_d(i_{d1},i_{q1})\times i_{d1} \quad \text{[Equation 40]}$$

$$\Psi_q(i_{d1},i_{q1})=L_q(i_{d1},i_{q1})\times i_{q1} \quad \text{[Equation 41]}$$

In accordance with the flux linkage numbers $\Psi_{d3}(i_{d1}, i_{q1})$ and $\Psi_{q3}(i_{d1}, i_{q1})$ obtained by the equations [34] and [35], the d-axis and q-axis flux linkage numbers $\Psi_d(i_{d1}\ i_{q1})$ and $\Psi_q(i_{d1}\ i_{q1})$ to be directly calculated without calculating the d-axis and q-axis inductances $L_d(i_{d1}\ i_{q1})$ and $L_q(i_{d1}\ i_{q1})$.

The direct calculation of the d-axis and q-axis flux linkage numbers $\Psi_d(i_{d1}\ i_{q1})$ and $\Psi_q(i_{d1}\ i_{q1})$ can be calculated in accordance with the following equations [42] and [43] obtained using the equations [38], [39], [27], [28], [29], [30], and [34]:

$$\begin{aligned}\Psi_d(i_{d1},i_{q1}) &= Ld(i_{d1},i_{q1})\times i_{d1} \\ &= 1/2\times L_{d3}(i_{d1},i_{q1})\times i_{d2}/\sqrt{2/3} \\ &= 1/2\times L_{d3}(i_{d1},i_{q1})\times \\ &\quad i_{d3}/(\sqrt{3}/2)\times 1/\sqrt{2/3} \\ &= 1/\sqrt{2}\times L_{d3}(i_{d1},i_{q1})\times i_{d3} \\ &= 1/\sqrt{2}\times \Psi_{d3}(i_{d1},i_{q1})\end{aligned} \quad \text{[Equation 42]}$$

$$\Psi_q(i_{d1},i_{q1})=1/\sqrt{2}\times\Psi_{q3}(i_{d1},i_{q1}) \quad \text{[Equation 43]}$$

In accordance with the equations [27] to [43] set forth above, use of the flux linkage components $\Phi_1$ to $\Phi_{36}$ and the vector potential A computed by the analysis with the infinite element method allows the d-axis and q-axis flux ligase numbers $\Psi_d(i_{d1}\ i_{q1})$ and $\Psi_q(i_{d1}\ i_{q1})$ and/or the d-axis and q-axis inductances $L_d(i_{d1}\ i_{q1})$ and $L_q(i_{d1}\ i_{q1})$ at each operating point $(i_{d1}\ i_{q1})$ of the armature current to be obtained.

When up to 100 operating points of the d-axis and q-axis currents $i_d$ and $i_q$ are selected, the d-axis and q-axis flux-linkage numbers $\Psi_d(i_d, i_q)$ and $\Psi_q(i_d, i_q)$ at the respective up to 100 operating points are computed by the computer with the use of the analysis with the infinite element method. This result of the computing allows the data table T1 having the (10×10) array size illustrated in FIG. 10 to be created, and the created data table T1 has been stored in the control system CS (see FIG. 4).

Note that the computation amount required to obtain the d-axis and q-axis flux-linkage numbers $\Psi_d(i_d, i_q)$ and $\Psi_q(i_d, i_q)$ at the respective up to 100 operating points can be executed in a comparatively short time at a currently normal processing rate; this can place a little burden on the design development of the control system CS. Similarly, the data capacity of the table T1 can also place little burden on the actual level of the storage capacity of a normal memory installed in the control system CS.

Figure 35:
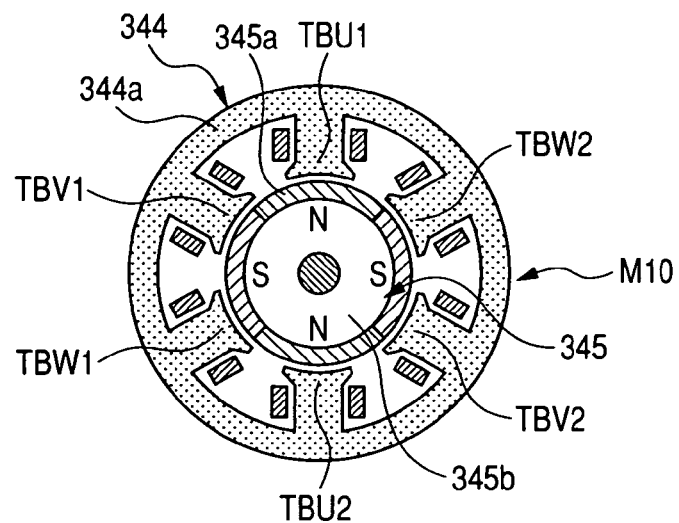
FIG. 35 is a lateral cross sectional view schematically illustrating a two-pole and six-slot three-phase motor according to the first embodiment.

FIG. 35 schematically illustrates a two-pole and six-slot three-phase motor M10. Each phase coil of the motor M10 is wound in short pitch, concentrated, and non-overlapping winding. The non-overlapping winding means that U-phase, V-phase, and W-phase winding are separated from each other while they are physically non-overlapped with each other like the three-phase and full pitch winding. Reference characters TBU1 and TBU2 U-phase represent teeth of a stator 344 of the motor M10. Similarly, reference characters TBV1 and TBV2 represent V-phase teeth of the stator 344, and reference characters TBW1 and TBW2 represent W-phase teeth thereof. Reference character 344a represents a back yoke of the stator 344.

Figure 36:
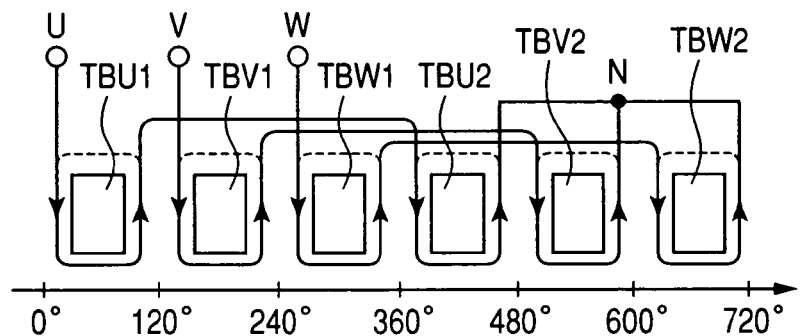
FIG. 36 is a developed view of the inner periphery of a stator of the motor illustrated in FIG. 35 in a circumferential direction thereof.

FIG. 36 is a developed view of the inner periphery of the stator 344 in a circumferential direction thereof; this developed view represents the inner peripheral surfaces of the teeth TBU1 and TBU2, TBV1 and TBV2, and TBW1 and TBW2 of the stator 344 facing the outer periphery of a rotor 345. In FIG. 36, the horizontal axis represents an electric angle. In FIG. 36, reference characters U, V, and W represent three-phase terminals of the motor M10, and reference character N represents a neutral point of the star configuration of the three-phase windings. Reference character 345a represents a plurality of permanent magnets mounted on the outer periphery of a rotor core 345b of the rotor 345 to be circumferentially arranged at regular intervals.

Though the motor structure is different from the motor M1 illustrated in FIG. 5, a method similar to the method of computing the data table T1 associated with the motor model illustrated in FIG. 5 can be used. In order to facilitate understanding of how to obtain the data table T1, the four-pole and 6-slot three-phase motor M10 is simplified to a two-pole and 3-slot three-phase motor M10A illustrated in FIG. 23.

Figure 23:
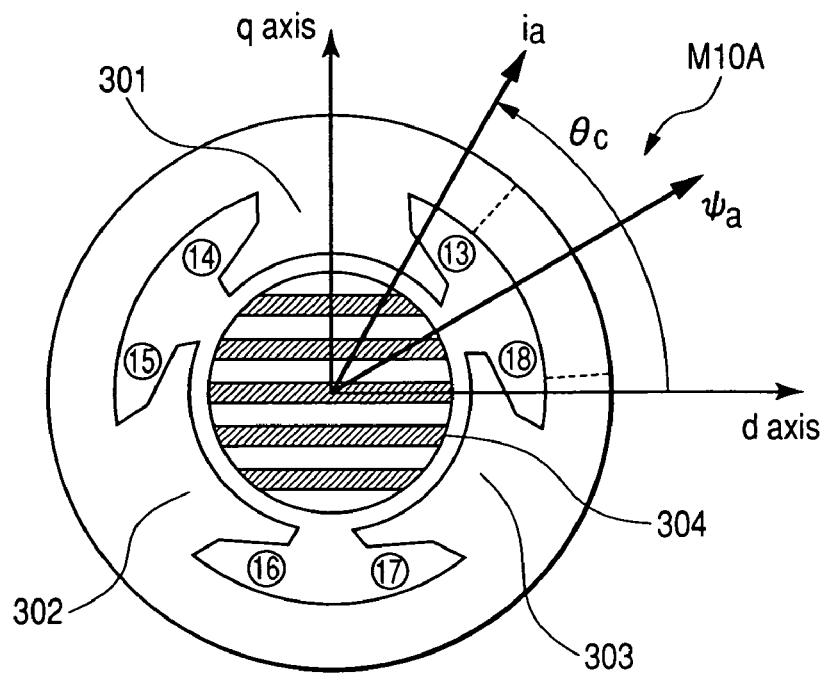
FIG. 23 is a lateral cross sectional view of an example of the structure of a synchronous reluctance motor that is a simplification of the synchronous reluctance motor illustrated in FIG. 35 according to the first embodiment.

As illustrated in FIG. 23, the motor M10A is provided with a U-phase stator pole 301, a V-phase stator pole 302, and a W-phase stator pole 303. A U-phase winding ⑬ and ⑭ is wound around the U-phase stator pole 301 to form a U-phase coil, a V-phase winding ⑮ and ⑯ is wound around the V-phase stator pole 302 to form a V-phase coil, and a W-phase winding ⑰ and ⑱ is wound around the W-phase stator pole 303 to form a W-phase coil. A rotor 304 of the motor M10 has a similar salient structure of the motor M1. Specifically, a plurality of flux barriers (slits) 304a are so formed in the rotor 304 as to be arranged at intervals therebetween in parallel to one diameter of the rotor 304.

The structure of the motor M10A will be described hereinafter as compared with that of the motor M1 illustrated in FIG. 5. The U-phase winding distributedly wound in the first, second, seventh, and eighth slots ①, ②, ⑦, and ⑧ corresponds to the U-phase winding ⑬ and ⑭. The U-phase winding ⑬ and ⑭ has a short pitch winding, and has the same phase in each of current, voltage, and magnetic flux as the U-phase winding 151.

Similarly, the V-phase winding ⑮ and ⑯ has a short pitch winding, and has the same phase in each of current, voltage, and magnetic flux as the V-phase winding 152, and W-phase winding ⑰ and ⑱ has a short pitch winding, and has the same phase in each of current, voltage, and magnetic flux as the W-phase winding 153.

In the structure of the motor M10A, the equation [34] is required to be converted into the following equation so as to compute, as the d-axis flux linkage number $\Psi_{d3}$, a d-axis flux linkage number to two-phase series-connected windings of the star configuration of the three-phase windings directed in the d-axis:

$$\Psi_{d3}(i_{d1}, i_{q1}) = \{(\phi_{17}-\phi_{18})+(\phi_{16}-\phi_{15})\} \times N_S \times t_C/t_0 \times P_n \quad \text{[Equation 44]}$$

In the motor model M10A illustrated in FIG. 23, no teeth having a phase difference of 90 degrees electric angle therebetween are provided, and similarly, no windings having a phase difference of 90 degrees electric angle are provided. For this reason, in order to compute the q-axis flux-linkage number $\Psi_{q3}$ of the motor M10A to be equivalent to that in the motor M1 set forth above, various correction methods can be applied. One example of the various correction methods will be described as follows.

In order to make the model of the motor M10A equivalent to that of the motor M1 illustrated in FIG. 6, the rotational position of the rotor 304 of the motor M10A is shifted by 90 degrees electric angle from that illustrated in FIG. 23. In addition, the d and q axis positions are corrected and that the U-phase, V-phase, and W-phase currents are corrected to lead by 90 degrees electric angle from the d-axis current $i_{d1}$ and q-axis current $i_{q1}$ corresponding to an arbitral amplitude of an armature current $i_a$ composed of the three-phase winding currents and a controlled phase angle $\theta c$ of the armature current $i_a$.

Figure 24:
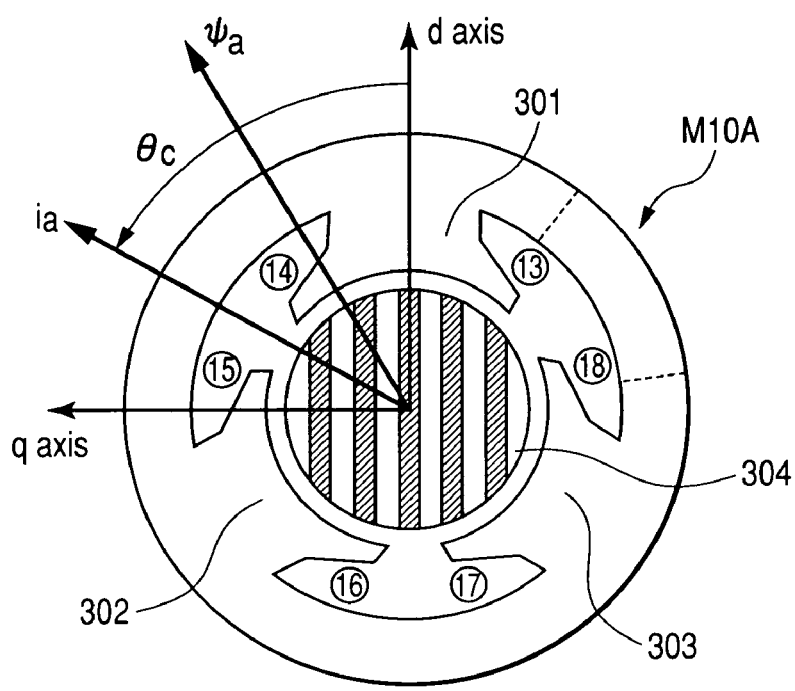
FIG. 24 is a lateral cross sectional view of a corrected structure of the synchronous reluctance motor illustrated in FIG. 23 according to the first embodiment.

Because the three-phase currents lead by 90 degrees electric angle 6 from those illustrated in FIG. 23, a total magnetomotive force caused by the three-phase currents is so directed on the d-q coordinate system as to be identical to that caused by the three-phase windings illustrated in FIG. 23. The d-axis and q-axis currents in which the rotational position of the rotor 304 of the motor M10A is shifted by 90 degrees electric angle from that illustrated in FIG. 23 are referred to as d-axis and q-axis currents $i_{d1X}$ and $i_{q1X}$. The armature current $i_a$ composed of the d-axis and q-axis currents $i_{d1X}$ and $i_{q1X}$ and a flux linkage vector $\Psi_a$ corresponding thereto are illustrated in FIG. 24.

In this situation, the q-axis flux-linkage number $\Psi_{q3}$ of the motor M10A is computed in accordance with the following equation using the analysis based on the infinite element method:

$$\Psi_{q3}(i_{d1X}, i_{q1X}) = \{(\phi_{18}-\phi_{17})+(\phi_{15}-\phi_{16})\} \times N_S \times t_C/t_0 \times P_n \quad \text{[Equation 45]}$$

Where $N_S$ represents the number of turns of each slot, $t_c$ represents the laminated thickness of the stator core, $P_n$ represents the number of pole pair, such as "4/2=2" in the motor M10 illustrated in FIG. 35.

How to compute the d-axis flux linkage number $\Psi_{d3}(i_{d1}, i_{q1})$, the d-axis and q-axis inductances $L_d(i_{d1}\ i_{q1})$ and $L_q(i_{d1}$ $i_{q1}$), and the data table T1 have been described set forth above in accordance with the equations [27] to [43].

The correction method set forth above is required to compute the q-axis flux-linkage number $\Psi_{q3}$ of the motor M10A by a microprocessor using the infinite element method. This is because the U-phase, V-phase, and W-phase stator poles 301, 302, and 303 are distributedly arranged in phase at intervals of 120 degrees electric angle. Similarly, the U-phase winding ⑬ and ⑭, V-phase winding ⑮ and ⑯, and W-phase winding ⑰ and ⑱ are distributedly arranged at intervals of 120 degrees electric angle. This distributed arrangement in the phase difference of 120 degrees electric angle may make it difficult to express the flux linkage numbers, the inductances and the like in the phase difference of 90 degrees.

In addition, the rotor core of the rotor 304 is configured such that the slits 304a and the thin magnetic pats are alternately arranged; this configuration provides discrete magnetic impedance. Thus, when the level of the discreteness is greater than a predetermined level, it is necessary to address it.

The discreteness may appear in the motor M1 in full pitch and distributed winding illustrated in FIG. 5. When the flux linkage numbers, the inductances and the like are computed on the d and q axes, it is convenient that the three-phase windings are arranged in phase at intervals of 90 degrees electric angle. In the motor model M1 illustrated in FIG. 1.

In the motor model M1 illustrated in FIG. 5, because the twelve slots and twelve windings are arranged within the range of 360 degrees electric angle, it is possible to compute the d-axis and q-axis flux-linkage numbers with little influence of the discreteness. Similarly, the number of slots of the stator is an integral multiple of 4 provides stator windings arranged at intervals of 90 degrees electric angle, making it possible to easily compute simultaneously the d-axis and q-axis flux-linkage numbers. However, when the number of slots of the stator is 6 or 18, no stator windings are arranged at intervals of 90 degrees electric angle, and therefore, it is difficult to simultaneously compute the d-axis and q-axis flux-linkage numbers; this requires some methods for addressing such a discrete problem.

One of some methods for addressing such a discrete problem is the correction method illustrated in FIGS. 23 and 24. Specifically, the rotational position of the rotor is shifted by 90 degrees electric angle from that illustrated in FIG. 23 so that the three-phase currents are rotated in phase by 90 degrees electric angle; this results that the d-axis current is identical to the q-axis current. Thus, it is possible to compute the d-axis and q-axis flux linkage components and d-axis and q-axis flux-linkage numbers with little influence of the discreteness.

Next, another one of some methods for addressing such a discrete problem will be described hereinafter.

Figure 25:
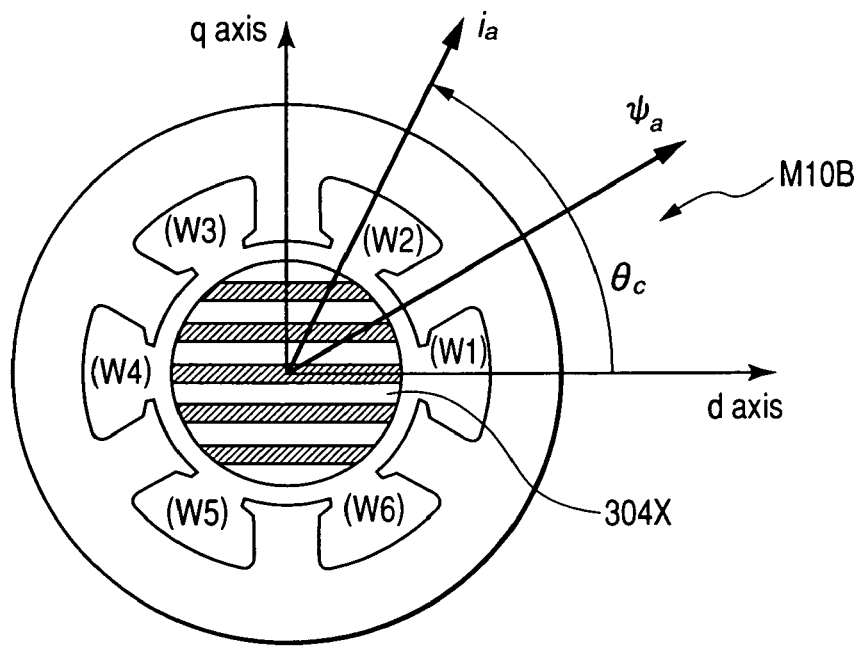
FIG. 25 is a lateral cross sectional view of an example of the structure of a synchronous reluctance motor with six slots and six stator windings according to the first embodiment.

For example, in a motor M10b illustrated in FIG. 25, six slots and six stator windings W1 to W6 are arranged within the range of 360 degrees electric angle; this results that the six stator wings W1 to W6 are arranged in phase at intervals of 60 degrees electric angle. When an armature current $i_a$ composed of the three-phase winding currents is supplied to the three-phase windings, a magnetic flux number $\Psi_a$ is assumed to be generated, the d-axis and q-axis flux linkage numbers are computed.

Specifically, the d-axis flux linkage number $\Psi_{d3}(i_{d1}, i_{q1})$ is computed in accordance with the following equation:

$$\Psi_{d3}(i_{d1},i_{q1})=\{(\Phi_{W5}-\Phi_{W2})+(\Phi_{W6}-\Phi_{W3})\}\times N_S \times t_C/t_0 \times Pn \quad \text{[Equation 46]}$$

where $\Phi_{W5}$, $\Phi_{W2}$, $\Phi_{W6}$, and $\Phi_{W3}$ represent flux linkage components linked to the stator windings W5, W2, W6, and W3, respectively.

Regarding the q-axis flux linkage number $\Psi_{q3}(i_{d1}, i_{q1})$, because no windings are located on the q-axis illustrated in FIG. 25, it is difficult to compute the q-axis flux-linkage number $\Psi_{q3}(i_{d1}, i_{q1})$ using the computing method based on the motor M1 illustrated in FIG. 5 set forth above.

Then, the rotational position of the rotor 304X of the motor M10B is shifted by 30 degrees electric angle from that illustrated in FIG. 25 so that the three-phase currents are rotated in phase by 30 degrees electric angle (see FIG. 26); this results that the d-axis current is identical to the q-axis current. Thus, it is possible to compute the d-axis and q-axis flux linkage components and d-axis and q-axis flux-linkage numbers in this arrangement of the rotor 304X illustrated in FIG. 26. In the arrangement of the rotor 304X illustrated in FIG. 26, the d-axis and q-axis currents are represented as $i_{d1Y}$ and $i_{q1Y}$, the q-axis flux-linkage number $\Psi_{q3}(i_{d1Y}, i_{q1Y})$ are computed in the following equation:

$$\Psi_{q3}(i_{d1Y},i_{q1Y})=\{(\Phi_{W1}-\Phi_{W4})+(\Phi_{W2}-\Phi_{W5})\}\times N_S \times t_C/t_0 \times Pn \quad \text{[Equation 47]}$$

where $\Phi_{W4}$ represents a flux linkage component linked to the stator winding W4.

How to compute the d-axis flux linkage number $\Psi_{d3}(i_{d1}, i_{q1})$, the d-axis and q-axis inductances $L_d(i_{d1}, i_{q1})$ and $L_q(i_{d1}, i_{q1})$, and the data table T1 have been described set forth above in accordance with the equations [27] to [43].

Figure 26:
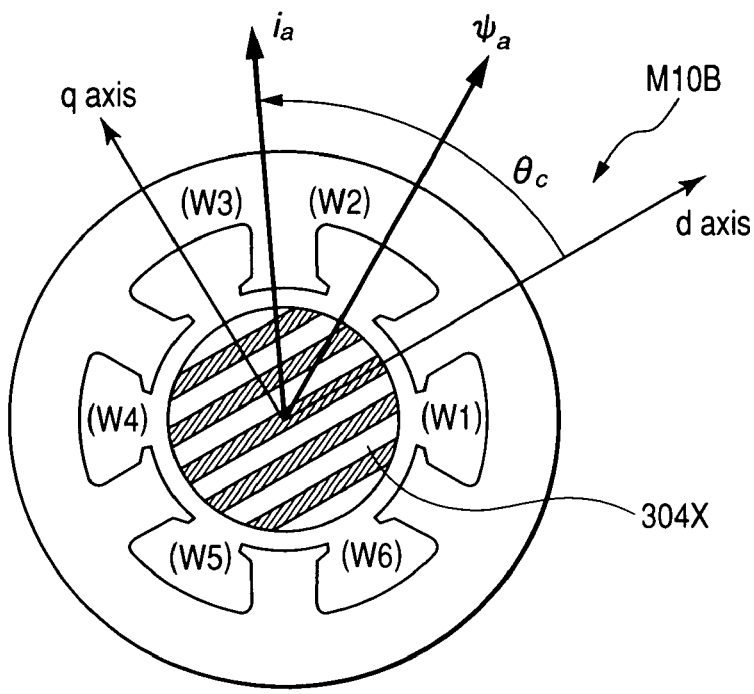
FIG. 26 is a lateral cross sectional view of a corrected structure of the synchronous reluctance motor illustrated in FIG. 25 according to the first embodiment.

Specifically, in the arrangement of the rotor 304X illustrated in FIG. 26, the d-axis and q-axis inductances $L_d$ and $L_q$ are computed in accordance with the following equations using the relationship representing that the d-axis inductance $L_d$ is the half of the maximum inductance $L_{max}$ when the rotor 304X is rotated and the relationship representing that the q-axis inductance $L_q$ is the half of the maximum inductance $L_{min}$ when the rotor 304X is rotated:

$$Ld = Lmax/2 \quad \text{[Equation 48]}$$

$$Lq = Lmin/2 \quad \text{[Equation 49]}$$

The measured inductances $L_u$, $L_v$, and $L_w$ of the U-phase, V-phase, and W-phase windings at each rotational position of the rotor have a predetermined relationship to the d-axis and q-axis inductances $L_d$ and $L_q$. The predetermined relationship therefore allows the d-axis and q-axis inductances $L_d$ and $L_q$ to be obtained based on the measured inductances $L_u$, $L_v$, and $L_w$ of the U-phase, V-phase, and W-phase windings. Similarly, the measured flux linkage numbers $\Psi_u$, $\Psi_v$, and $\Psi_w$ of the U-phase, V-phase, and W-phase windings at each rotational position of the rotor have a predetermined relationship to the d-axis and q-axis flux linkages $\Psi_d$ and $\Psi_q$. The predetermined relationship therefore allows the d-axis and q-axis flux linkages $\Psi_d$ and $\Psi_q$ to be obtained based on the measured flux linkage numbers $\Psi_u$, $\Psi_v$, and $\Psi_w$ of the U-phase, V-phase, and W-phase windings.

In order to reduce ripples contained in the output torque of the motor, the rotor can be designed to have different shapes individually determined based on the respective pole pairs. In this case, the computing of the equation [34] are repeatedly executed for the respective 36 slots so as to integrate the flux linkage numbers corresponding to the respective pole pairs; this can reduce the term of $P_n$ from the equations [34] and [35].

In addition to the motor structures illustrated in FIGS. 5 and 23, the present invention can be applied to various types of motors. The combination of the three-phase concentrated stator with the surface permanent magnet rotor illustrated in FIG. 36 can more reduce ripples contained in the output torque of the motor as compared with the multi-flux barrier rotor illustrated in FIG. 23.

The respective combinations of any one of the various rotor structures and any one of the various stator structures have different characteristics depending on the amount of torque ripples, different constant output characteristics by field weakening, different their manufacturing costs, and/or different their sizes. Therefore, they are selectively used for many purposes.

For example, the present invention can be applied to various types of rotors illustrated in FIGS. 36 and 52 to 56. According to the differences of the number of phases of the motors and/or to those of the number of poles, the equations set forth above required to control the voltages to be supplied to the three-phase windings and the outputs of the respective motors can be equivalently deformed as need arises.

Figure 40:
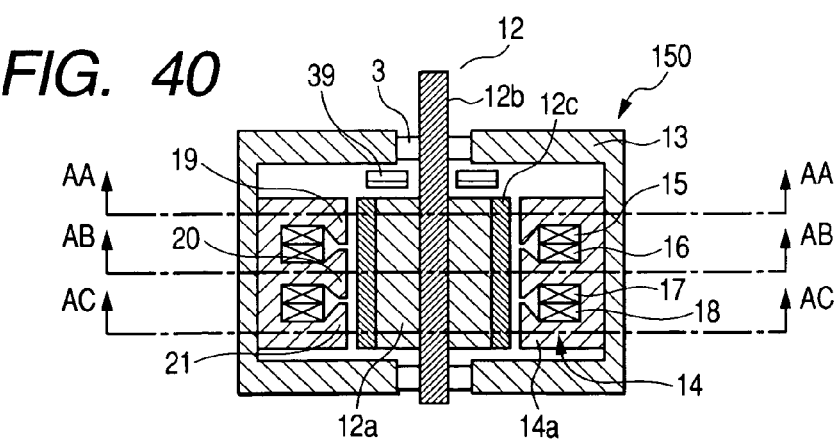
FIG. 40 is a partial axial cross section schematically illustrating an example of another structure of a motor according to the first embodiment of the present invention.

FIG. 40 is a partially axial cross section schematically illustrating an example of another structure of a brushless motor 150 according to the first embodiment of the present invention.

The motor 150 is designed as an eight-pole and three-phase motor.

Specifically, the motor 150 is provided with a substantially annular shaped stator core 14a of a stator 14, a motor housing 13 in which the stator core 14a is installed, and four stator windings 15 to 18 installed in the stator core 14. The motor 150 is also provided with a rotor 12. The rotor 12 includes a substantially annular shaped rotor core 12a rotatably disposed inside the stator core 14a with a gap therebetween, and a rotor shaft 12b fixed to the inner periphery of the rotor core 12a and rotatably supported by the motor housing 13 with a pair of bearings 3.

The rotor 12 also includes a plurality of permanent magnets 12c mounted on the outer periphery of the rotor core 12a. Each of the stator windings 15 to 18 has a substantially looped shape in a circumferential direction of the stator core 14a.

FIG. 41 is a developed view of the outer periphery of the rotor 12 of the motor illustrated in FIG. 40 in a circumferential direction thereof. As illustrated in FIG. 41, the permanent magnets 12c have a same shape and size and are arranged on the outer periphery of the rotor core 12a such that their N-poles and S-poles are alternate with each other in a circumferential direction thereof. In FIG. 41, the horizontal axis represents a mechanical rotation angle of the rotor 12 in degrees. For example, the rotational position of the rotor 12 at 360 degrees mechanical angle corresponds to 1440 degrees electric angle.

The stator 14 has four U-phase stator poles 19, four V-phase stator poles 20, and four W-phase stator poles 21. The stator poles 19, 20, and 21 have salient structures to the rotor 12.

FIG. 43 is a developed view of the inner periphery of the stator 14 of the motor 150 illustrated in FIG. 40 in a circumferential direction thereof. The U-phase stator poles 19 are arranged on one circumferential edge of the inner periphery of the stator 14 at regular intervals (pitches). Similarly, the W-phase stator poles 21 are arranged on the other circumferential edge of the inner periphery of the stator 14 at regular intervals (pitches). The V-phase stator poles 20 are so arranged on the intermediate portion of the inner periphery of the stator 14 at regular intervals (pitches); this intermediate portion of the inner periphery of the stator 14 is sandwiched between the one and the other circumferential edges. The four U-phase poles 19 will be collectively referred to as "U-phase stator pole group", the four V-phase poles 20 will be collectively referred to as "V-phase stator pole group" and the four W-phase poles 21 will be collectively referred to as "W-phase stator pole group".

In addition, the U-phase stator pole group and the W-phase stator pole group respectively arranged on the one and the other edges of the inner periphery of the stator 14 will be referred to as "edge stator pole group". In addition, the V-phase stator pole group arranged on the intermediate portion of the inner periphery of the stator 14 will be referred to as "intermediate stator pole group".

In other words, the U-phase, V-phase, and W-phase stator pole groups are shifted along a direction parallel to an axial direction of the stator 14.

In addition to the axially shifted arrangement of the U-phase, V-phase, and W-phase stator pole groups, the circumferential positions of the U-phase stator poles 19, the V-phase stator poles 20, and the W-phase stator poles 21 are shifted from each other.

Specifically, the U-phase, V-phase, and W-phase stator pole groups are circumferentially shifted to have phase differences of 30 degrees mechanical angle and 120 degrees electric angle from each other. Dash lines represent the permanent magnets 12 mounted on the outer periphery of the rotor 12 facing the stator poles of the stator 14. A pitch of circumferentially adjacent north poles of the rotor 12 is determined to be 360 degrees electric angel, and similarly, a pitch of circumferentially adjacent south poles of the rotor 12 is 360 degrees electric angel. A pitch of circumferentially adjacent same-phase poles of the stator 14 is also determined to be 360 degrees electric angel.

Figure 45:
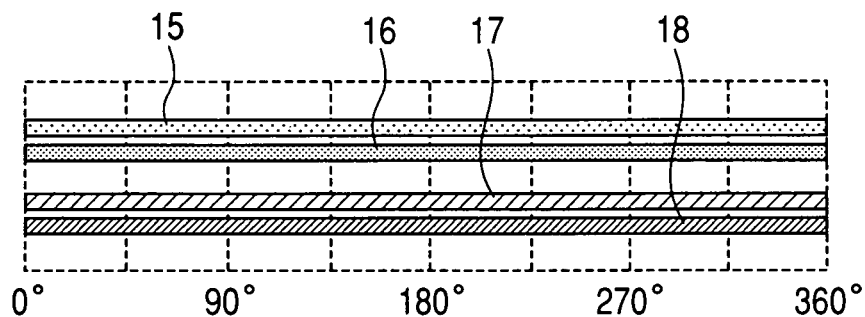
FIG. 45 is a developed view of each of a U-phase winding, V-phase windings, and a W-phase winding in a circumferential direction of the stator illustrated in FIG. 43.

FIG. 45 is a developed view of each of the U-phase winding 15, V-phase windings 16 and 17, and W-phase winding 18 in a circumferential direction of the stator 14.

The U-phase winding 15 is located between the U-phase stator pole 19 and the V-phase stator pole 20 so as to form a loop in a circumferential direction of the stator 14. That is, the looped U-phase winding 15 constitutes a U-phase coil.

When a current flowing clockwise viewed from the rotor side is assumed to a positive current and counter clock wise to a negative current, a current $I_u$ flowing through the U-phase is a negative current $(-I_u)$.

Similarly, the V-phase winding 16 is located between the U-phase stator pole 19 and the V-phase stator pole 20 so as to form a loop in a circumferential direction of the stator 14. That is, the looped V-phase winding 16 constitutes a V-phase coil. Through the V-phase winding 16, a positive current $+I_v$ flows.

The V-phase winding 17 is located between the V-phase stator pole 20 and the W-phase stator pole 21 so as to form a loop in a circumferential direction of the stator 14. That is, the looped V-phase winding 17 constitutes a V-phase coil. Through the V-phase winding 17, a negative current $-I_u$ flows.

The W-phase winding 18 is located between the V-phase stator pole 20 and the W-phase stator pole 21 so as to form a loop in a circumferential direction of the stator 14. That is, the looped W-phase winding 18 is constitutes a W-phase coil. Through the W-phase winding 18, a positive current $+I_w$ flows.

These three types of currents $I_u$, $I_v$, and $I_w$ are three-phase alternating currents, and they have phase differences of 120 degrees electric angles.

Next, the shape of the stator pole of each phase of the stator 14 and that of the stator winding of each phase thereof will be described hereinafter in detail.

FIG. 42A is a cross sectional view of the motor 150 taken on line AA-AA in FIG. 40, FIG. 42B is a cross sectional view of the motor 150 taken on line AB-AB in FIG. 40, and FIG. 42C is a cross sectional view of the motor 150 taken on line AC-AC in FIG. 40.

As illustrated in FIGS. 42A to 42C, the U-phase, V-phase, and W-phase poles 19, 20, and 21 are designed to be salient to the rotor 12. As illustrated in FIG. 42A, the U-phase stator poles 19 are arranged to have phase differences of 30 degrees mechanical angle and 120 degrees electric angle from each other. Similarly, as illustrated in FIGS. 42B and 42C, the V-phase stator poles 20 are arranged to have phase differences of 30 degrees mechanical angle and 120 degrees electric angle from each other, and W-phase stator poles 21 are arranged to have phase differences of 30 degrees mechanical angle and 120 degrees electric angle from each other.

Figure 44A:
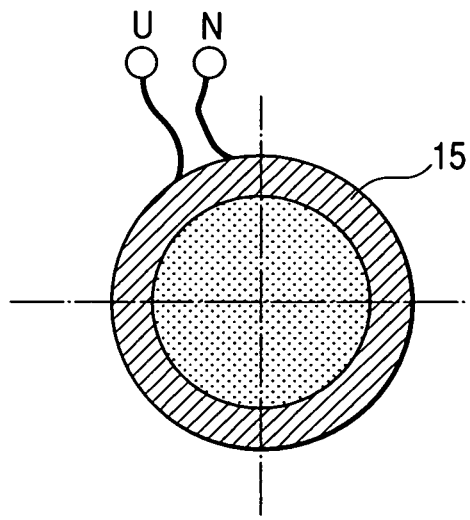
FIG. 44A is an enlarged view schematically illustrating one annular end of a U-phase winding of the stator illustrated in FIG. 40.
Figure 44B:
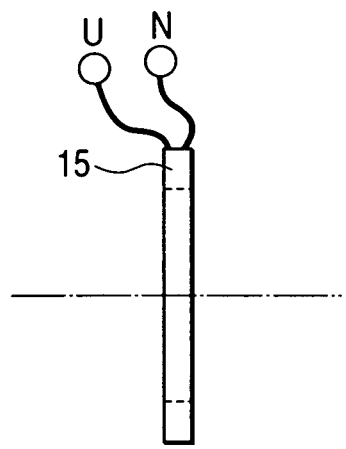
FIG. 44B is an enlarged view schematically illustrating one side the U-phase winding illustrated in FIG. 44A.

FIGS. 44A and 44B schematically illustrate the U-phase winding 15 having the looped shape. The looped structure of the U-phase winding 15 can be changed so as to reduce leakage flux from the stator magnetic circuit and magnetic saturation therein. For example, the U-shaped winding 15 can be wound in meandering shape. Each of the V-phase and W-phase windings 16, 17, and 18 has an identical looped shape to the U-phase winding 15.

The U-phase winding 15 has a winding start terminal U and a winding end terminal N. Similarly, each of the V-phase windings 16 and 17 has a winding start terminal V and a winding end terminal N, and the W-phase winding 18 has a winding start terminal W and a winding end terminal N.

When the U-phase, V-phase, and W-phase windings are connected to each other in star configuration, the winding end terminals U, V, and W of the U-phase winding 15, V-phase windings 16 and 17, and W-phase winding 18 are connected to each other. The U-phase, V-phase, and W-phase currents $I_u$, $I_v$, and $I_w$ to respectively flow through U-phase winding 15, V-phase windings 16 and 17, and W-phase winding 18 are controlled such that:

the phase of each of the U-phase, V-phase, and W-phase currents $I_u$, $I_v$, and $I_w$ is determined to allow torque to be created between the permanent magnets 12 and each of the U-phase, V-phase, and W-phase stator poles 19, 20, and 21; and the sum of the U-phase, V-phase, and W-phase currents $I_u$, $I_v$, and $I_w$ becomes zero.

Next, a relationship between each of the U-phase, V-phase, and W-phase currents $I_u$, $I_v$, and $I_w$ and a magnetomotive force to be applied to a corresponding one of the U-phase, V-phase, and W-phase stator poles 19, 20, and 21 from each of the U-phase, V-phase, and W-phase currents $I_u$, $I_v$, and $I_w$ will be described hereinafter.

Figure 47:
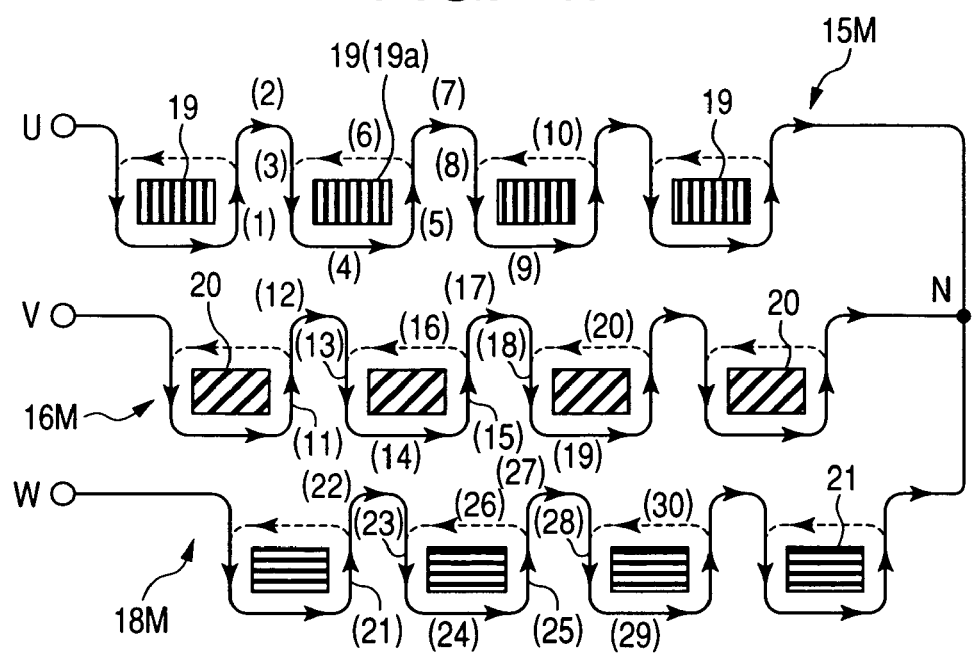
FIG. 47 is a developed view schematically illustrating U-phase, V-phase, and W-phase stator poles and each of U-phase, V-phase, and W-phase models equivalent to the U-phase, V-phase, and W-phase windings, respectively.

FIG. 47 is a developed view schematically illustrating:

the U-phase, V-phase, and W-phase stator poles 19, 20, and 21 mounted on the inner periphery of the stator 14;

a U-phase winding model 15M equivalent to the U-phase winding 15;

a V-phase winding model 16M equivalent to each of the V-phase windings 16 and 17; and a W-phase winding model 18M equivalent to the W-phase winding 18.

The U-phase winding model 15M is wound around each of the U-phase stator poles 19 in series in a same direction. This allows a magnetomotive force caused by the U-phase current $I_u$ flowing through the U-phase winding model 15M to be applied to each of the U-phase stator poles 19 in an identical orientation. For example, the U-phase winding model 15M wound around the second U-phase stator pole 19 (19a) from the left consists of wired portions (3), (4), (5), and (6). Specifically, the wired portions (3), (4), (5), and (6) are wound around the U-phase stator pole 19a in this order at a predetermined number of turns. Note that wired portions (2) and (7) of the U-phase winding model 15M serve as leads between circumferentially adjacent U-phase stator poles 19.

As illustrated in FIG. 47, the U-phase current $I_u$ flowing through the wired portion (1) and that flowing through the wired portion (3) have the same magnitude and different directions from each other. This allows a magnetomotive force (the number of ampere-turns) caused by the U-phase current $I_u$ flowing through the wired portion (1) and that caused by the U-phase current $I_u$ flowing through the wired portion (3) to be cancelled out each other. Each of the wired portions (1) and (3) is therefore a state equivalent to the state in which no current flowing through a corresponding one of the wired portions (1) and (3).

Similarly, a magnetomotive force (the number of ampere-turns) caused by the U-phase current $I_u$ flowing through the wired portion (5) and that caused by the U-phase current $I_u$ flowing through the wired portion (8) are cancelled out each other. Each of the wired portions (5) and (8) is therefore a state equivalent to the state in which no current flowing through a corresponding one of the wired portions (5) and (8).

Specifically, the U-phase current $I_u$ flowing through one wired portion of the U-phase winding model 15M arranged between circumferentially adjacent U-phase stator poles 19 and that flowing through the other wired portion of the U-phase winding model 15M arranged therebetween are canceled out. This can eliminate the necessity of the current flowing through each of the wired portions arranged between circumferentially adjacent U-phase stator poles 19; this also can eliminate each of the wired portions itself.

As a result, in the U-phase winding model 15M, it can be assumed that a U-phase current $I_u$ flows through the wired portions (10) and (6) (see dashed lines in FIG. 47) in loop and simultaneously a U-phase current $-I_u$ flows through the wired portions (4) and (9) in loop.

The U-phase current $I_u$ flowing through the wired portions (10) and (6) in loop at the exterior of the stator core 14a. Because the stator core 14a is surrounded by air so that the exterior thereof has a significant magnetic resistance; this results that the U-phase current $I_u$ flowing through the wired portions (10) and (6) in loop has little electromagnetic influence on the motor 150. This can eliminate the wired portions (10) and (6) of the U-phase winding model 15M. Thus, the U-phase winding model 15M illustrated in FIG. 47 has the same electromagnetic effects as the looped U-phase winding 15 illustrated in FIG. 40.

Similarly, the V-phase winding model 16M is wound around each of the V-phase stator poles 20 in series in a same direction. This allows a magnetomotive force caused by the V-phase current $I_v$ flowing through the V-phase winding model 16M to be applied to each of the V-phase stator poles 20 in an identical orientation.

As illustrated in FIG. 47, the V-phase current $I_v$ flowing through the wired portion (11) and that flowing through the wired portion (13) have the same magnitude and different directions from each other. This allows a magnetomotive force (the number of ampere-turns) caused by the V-phase current $I_v$ flowing through the wired portion (11) and that caused by the U-phase current $I_v$ flowing through the wired portion (13) to be cancelled out each other. Each of the wired portions (11) and (13) is therefore a state event to the state in which no current flowing through a corresponding one of the wired portions (11) and (13).

Similarly, a magnetomotive force (the number of ampere-turns) caused by the V-phase current $I_v$ flowing through the wired portion (15) and that caused by the V-phase current $I_v$ flowing through the wined portion (18) are cancelled out each other. Each of the wired portions (15) and (18) is therefore a state equivalent to the state in which no current flowing through a corresponding one of the wired portions (15) and (18).

As a result, in the V-phase winding model 16M, it can be assumed that a V-phase current $I_v$ flows through the wired portions (20) and (16) (see dashed lines in FIG. 47) in loop and simultaneously a V-phase current $-I_v$ flows through the wired portions (14) and (19) in loop.

Thus, the V-phase winding model 16M illustrated in FIG. 47 has the same electromagnetic effects as the respective looped V-phase windings 16 and 17 illustrated in FIG. 40.

In addition, the W-phase winding model 18M is wound around each of the W-phase stator poles 21 in series in a same direction. This allows a magnetomotive force caused by the W-phase current $I_w$ flowing through the W-phase winding model 18M to be applied to each of the W-phase stator poles 21 in an identical orientation.

As illustrated in FIG. 47, the W-phase current $I_w$ flowing through the wired portion (21) and that flowing through the wired portion (23) have the same magnitude and different directions from each other. This allows a magnetomotive force (the number of ampere-turns) caused by the W-phase current $I_w$ flowing through the wired portion (21) and that caused by the W-phase current $I_w$ flowing through the wired portion (23) to be cancelled out each other. Each of the wired portions (21) and (23) is therefore a state equivalent to the state in which no current flowing through a corresponding one of the wired portions (21) and (23).

Similarly, a magnetomotive force (the number of ampere-turns) caused by the W-phase current $I_w$ flowing through the wired portion (25) and that caused by the W-phase current $I_w$ flowing through the wired portion (28) are cancelled out each other. Each of the wired portions (25) and (28) is therefore a state equivalent to the state in which no current flowing through a corresponding one of the wired portions (25) and (28).

As a result, in the W-phase winding model 18M, it can be assumed that a W-phase current $I_w$ flows through the wired portions (30) and (26) (see dashed lines in FIG. 47) in loop and simultaneously a W-phase current $-I_w$ flows through the wired portions (24) and (29) in loop.

The W-phase current $I_w$ flowing through the wired portions (24) and (29) in loop at the exterior of the stator core 14a. Therefore, for the same reason as the U-phase winding model 15M, the W-phase current $-I_w$ flowing through the wired portions (24) and (29) in loop has little electromagnetic influence on the motor 150. This can eliminate the wired portions (24) and (29) of the W-phase winding model 18M. Thus, the W-phase winding model 18M illustrated in FIG. 47 has the same electromagnetic effects as the looped W-phase winding 18 illustrated in FIG. 40.

As described above, in the first embodiment, as a winding for causing electromagnetic force to act on each of the U-phase, V-phase, and W-phase stator poles 19, 20, and 21, a looped winding can be used, and looped windings located at both ends of the axial direction of the stator 14 can be eliminated. This results that the amount of copper used to manufacture the brushless motor 150, thus improving the efficiency of the brushless motor 150 and increasing the output torque thereof.

No windings are required to be provided between the same-phase stator poles, it is possible to design the brushless motor 150 having a more multipolarized structure. Efficiently, the more simplified winding structure of the motor 150 can improve the productivity of the motor 150, thus reducing the motor 150 in manufacturing cost.

Looking the motor 150 from the magnetic viewpoint, magnetic fluxes $\Phi_u$, $\Phi_v$, and $\Phi_w$ respectively passing through the U-phase, V-phase, and W-phase stator poles 19, 20, and 21 flow together at the back yoke of the stator 14; this results that the sum of the three-phase alternating current magnetic fluxes $\Phi_u$, $\Phi_v$, and $\Phi_w$ becomes zero ($\Phi_u+\Phi_v+\Phi_w=0$).

The structure of the motor M10 illustrated in FIGS. 35 and 36 is equivalent to the structure in which the total six stator poles (two stator poles per phase) are circumferentially arranged, and therefore, the structure of the motor M10 has the same electromagnetic effects and output-torque generating functions as the brushless motor 150.

Operations of the brushless motor 150 will be described hereinafter.

Figure 48:
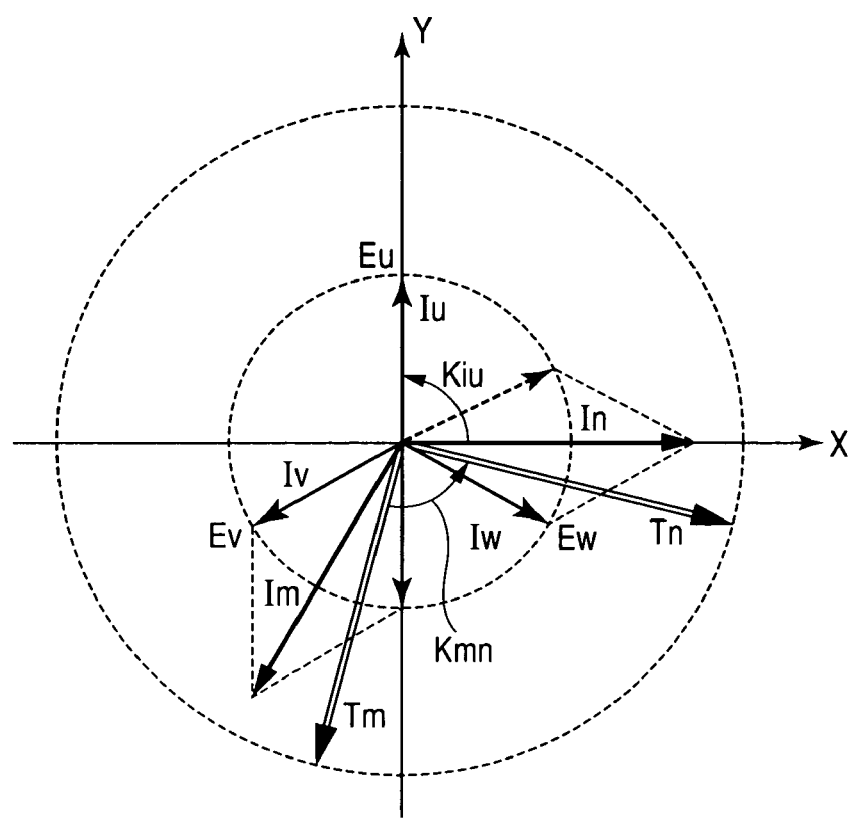
FIG. 48 is a vector diagram schematically illustrating current vectors, voltage vectors, and output torque vectors of the motor illustrated in FIG. 40 according to the first embodiment.

FIG. 48 schematically illustrates current vectors, voltage vectors, and output torque vectors of the motor 150. In FIG. 48, the horizontal axis (X axis) corresponds to the real axis, and the vertical axis (Y axis) corresponds to the imaginary axis. An angle of a vector with respect to the X axis in counterclockwise represents a phase angle of the vector.

The rate of change of the rotational angle θ of each of the magnetic fluxes $\Phi_u$, $\Phi_v$, and $\Phi_w$ having a place in a corresponding one of the U-phase, V-phase, and W-phase stator poles 19, 20, and 21 will be referred to as "unit voltage". Specifically, a U-phase unit voltage Eu is represented by "$Eu=d\Phi_u/d\theta$", a V-phase unit voltage Ev is represented by "$Ev=d\Phi_v/d\theta$", and a W-phase unit voltage Ew is represented by "$Ew=d\Phi_w/d\theta$".

The relative positions of the respective U-phase, V-phase, and W-phase stator poles 19, 20, and 21 with respect to the rotor 11 (permanent magnets 12) are shifted from each other by 120 degrees electric angle. The phase shift allows each of the U-phase, V-phase, and W-phase unit voltages Eu, Ev, and Ew induced in one turn of a corresponding one of the U-phase, V-phase, and W-phase windings 15 to 18 to become three-phase alternating current voltages illustrated in FIG. 48.

It is assumed that the rotor 12 is designed to rotate at a constant angular rate of dθ/dt equal to S1, and the numbers of turns of the respective U-phase winding 15, each of the V-phase windings 16 and 17, and W-phase winding 18 are referred to as Wu, Wv, and Ww, and the numbers Wu, Wv, and Ww of turns are equal to a value Wc. Assuming that leakage flux components from each of the stator poles 19, 20, and 21, the number of flux linkages to the U-phase winding 15 is represented by "$Wu \times \Phi_u$", the number of flux linkages to each of the V-phase windings 16 and 17 is represented by "$Wv \times \Phi_v$", and the number of flux linkages to the W-phase winding 18 is represented by "$Ww \times \Phi_w$".

U-phase, V-phase, and W-phase induced voltages Vu, Vv, and Vw in respective U-phase winding 15, each of V-phase windings 16 and 17, and the W-phase winding 18 are therefore represented by the following vector equations:

$$Vu = Wu \times (-d\phi u/dt) \qquad \text{[Equation 50]}$$
$$= -Wu \times d\phi u/d\theta \times d\theta/dt$$
$$= -Wu \times Eu \times S1$$

$$Vv = Wv \times Ev \times S1 \qquad \text{[Equation 51]}$$

$$Vw = Ww \times Ew \times S1 \qquad \text{[Equation 52]}$$

The U-phase unit voltage Eu is a voltage induced in one turn of the U-phase winding 15 in a reverse direction illustrated in FIGS. 40 and 45, and the U-phase induced voltage Vu is a voltage induced in the U-phase winding 15 in the reverse direction.

The V-phase unit voltage Ev is a voltage generated across both ends of a series circuit between one turn of the V-phase winding 16 and that of the V-phase winding 17 in a reverse direction. The V-phase induced voltage Vv is a voltage generated across both ends of a series circuit between the V-phase winding 16 and the reverse-directed V-phase winding 17.

The W-phase unit voltage Ew is a voltage induced in one turn of the W-phase winding 18 illustrated in FIGS. 40 and 45, and the W-phase induced voltage Vw is a voltage induced in the W-phase winding 18.

In order to effective generate the output torque of the motor 150, U-phase, V-phase, and W-phase currents Iu, Iv, and Iw are required to be supplied to the U-phase, V-phase, and W-phase windings, respectively, such that each of the U-phase, V-phase, and W-phase currents Iu, Iv, and Iw is in phase with a corresponding one of the U-phase, V-phase, and W-phase voltages Eu, Ev, and Ew.

In the first embodiment, as illustrated in FIG. 48, each of the U-phase, V-phase, and W-phase currents Iu, Iv, and Iw is in phase with a corresponding one of the U-phase, V-phase, and W-phase voltages Eu, Ev, and Ew. For the purpose of simplification in illustration, voltage vector and current vector in phase with each other are represented by the same vector arrow in FIG. 48.

The output power Pa of the brushless motor 150 and the powers Pu, Pv, and Pw thereof in respective U-phase, V-phase, and W-phase are represented by the following vector equations:

$$Pu = Vu \times (-Iu) = Wu \times Eu \times S1 \times Iu \quad \text{[Equation 53]}$$

$$Pv = Vv \times Iv = Wv \times Ev \times S1 \times Iv \quad \text{[Equation 54]}$$

$$Pw = Vw \times Iw = Ww \times Ew \times S1 \times Iw \quad \text{[Equation 55]}$$

$$Pa = Pu + Pv + Pw = Vu \times Iu + Vv \times Iv + Vw \times Iw \quad \text{[Equation 56]}$$

The output torque Ta of the brushless motor 150 and the torques Tu, Tv, and Tw thereof in respective U-phase, V-phase, and W-phase are represented by the following vector equations:

$$Tu = Pu/S1 = Wu \times Eu \times Iu \quad \text{[Equation 57]}$$

$$Tv = Pv/S1 = Wv \times Ev \times Iv \quad \text{[Equation 58]}$$

$$Tw = Pw/S1 = Ww \times Ew \times Iw \quad \text{[Equation 59]}$$

$$\begin{aligned} Ta &= Tu + Tv + Tw \\ &= Wu \times Eu \times Iu + Wv \times Ev \times Iv + Ww \times Ew \times Iw \\ &= Wc \times (Eu \times Iu + Ev \times Iv + Ew \times Iw) \end{aligned} \quad \text{[Equation 60]}$$

The vector diagram schematically illustrating the current vectors, voltage vectors, and output torque vectors of the motor 150 is identical to that of the motor M10 illustrated in FIGS. 35 and 36.

Next, a modification of the winding structure of the motor 150 illustrated in FIGS. 40 and 45 in order to more improve the motor efficiency will be described hereinafter.

The U-phase winding 15 and the V-phase winding 16 are looped windings and are adjacently arranged to each other between the U-phase stator poles 19 and V-phase stator poles 20. This arrangement allows these windings 15 and 16 to be combined with each other to form a single winding. Similarly, the V-phase winding 17 and the W-phase winding 18 are looped windings and are adjacently arranged to each other between the V-phase stator poles 20 and W-phase stator poles 21. This arrangement allows these windings 17 and 18 to be combined with each other to form a single wing.

Figure 46:
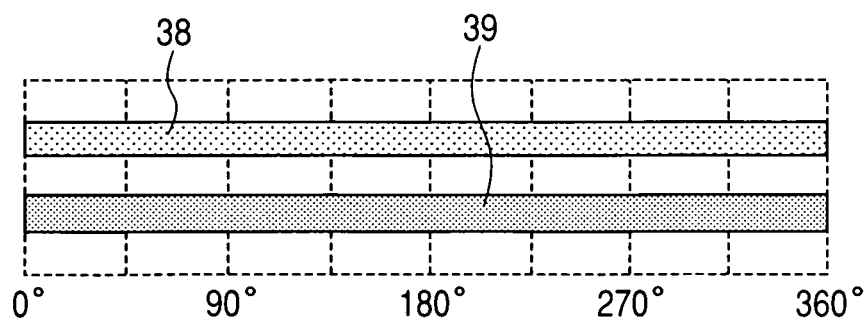
FIG. 46 is a developed view of a modification of a winding structure of the motor illustrated in FIGS. 40 and 45.

FIG. 46 schematically illustrates the modification of the winding structure of the motor 150.

As clearly understood by comparison between FIGS. 45 and 46, the U-phase winding 15 and the V-phase winding 16 are replaced with a single M-phase winding (coil) 38, and the V-phase winding 17 and the W-phase winding 18 are replaced with a single N-phase winding (coil) 39.

An M-phase current Im equivalent to the sum of the U-phase current (−Iu) and the V-phase current (Iv) is configured to flow through the M-phase winding 38; this allows a magnetic flux to be created by the M-phase current Im. The magnetic flux created by the M-phase current Im is equivalent to the sum of a magnetic flux created by the U-phase current (−Iu) and that created by the V-phase current (Iv). Thus, the single M-phase winding 38 illustrated in FIG. 46 has the same electromagnetic effects as the pair of U-phase winding 15 and V-phase winding 16.

Similarly, an N-phase current In equivalent to the sum of the V-phase current (−Iv) and the W-phase current (Iw) is configured to now through the N-phase winding 39; this allows a magnetic flux to be created by the N-phase current In. The magnetic flux created by the N-phase current In is equivalent to the sum of a magnetic flux created by the V-phase current (−Iv) and that created by the W-phase current (Iw). Thus, the single N-phase winding 39 illustrated in FIG. 46 has the same electromagnetic effects as the pair of V-phase winding 17 and W-phase winding 18.

FIG. 48 specific illustrates a vector of the M-phase current Im and that of the N-phase current In. Specifically, a unit voltage Em of the M-phase winding 38 (M-phase vector) and a unit voltage En of the N-phase winding 39 (N-phase vector) illustrated in FIG. 48 are represented by the following equations:

$$Em = -Eu = -d\Phi_u/d\theta$$

$$En = Ew = d\Phi_w/d\theta$$

The M-phase and N-phase induced voltages Vm and Vn in the respective M-phase winding 38 and N-phase winding 39, the output power Pb and the output torque Tb of the modified brushless motor 150, the powers Pm and Pn and the torques thereof in respective M-phase and N-phase are represented by the following equations:

$$Vm = Wc \times Em \times S1 \quad \text{[Equation 61]}$$

$$Vn = Wc \times En \times S1 \quad \text{[Equation 62]}$$

$$\begin{aligned} Pm &= Vm \times Im \\ &= Wc \times (-Eu) \times S1 \times (-Iu + Iv) \\ &= Wc \times Eu \times S1 \times (-Iu + Iv) \end{aligned} \quad \text{[Equation 63]}$$

$$\begin{aligned} Pn &= Vn \times In \\ &= Wc \times Ew \times S1 \times (-Iv + Iw) \end{aligned} \quad \text{[Equation 64]}$$

$$\begin{aligned} Pb &= Pm + Pn \\ &= Vu \times (-Iu + Iv) + Vw \times (-Iv + Iw) \end{aligned} \quad \text{[Equation 65]}$$

$$Tm = Pm/S1 = Wc \times (-Eu) \times (-Iu + Iv) \quad \text{[Equation 66]}$$

$$Tn = Pn/S1 = Wc \times Ew \times (-Iv + Iw) \quad \text{[Equation 67]}$$

$$\begin{aligned} Tb &= Tm + Tn \\ &= Wc \times ((-Eu \times Im) + Ew \times In) \\ &= Wc \times (-Eu \times (-Iu + Iv) + Ew \times (-Iv + Iw)) \end{aligned} \quad \text{[Equation 68]}$$

-continued $$= Wc \times Eu \times Iu + Wc \times Iv \times$$
$$(-Eu - Ew) + Wc \times Ew \times Iw$$
$$= Wc \times (Eu \times Iu + Ev \times Iv + Ew \times Iw)$$ [Equation 69]

$$\therefore Eu + Ev + Ew = 0$$ [Equation 70]

The output torque of the motor 150 represented by the equation [60] is expressed in three-phase form, and that of the modified motor 150 represented by the equation [67] in two-phase form. Expansion of the equation [68] becomes the equation [69], and therefore, both equations [68] and [69] are mathematically equivalent to each other. Especially, when the three-phase voltages Eu, Ev, and Ew are balanced three-phase voltages, and three-phase currents Iu, Iv, and Iw are balanced three-phase currents, the output torque Ta represented by the equation [60] becomes constant. The constant output torque Ta allows the torque Tb represented by the equation [68] to be given by the sum of square functions of sinusoidal waves whose phase difference is 90 degrees electric angle corresponding to the phase difference between the M-phase output torque Tm and the N-phase output torque Tn; this torque Tb becomes therefore constant.

The equation [68] represents a two-phase alternating current motor, and each of the equations [60] and [70] represents a three-phase alternating current motor, but they are mathematically equivalent to each other.

In the equation [68], lets us consider:

a first case where the M-phase current Im equivalent to the sum of the U-phase current (−Iu) and the V-phase current (Iv) is configured to flow through the M-phase winding 38; and a second case where the U-phase and V-phase currents (−Iu) and the V-phase current (Iv) are supplied to the U-phase winding 15 and V-phase winding 16.

As a result of comparison between the first case and the second case, substantially identical electromagnetic effects are obtained in the first and second cases, but copper loss caused in the first case is different from that caused in the second case.

Specifically, as illustrated in FIG. 48, a component of the current vector Im on the real axis is reduced to become a value of the product of the magnitude of the current vector Im and cos 30°. This allows the copper loss caused in the first case to decrease as compared with that caused in the second case.

As set forth above, combination of the adjacently arranged looped windings 15 and 16 (or 17 and 18) with each other permits copper loss to decrease and the winding structure to be more simplified, making it possible to more improve the productivity of the motor 150 and more reduce the manufacturing cost thereof.

Next, modifications of the stator-pole configuration of the motor 150 illustrated in FIG. 40 will be described hereinafter. The stator-pole confirmation has great influences on the output torque characteristic of the motor 150, and is closely related to cogging torque ripples and torque ripples induced by the armature current to be supplied to the three-phase windings.

In a first modification, the configuration of each of the stator poles included in the U-phase stator pole group, V-phase stator pole group, and W-phase stator pole group is changed to maintain the shapes and amplitudes of the three-phase unit voltages substantially identical to each other and to have the phase differences of 120 degrees electric angle from each other.

Figure 49:
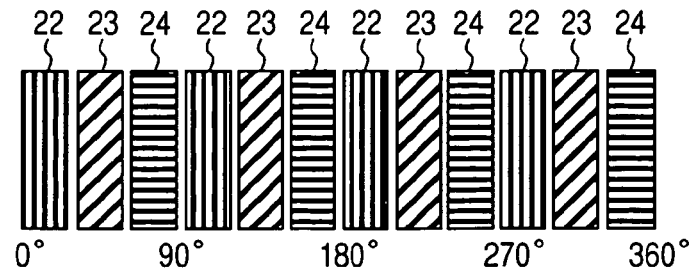
FIG. 49 is a developed view schematically illustrating a first modification of a stator-pole configuration of the motor illustrated in FIG. 40.

FIG. 49 schematically illustrates the first modification of the stator-pole configuration of the motor 150.

Reference characters 22 represent U-phase stator poles, reference characters 23 represent V-phase stator poles, and reference characters 24 represent W-phase stator poles. The U-phase, V-phase, and W-phase stator poles 22, 23, and 24 are alternately arranged in a circumferential direction of the stator 14. In FIG. 49, the inner peripheral surface of each of the U-phase, V-phase, and W-phase stator poles 22, 23, and 24 has a substantially identical rectangular shape in parallel to the axial direction of the rotor shaft 11.

Each of the U-phase stator poles, a corresponding one of the V-phase stator poles adjacent thereto, and a corresponding one of the W-phase stator poles adjacent to the corresponding one of the V-phase stator poles have phase differences of 30 degrees mechanical angle and 120 degrees electric angle from each other.

In order to reduce torque ripples, the inner peripheral surface of each of the U-phase, V-phase, and W-phase stator poles 22, 23, and 24 is formed with a plurality of radially barrel convex and concave portions. The barrel convex and concave portions formed on the inner peripheral surface of each of the U-phase, V-phase, and W-phase stator poles 22, 23, and 24 allow electromagnetic effects at boundaries of adjacent stator poles to be smoothly changed. This can reduce torque ripples contained in the output torque of the motor 150.

As another method, the surface of each of the N-poles and S-poles of the permanent magnets 12c opposing the inner periphery of the stator 14 is formed with a plurality of radially barrel convex and concave portions The barrel convex and concave portions formed on the surface of each of the N-poles and S-poles of the permanent magnets 12c provide a substantially sinusoidal magnetic flux distribution in a circumferential direction of the rotor 12. This can also reduce torque ripples contained in the output torque of the motor 150.

The stator poles 22, 23, and 24 can be circumferentially skewed; this also can reduce torque ripples contained in the output torque of the motor 150.

Figure 50:
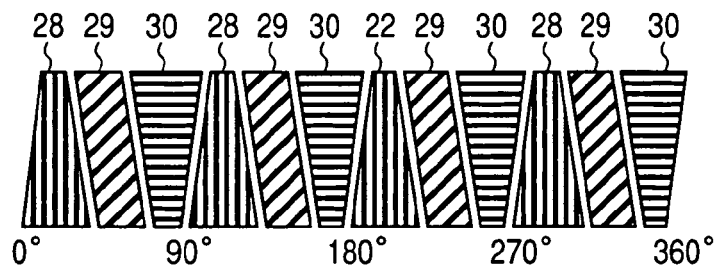
FIG. 50 is a developed view schematically illustrates a second modification of the stator-pole configuration of the motor illustrated in FIG. 40.

FIG. 50 schematically illustrates a second modification of the stator-pole configuration of the motor 150.

In the second modification, the configuration of each of stator poles 28, 29, and 30 respectively included in the U-phase stator pole group, V-phase stator pole group, and W-phase stator pole group is changed to maintain the shapes and amplitudes of the three-phase unit voltages Eu, Ev, and Ew, which respectively are equivalent to the angular rate $d\Phi_u/d$, the angular rate $\Phi_v/d\theta$, and $d\Phi_w/d\theta$, substantially identical to each other and to have the phase differences of 120 degrees electric angle from each other.

The most part of the inner peripheral surfaces of the U-phase, V-phase, and W-phase stator poles 28, 29, and 30 has a short length with respect to the middle portions of the teeth thereof. This allows magnetic fluxes induced from the rotor 12 to easily pass through the inner peripheral surfaces of the U-phase, V-phase, and W-phase stator poles 28, 29, and 30 and the middle portions of the teeth thereof. Thereafter, the magnetic fluxes easily passes through corresponding magnetic paths of the stator core 14a continued to the back yoke thereof.

Thus, it is possible to reduce a space between each of the three-phase windings 15 to 18 and the inner peripheral surfaces of the U-phase, V-phase, and W-phase stator poles 28, 29, and 30 as compared with the stator configuration illustrated in FIG. 49, thus reducing the outside shape of the brushless motor 150.

Figure 51:
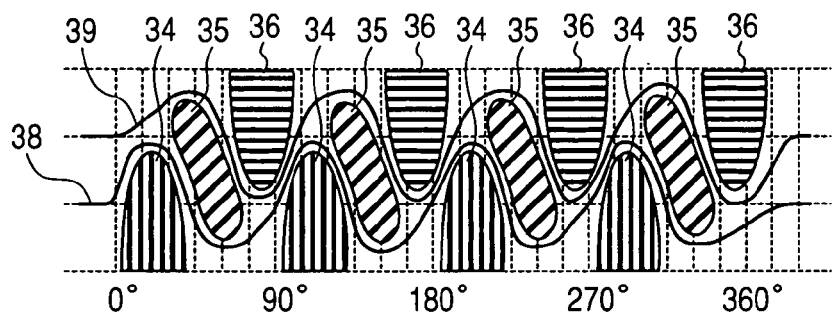
FIG. 51 is a developed view schematically illustrating a third modification of the stator-pole configuration of the motor illustrated in FIG. 40.

FIG. 51 schematically illustrates a third modification of the stator-pole configuration of the motor 150.

In the third modification, each of stator poles 34, 35, and 36 respectively included in the U-phase stator pole group, V-phase stator pole group, and W-phase stator pole group is configured such that its inner peripheral surface facing the outer periphery of the rotor 12 has an intermediate shape between the shape of the inner peripheral surface of each of the stator poles 19, 20, and 21 and that of the inner peripheral surface of each of the stator poles 28, 29, and 30.

Specifically, the areas of the inner peripheral surfaces of the stator poles 28, 29, and 30 facing the outer periphery of the rotor 12 are so distributed arranged as to have a substantially sinusoidal wave. This can reduce cogging torque ripples and torque ripples included in the output torque of the motor 150. The magnetic path between the radially innermost end of each of the stator poles 28, 29, and 30 and the back yoke of the stator core 14a has a substantially straight geometry this can prevent magnetic saturation from occurring in the magnetic path therebetween, thus increasing the output torque of the motor 150.

The sinusoidal waved arrangement of the areas of the inner peripheral surfaces of the stator poles 28, 29, and 30 facing the outer periphery of the rotor 12 requires that the looped M-phase winding 38 is sinusoidally arranged between the U-phase stator poles 34 and V-phase stator poles 35 (see FIG. 51). Similarly, the sinusoidal waved arrangement of the areas of the inner peripheral surfaces of the stator poles 28, 29, and 30 requires that the looped N-phase winding 39 is sinusoidally arranged between the V-phase stator poles 35 and W-phase stator poles 36 (see FIG. 51).

In the structures of the motors illustrated in FIGS. 49 and 50, two-phase or three-phase wavelike looped windings can be used.

The configuration of the tooth of each of the stator poles, and the shape of the inner peripheral surface of each of the stator poles facing the outer periphery of the rotor 12 can be changed depending on the various purposes including output-torque increase, torque-ripple reduction, leakage-flux reduction between adjacent stator poles, tooth-magnetic flux reduction, and manufacturing simplicity. In addition, the motors illustrated in FIGS. 40 to 51 can be changed in structure, such as changed to have multiphase windings greater than the three-phase windings.

Next, a method of obtaining the data table T1 representing the relationship between the d-axis and q-axis flux-linkage numbers and corresponding each operating point of the armature current to be supplied to the looped three-phase windings 15, 16, 17, and 18 of the motor 150 illustrated in FIG. 40 will be described hereinafter.

The configuration of each of the motor 150 and its modifications illustrated in FIGS. 40 to 51 is electromagnetically equivalent to the configuration of the motor M10 illustrated in FIGS. 35 and 36 with each phase coil wound in short pitch, concentrated, and non-overlapping winding. For this reason, the d-axis and q-axis flux-linkage numbers can be analyzed and obtained based on the motor model M10A illustrated in FIGS. 23 and 24 in accordance with the equations [44] and [45] hereinafter.

How to specifically obtain the data table T1 representing the relationship between the d-axis and q-axis flux-linkage numbers $\Psi_{d3}(i_{d1}, i_{q1})$ and $\Psi_{q3}(i_{d1}, i_{q1})$ and corresponding each operating point $(i_{d1}, i_{q1})$ of the armature current to be supplied to the looped three-phase windings 15, 16, 17, and 18 of the motor 150 illustrated in FIG. 40 will be described hereinafter.

In the three-phase motor M10A having the looped and concentrated windings, the q-axis of the rotor 304 is directed toward the U-phase stator pole 301.

The number of flux linkages to both a set of a V-phase winding 15 wound in a predetermined direction in loop and a V-phase winding 16 connected in series thereto and wound in the reverse direction in loop and that of W-phase windings 17 and 18 wound in loop at an operating point $(i_{d1}, i_{q1})$ of the armature current is determined as the d-axis flux-linkage number $\Psi_{d3}(i_{d1}, i_{q1})$ so as to be computed in accordance with the equation [44] set forth above.

Expressing the motor 150 illustrated in FIG. 40 by the motor model M10A illustrated in FIG. 23 provides the motor model M10A in which no back yoke of the stator core is arranged between a portion of the stator core close to the U-phase winding 13 and that thereof dose to the W-phase winding 18; this back yoke is illustrated in FIG. 23 by dashed lines.

This allows flux linkages $\Psi_{13}$ to the U-phase winding 13 to become zero, and also flux linkages $\Psi_{18}$ to the W-phase winding 18 to become zero. For this reason, in the expression of the motor 150 illustrated in FIG. 40 by the motor model M10A illustrated in FIG. 23, the U-phase winding 13 and W-phase winding 18 are eliminated.

In addition, in the expression of the motor 150 illustrated in FIG. 40 by the motor model M10A illustrated in FIG. 23, the U-phase stator pole 19, V-phase stator pole 20, and W-phase stator pole 21 illustrated in FIG. 40 respectively correspond to the U-phase stator pole 301, V-phase stator pole 302, and W-phase stator pole 303 illustrated in FIG. 23. In addition, the U-phase winding 14, the V-phase winding 15, the V-phase winding 16, and the W-phase winding 17 respectively corresponds to the looped U-phase winding 15, the looped V-phase winding 16, the looped V-phase winding 17, and the looped W-phase winding 18.

Based on the relationship between the motor 150 illustrated in FIG. 40 and the motor model M10A illustrated in FIG. 23, while the q-axis of the rotor 304 is directed toward the U-phase stator pole 301, and a three-phase armature current in the stationary coordinate system corresponding to the operating point $(i_{d1}, i_{q1})$ thereof is supplied to the three-phase windings 15 to 18, analysis based on the infinite element method is executed so as to compute the d-axis flux-linkage number $\Psi_{d3}(i_{d1}, i_{q1})$ in accordance with the following equation:

$$\Psi_{d3}(i_{d1}, i_{q1}) = \{(\phi_{18L} - 0) + (\phi_{17L} - \phi_{16L})\} \times N_S \times t_C/t_0 \times Pn \quad \text{[Equation 71]}$$

where $\phi_{16L}$, $\phi_{17L}$, and $\phi_{18L}$ respectively represent flux linkage components linked to the winding 16, winding 17, and winding 18 of the motor 150 illustrated in FIG. 40.

Next, while the d-axis of the rotor 304 is directed toward the U-phase stator pole 301, and a three-phase armature current in the stationary coordinate system corresponding to the operating point $(i_{d1}, i_{q1})$ thereof is supplied to the three-phase windings 15 to 18, analysis based on the infinite element method is executed so as to compute the q-axis flux-linkage number $\Psi_{q3}(i_{d1}, i_{q1})$ in accordance with the following equation:

$$\Psi_{q3}(i_{d1z}, i_{q1z}) = \{(0 - \phi_{18L}) + (\phi_{16L} - \phi_{17L})\} \times N_S \times t_C/t_0 \times Pn \quad \text{[Equation 72]}$$

where $(i_{d1z}, i_{q1z})$ is the three-phase armature current in the stationary coordinate system corresponding to the operating point $(i_{d1}, i_{q1})$; this three-phase armature current $(i_{d1z}, i_{q1z})$ is changed due to the difference of the rotational positions of the rotor 304 at 90 degrees electric angle.

How to compute the d-axis and q-axis inductances $L_d(i_{d1}, i_{q1})$ and $L_q(i_{d1}, i_{q1})$, and the data table T1 except for the d-axis and q-axis flux linkage numbers $\Psi_{d3}(i_{d1}, i_{q1})$ and $\Psi_{q3}(i_{d1}, i_{q1})$ have been described set forth above in accordance with the equations [27] to [43].

Repetition of the analysis with the nonlinear infinite element method based on the motor model M10A and that of the computing in accordance with the equations [27] to [43] allows the d-axis and q-axis flux-linkage numbers $\Psi_d$ and $\Psi_q$ and corresponding each operating point ($i_d$, $i_q$) of the armature current to be obtained.

The U-phase coil 15, V-phase coils 16 and 17, and W-phase coil 18 can be replaced with the M-phase and N-phase coils 38 and 39 illustrated in FIG. 46. The M-phase and N-phase coils 38 and 30 allow copper loss caused by the M- and N-phase coils 38 and 39 to be reduced as compared with that caused by the U-, V-, and W-phase winding structure. In addition, the M-phase and N-phase coils 38 and 30 allow the productivity of the motor 150 having the coils 38 and 39 to be kept high.

As described above, the M-phase current Im is equivalent to the sum of the U-phase current (−Iu) and the V-phase current (Iv) as follows:

$$Im = -Iu + Iv \qquad \text{[Equation 73]}$$

$$In = -Iv + Iw \qquad \text{[Equation 74]}$$

The d-axis and q-axis currents ($i_{d1}$, $i_{q1}$) on the d-q coordinate system can be converted into three-phase currents Iu, Iv, and Iw on the stationary coordinate system, and the instantaneous currents Im and In can be calculated in accordance with the equations [73] and [74]. The instantaneous currents Im and In can be used as the current values required to the analysis based on the nonlinear infinite element method.

The conversion relationship between the d-axis and q-axis currents on the d-q coordinate system and the three-phase currents on the stationary coordinate system allows the three-phase currents to be obtained; these three-phase currents can be used as the current values required to the analysis based on the infinite element method.

Specifically, the three-phase windings illustrated in FIG. 45 and the two-phase windings illustrated in FIG. 46 have substantially the same electromagnetic effects. For this reason, it is possible to convert the motor model illustrated in FIG. 46 having the two-phase windings into that illustrated in FIG. 45 having the three-phase windings, thus executing the analysis based on the infinite element method without using the equations [73] and [74].

Up to this point we have considered how to obtain the data table 72 illustrated in FIG. 9 and the data table T1 illustrated in FIG. 10 based on various types of motors.

Next, an example of computing the d-axis and q-axis inductances $L_d(i_d, i_q)$ and $L_q(i_d, i_q)$, the d-axis and q-axis flux linkage numbers $\Psi_{d3}(i_d, i_q)$ and $\Psi_{q3}(i_d, i_q)$, and the like based on a specific configured motor will be described hereinafter. In other words, the validity of the d-axis and q-axis inductances $L_d(i_d, i_q)$ and $L_q(i_d, i_q)$ obtained using the inductance computing method described in the steps (a) to (g) set forth above will be checked based on the multi flux-barrier synchronous motor illustrated in FIG. 1.

A method of checking the validity of the d-axis and q-axis inductances $L_d(i_d, i_q)$ and $L_q(i_d, i_q)$ at each operating point ($i_d$, $i_q$) of the armature current is to:

compare a torque $T_{fem}$ obtained using the nonlinear infinite element method with a torque T computed by assigning the inductances $L_d(i_d, i_q)$ and $L_q(i_d, i_q)$ to the equation [2] set forth above; and estimate the validity of the d-axis and q-axis inductances $L_d(i_d, i_q)$ and $L_q(i_d, i_q)$ based on the result of comparison.

Note that, in the first embodiment, the torque $T_{fem}$ obtained using the nonlinear infinite element method is assumed to be properly determined. Its well known that the accuracy of the torque $T_{fem}$ obtained using the reliable nonlinear infinite element method is highly dependable merely when the form accuracy, material characteristics, and condition setting associated with the model for the analysis target based on the reliable nonlinear infinite element method are properly determined.

FIG. 11 schematically illustrates torque-current characteristic curves of the motor 110 illustrated in FIG. 1. In FIG. 11, the horizontal axis represents the magnitude of the armature current $i_a$ [amperes], and the vertical axis represents the torque [Nm].

The phase angle θc of the armature current $i_a$ is set at 66 degrees electric angle.

In FIG. 11, reference character $T_{fem}$ represents a torque obtained using the nonlinear infinite element method set forth above.

Reference character $T_A$ represents a torque obtained by assigning, to the equation [2], the inductances $L_d(i_{d1}, i_{q1})$ and $L_q(i_{d1}, i_{q1})$ computed by the inductance computing steps (a) to (f) according to the first embodiment.

Reference character $T_B$ represents a torque obtained by assigning an inductances $L_d(i_{d1}, 0)$ and $L_q(0, i_{q1})$ to the equation [2]; this inductance $L_d(i_{d1}, 0)$ is obtained based on the d-axis current $i_{d1}$ and d-axis flux linkage number independently of the q-axis current and q-axis flux linkage number, and this inductance $L_q(0, i_{q1})$ is obtained based on the q-axis current $i_{q1}$ and q-axis flux linkage number independently of the d-axis current and d-axis flux linkage number.

Reference character $T_C$ represents a torque obtained by assigning a d-axis inductances $L_d$ and a q-axis inductance $L_q$ to the equation [2] when each of the d-axis inductances $L_d$ and q-axis inductance $L_q$ is assumed to a proportional constant within the overall range of the armature current; each of these d-axis inductance $L_d$ and q-axis inductance $L_q$ corresponds to a continuous rated current.

The accuracy of each of the inductances corresponding to one of the torques $T_A$, $T_B$, and $T_C$ is estimated by comparing each of the torques $T_A$, $T_B$, and $T_C$ with the torque $T_{fem}$.

The torque $T_A$ is closely matched with the torque $T_{fem}$ so that an error therebetween at the armature current $i_a$ of 180 amperes is a very low value of 3.3% (see FIG. 11).

The torque $T_B$ with no consideration of mutual interference between d-axis and q-axis has a largish margin of error in which an error between the torque $T_B$ and the torque $T_{fem}$ is a value of 13.9% (see FIG. 11).

The torque $T_C$ under each of the d-axis inductances $L_d$ and q-axis inductance $L_q$ being assumed to a proportional constant has a grate error between the torque $T_B$ and the torque $T_{fem}$ within the range of the armature current whose magnitude is comparatively high (see FIG. 11).

Next, the accuracy of the torque $T_A$ of the motor 110 illustrated in FIG. 1 obtained by assigning, to the equation [2], the inductances $L_d(i_{d1}, i_{q1})$ and $L_q(i_{d1}, i_{q1})$ computed by the inductance computing steps (a) to (f) set forth above within the range of the d-axis current being minimum is checked.

Figure 12:
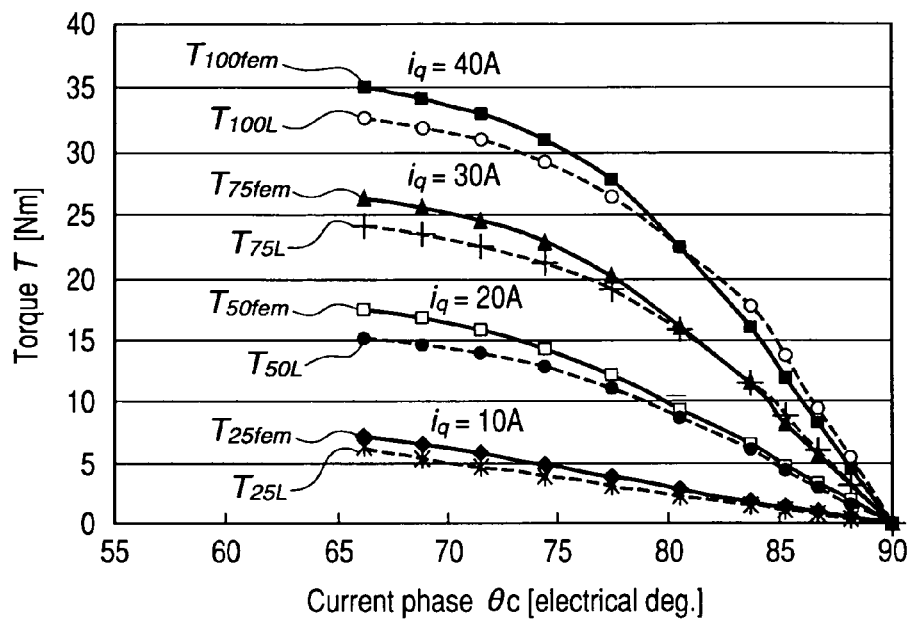
FIG. 12 is a graph schematically illustrating a torque-phase characteristic of the motor illustrated in FIG. 1 according to the first embodiment.

FIG. 12 schematically illustrates torque-phase characteristic curves of the motor 110 illustrated in FIG. 1. The horizontal axis of FIG. 12 represents the phase angle θc [degrees] of the armature current $i_a$, and the vertical is represents the torque T ($T_A$) [Nm]. The torque-phase characteristic curves are changed with change in the q-axis current $i_q$ in the order of 10 A [Amperes], 20 A, 30 A, and 40 A.

As clearly shown in FIG. 12, the torque $T_{25L}$ obtained by assigning, to the equation [2], the inductances $L_d(i_{d1}, 10[A])$ and $l_q(i_{d1}, 10[A])$ computed by the inductance computing steps (a) to (f) set forth above is closely matched with the torque $T_{fem}$ corresponding to the q-axis current $i_q$ equal to 10

A. Similarly, the torque $T_{50L}$ obtained by assigning, to the equation [2], the inductances $L_d(i_{d1}, 20$ [A]) and $L_q(i_{d1}, 20$ [A]) computed by the inductance computing steps (a) to (f) set forth above is closely matched with the torque $T_{fem}$ corresponding to the q-axis current $i_q$ equal to 20 A.

The torque $T_{75L}$ obtained by assign, to the equation [2], the inductances $L_d(i_{d1}, 30$ [A]) and $L_q(i_{d1}, 30$ [A]) computed by the inductance computing steps (a) to (f) set forth above is closely matched with the torque $T_{fem}$ corresponding to the q-axis current $i_q$ equal to 30 A. The torque $T_{100L}$ obtained by respectively assigning, to the equation [2], the inductances $L_d(i_{d1}, 40$ [A]) and $L_q(i_{d1}, 40$ [A]) computed by the inductance computing steps (a) to (f) set forth above is closely matched with the torque $T_{fem}$ corresponding to the q-axis current $i_q$ equal to 40 A.

Specifically, it is possible to properly compute the inductances $L_d(i_d, i_q)$ and $L_q(i_d, i_q)$ at each operating point $(i_d, i_q)$.

Next, the accuracy of the torque $T_A$ of the motor 110A illustrated in FIG. 13 obtained by assigning, to the equation [2], the inductances $L_d(i_{d1}, i_{q1})$ and $L_q(i_{d1}, i_{q1})$ computed by the inductance computing steps (a) to (f) set forth above is checked.

Voltage equations using a motor installed with permanent magnets are commonly categorized into a voltage component due to the armature current and a voltage component due to the permanent magnets. However, as expressed by the equation 9, because torque is expressed by outer product of armature current vector $i_a$ and flux linkage number vector $\Psi_a$, magnetic fluxes induced by the permanent magnets and other magnetic fluxes can be handled without separation. In this case, assuming that a ratio of each of all d-axis and q-axis flux linkage numbers $\Psi_d(i_d, i_q)$ and $\Psi_q(i_d, i_q)$ and a corresponding one of all operating points (d-axis and q-axis components $i_d$ and $i_q$) of the armature current is assumed to be the d-axis and q-axis inductances $L_d(i_d, i_q)$ and $L_q(i_d, i_q)$, the torque $T_A$ is computed in accordance with the equation [2].

Figure 14:
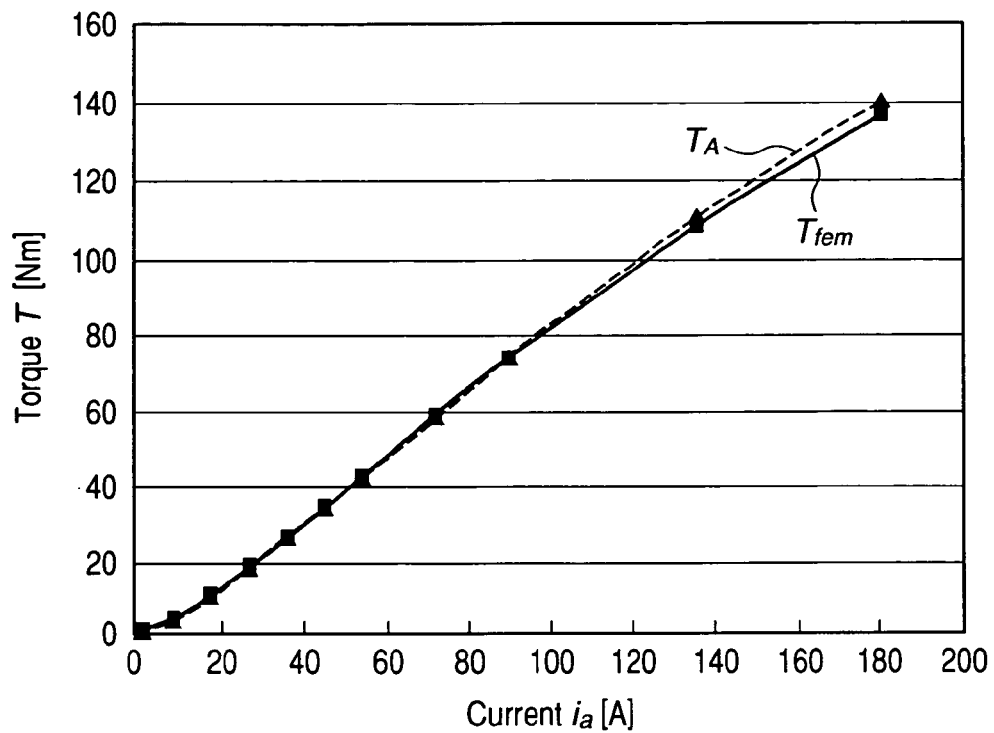
FIG. 14 is a graph schematically illustrating torque-current characteristic curves of the motor illustrated in FIG. 13 according to the first embodiment.

FIG. 14 schematically illustrates torque-current characteristic curves of the motor 110A illustrated in FIG. 13. In FIG. 14, the horizontal axis represents the magnitude of the armature current $i_a$ [amperes], and the vertical axis represents the torque [Nm].

In FIG. 14, reference character $T_A$ represents a torque obtained by assigning, to the equation [2], the inductances $L_d(i_d, i_q)$ and $L_q(i_d, i_q)$ of each operating point computed by the inductance computing steps (a) to (f) according to the first embodiment.

As clearly shown in FIG. 14, the torque $T_A$ is closely matched with the torque $T_{fem}$ so that an error therebetween at the armature current $i_a$ of 180 amperes is a very low value of 2.9%. As a result, it has been checked that the inductance computing steps (a) to (f) and the flux-linkage number computing steps based on the inductance computing steps (a) to (f) are effective.

Next, definition of rotor coordinate axes and rotatably shift of the rotor coordinate axes will be described hereinafter.

In the first embodiment, as one of the rotor coordinate systems, the d-axis and q-axis coordinate system has been used. One definition of the d-axis and q-axis coordinate system is that a direction of magnetic pole, of the rotor is determined as the d-axis, and a direction whose phase is 90 degrees ($\pi/2$ radian) electric angle leading with respect to the d-axis is determined as the q-axis. However, in interior permanent magnet brushless motors, the direction of magnetic pole is indefinite because it is changeable depending on the magnitude of the armature current and the phase thereof.

Figure 15:
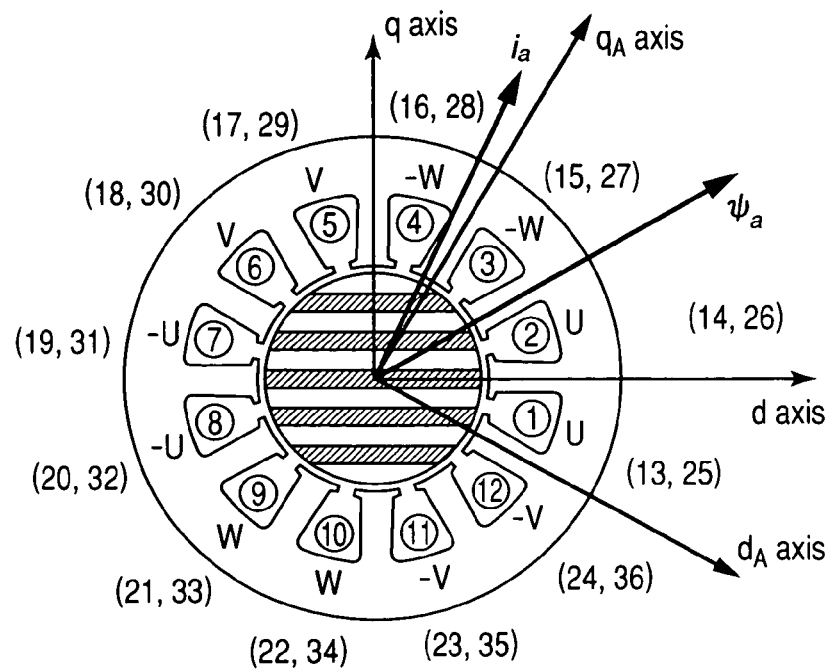
FIG. 15 is a lateral cross sectional view of the motor in which a d-q coordinate system defined in a rotor of the motor is converted into a $d_A$-$q_A$ coordinate system according to the first embodiment.

As a method of checking the validity of the d-axis and q-axis inductances $L_d(i_d, i_q)$ and $L_q(i_d, i_q)$ obtained using the inductance computing method described in the steps (a) to (g), the d-q axes illustrated in FIG. 5 is converted into $d_A$-$q_A$ axes illustrated in FIG. 15 by rotating the d-q axes by an electric angle of 30 degrees toward a negative q-axis direction.

In the motor 110 illustrated in FIG. 1, the $d_A$-axis and $q_A$-axis current components and the $d_A$-axis and $q_A$-axis magnetic flux components are computed based on the inductance computing steps (a) to (f), and a torque $T_{ACW}$ is obtained by assigning, to the equation [2], the inductances $L_{dA}(i_{dA}, i_{qA})$ and $L_{qA}(i_{dA}, i_{qA})$ of each operating point computed by the inductance computing steps (a) to (f) according to the first embodiment.

Figure 16:
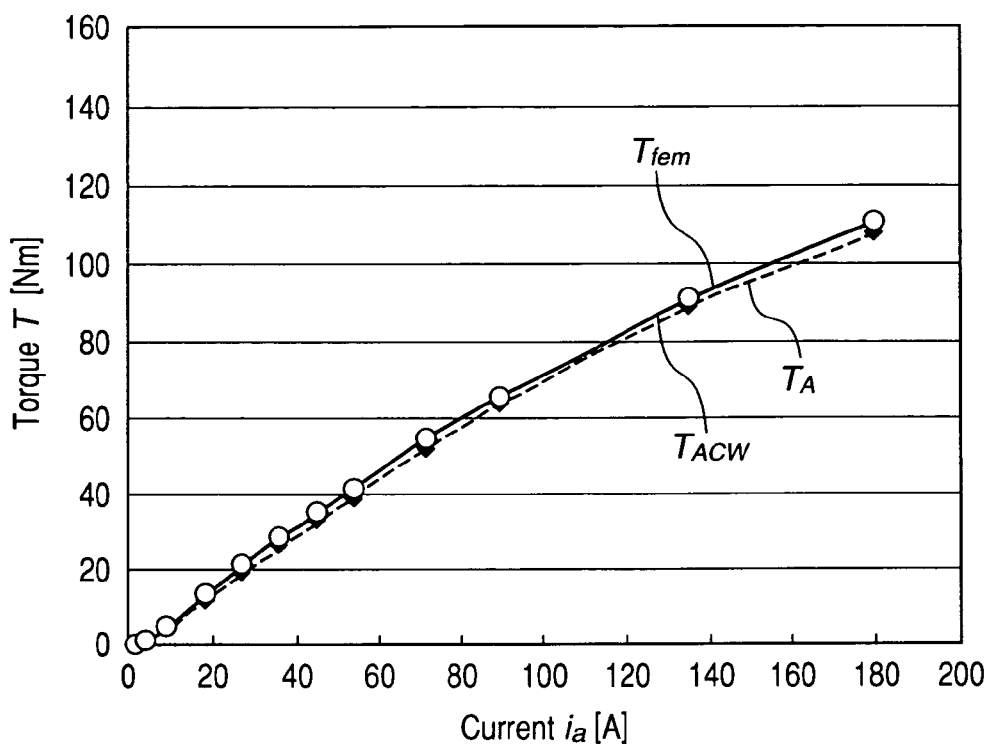
FIG. 16 is a graph schematically illustrating torque-current characteristic curves of the motor illustrated in FIG. 15.

FIG. 16 schematically illustrates torque-current characteristic curves of the motor illustrated in FIG. 15. In FIG. 16, the horizontal axis represents the magnitude of the armature current $i_a$ [amperes], and the vertical axis represents the torque [Nm].

As clearly shown in FIG. 16, the torque $T_{ACW}$ is closely matched with the torque $T_{fem}$ so that an error therebetween at the armature current $i_a$ of 180 amperes is a very low value of 2.7%.

In addition, the torque $T_A$ of the motor 110A illustrated in FIG. 16 is obtained by assigning, to the equation [2], the inductances $L_d(i_d, i_q)$ and $L_q(i_d, i_q)$ on the d-axis and q-axis illustrated in FIG. 5 is checked; these inductances $L_d(i_d, i_q)$ and $L_q(i_d, i_q)$ are computed by the inductance computing steps (a) to (f). As clearly shown in FIG. 16, the torque $T_{ACW}$ is substantially overlapped with the torque $T_A$. This clearly shows that computing of proper flux linkage numbers and/or inductances prevent great errors from occurring even if the d-q axes is rotated.

Figure 17:
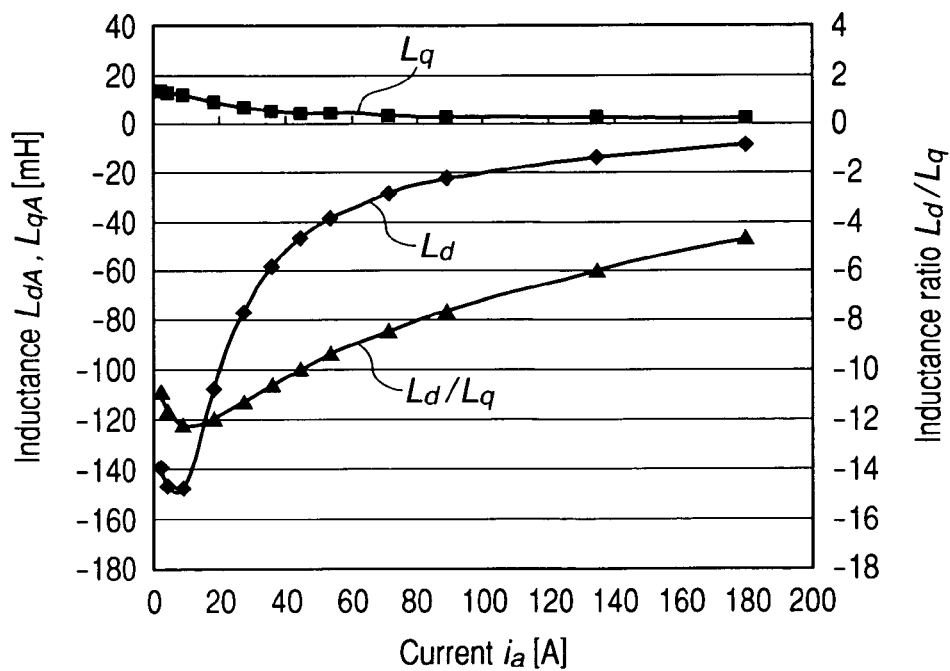
FIG. 17 is a graph schematically illustrating inductance-current characteristic curves of the motor on the $d_A$-$q_A$ axes illustrated in FIG. 15.

FIG. 17 schematically illustrates inductance-current characteristic curves of the motor on the $d_A$-$q_A$ axes illustrated in FIG. 15. In FIG. 17, the horizontal axis represents the magnitude of the armature current $i_a$ [amperes], and the vertical axis represents the torque [Nm].

In FIG. 17, reference character $d_{dA}$ represents a $d_A$-axis inductance $L_{dA}(i_{dA}, i_{qA})$ computed by the inductance computing steps (a) to (f), and reference character $L_{qA}$ represents a $q_A$-axis inductance $L_{qA}(i_{dA}, i_{qA})$ computed by the inductance computing steps (a) to (f). In addition, reference character $L_{qA}/L_{dA}$ is a ratio of the $q_A$-axis inductance $L_{qA}$ to the $d_A$-axis inductance $L_{dA}$. The $d_A$-axis and $q_A$-axis inductances $L_{dA}(i_{dA}, i_{qA})$ and $L_{qA}(i_{dA}, i_{qA})$ serves as a ratio of the $d_A$-axis and $q_A$-axis flux linkage numbers $\Psi_{dA}(i_{dA}, i_{qA})$ and $\Psi_{qA}(i_{dA}, i_{qA})$ to the armature current $(i_{dA}, i_{qA})$.

As illustrated in FIG. 17, the $q_A$-axis current $i_{qA}$ allows the almost of the $d_A$-axis flux linkage number $\Psi_{dA}(i_{dA}, i_{qA})$ to be generated in a direction opposite to the $d_A$-axis current $i_{dA}$; this causes the $d_A$-axis inductance $L_{dA}$ to become negative values. However, the $d_A$-axis inductance $L_{dA}$ is proper as a temporal value obtained during the outer product of the armature current vector $i_a$ and the flux linkage number vector $\Psi_a$, and therefore, the torque $T_{ACW}$ obtained as a result of the equation 2 is properly determined (see FIG. 16).

Specifically, in the first embodiment, the inductance computing steps (a) to (f) are effected independently of the definitions of the d-q axes in the rotating coordinate system.

In the first embodiment, the d-axis and q-axis are defined to be orthogonal to each other, but they can be defined to be crossed to each other at an arbitrary angle, such as an electric angle of 80 degrees or 60 degrees. Specifically, at least two coordinate axes in the rotating coordinate system can be defined such that they decompose each of vector v of voltage to be supplied to the motor, vector i of armature current to be supplied to the motor, and vector $\Psi$ of the number of flux linkage to each phase winging of the motor. In this case, it is possible to at least partially combine at least one vector of either one variable of voltage v, armature current i, or flux linkage number $\Psi$, thus providing at least one relational expression associated with at least one of the variables.

The number of axes defined in each of the motor models described in the first embodiment can be set at two, three, four, five, and the like. A coordinate system constituted by the number of axes can be established either on the rotor or the stator. In other words, a rotor coordinate system defined in the rotor and a stator coordinate system defined in the stator can be selected. In addition, a virtual third coordinate system different from the first rotor coordinate system and the second stator coordinate system can be used to determine each of the variables required to control the output of the corresponding motor.

Next, electromagnetic motor models to be used in the first embodiment of the present invention will be described hereinafter.

As illustrated in FIGS. 5 to 17 and described above, the torque $T_A$ is computed in accordance with the equation [2] or [10] based on the d-axis and q-axis inductances or d-axis and q-axis flux linkage numbers. These d-axis and q-axis inductances or d-axis and q-axis flux linkage numbers are computed by the inductance computing steps (a) to (f) using a pieces of data required to control the output of the motor. The validity of the computed torque $T_A$ has been checked; this checked result shows that the computed torque $T_A$ is properly determined.

As described above, one of electromagnetic motor models, its voltage equations, and the like are represented as the number $\Psi$ of flux linkages; this flux linkage number $\Psi$ is a function of inductance L and armature current i. As illustrated in FIG. 18, in the motor model M circled by dashed likes, the flux linkage number $\Psi$ is represented by the outer product of inductance L and armature current i. When the inductance L has a nonlinear characteristic curve with respect to change in the armature current i and/or depending on permanent magnets, it is more useful to express the electromagnetic motor model using the function of the flux linkage number $\Psi$ and armature current i.

Because the characteristic of the flux linkage number $\Psi$ is changed at every operating point of the armature current, it is more proper to electromagnetically model a motor with the use of the data table T1 representing a relationship between the d-axis and q-axis flux-linkage numbers $\Psi_d$ and $\Psi_q$ and corresponding each operating point $(i_d, i_q)$ of the armature current as described above.

Pieces of data stored in the data table T1 can be easily and properly generated based on pieces of data provided by the analysis of the nonlinear infinite method.

Modeling a target motor based on the flux linkage number $\Psi$ is to:

replace the product of d-axis inductance $L_d$ and the d-axis current $i_d$ with the $\Psi_d$ in accordance with the equation [6]; and replace the product of q-axis inductance $L_q$ and the q-axis current $i_q$ with the $\Psi_q$ in accordance with the equation [7]. The equations [6] and [7] also allows the data table T2 to be easily converted into the data table T1.

In the model of the target motor based on the flux linkage number $\Psi$, the voltage equation [1] can be easily changed to the expression the equation [8].

In the model of the target motor based on the flux linkage number $\Psi$, when the motor 110 has a comparatively grate capacity of, for example, 1 kW (kilowatts) so that the motor efficiency exceeds 90%, the resistance R of each winding of the stator has a comparatively low magnitude; this allows the equation [8] to be simplified as the equation [10]. The torque is expressed by the equation [9], and the vector diagram in the model of a motor based on the flux linkage number $\Psi$ is illustrated in FIG. 19.

Figure 19:
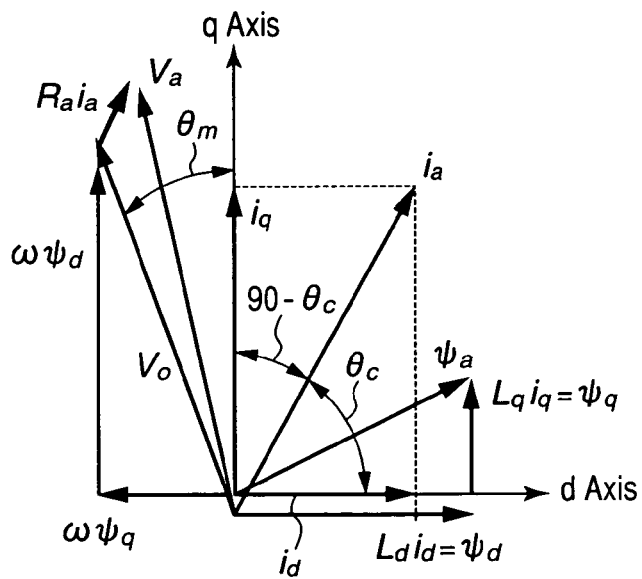
FIG. 19 is a vector diagram schematically illustrating d-axis and q-axis current vectors, voltage vectors, and d-axis and q-axis flux linkage number vectors of a motor model based on flux linkage number according to the first embodiment.

In FIG. 19, reference characters $i_a$, $i_d$, $i_q$, $V_a$, $V_o$, $\Psi_a$, $\Psi_d$, and $\Psi_q$ represent armature current vector, d-axis current vector, q-axis current vector, winding voltage vector (terminal voltage vector), resultant voltage vector, resultant flux-linkage number vector, d-axis flux-linkage number vector, and q-axis flux-linkage number vector, respectively. In addition, in FIG. 19, reference characters $L_d$, $L_q$, and $\omega$ respectively represents the d-axis inductance, the q-axis inductance, and the angular velocity $\omega$ of a target motor.

As clearly described with reference to the equations [2], [25] to [28], the data table T1 illustrated in FIG. 10, and the vector diagram illustrated in FIG. 19, the armature current i, the winding voltage v, the flux liege number $\Psi$, and the angular velocity $\omega$ of the target motor can electromagnetically model the target motor.

Next, a specific example of methods of the output torque of a target motor, such as a brushless motor, without executing field weakening control will be described hereinafter.

First, the inductance data table T2 illustrated in FIG. 9 and the flux-linkage number data table T1 illustrated in FIG. 10 have been generated to be stored in the storage units 131 and 132, respectively. Any one of the inductance data table T2 and the flux-linkage number data table T1 can be generated to be stored in a corresponding one of the storage units 131 and 132.

Next, control of the motor output by the control system CS illustrated in FIG. 4 is carried out based on the data tables T1 and T2. The motor output control has a specific task to reference the data table T2 using the torque demand T* and determine the d-axis command current $i_d$* and q-axis command current $i_q$* based on the reference result.

As clearly understood by the relationship defined by the equation 9, there are many combinations of a value of the d-axis current $i_d$ and that of the q-axis current $i_q$ capable of generating a value of the torque T. For this reason, the d-axis and q-axis command currents $i_d$* and $i_q$* are preferably determined from respective current ranges that allow the motor efficiency to be properly maintained without increasing copper loss of the target motor.

Specifically, a relationship between the pair of d-axis current $i_d$ and that of the q-axis current $i_q$ and the torque T is evaluated within a predetermined motor-operation range by a suitable pitch based on the nonlinear infinite element method with the use of a computer. This evaluation determines a d-axis current-torque characteristic curve CU1 and a q-axis current-torque characteristic curve CU2 illustrated in FIG. 20.

Specifying a value $T_1$* of the torque demand T* allows:

the d-axis current-torque characteristic curve CU1 to uniquely determine a value $i_{d1}$* of the d-axis command current $i_d$*; and the q-axis current-torque characteristic curve CU2 to uniquely determine a value $i_{q1}$* of the q-axis command current $i_q$*.

Figure 20:
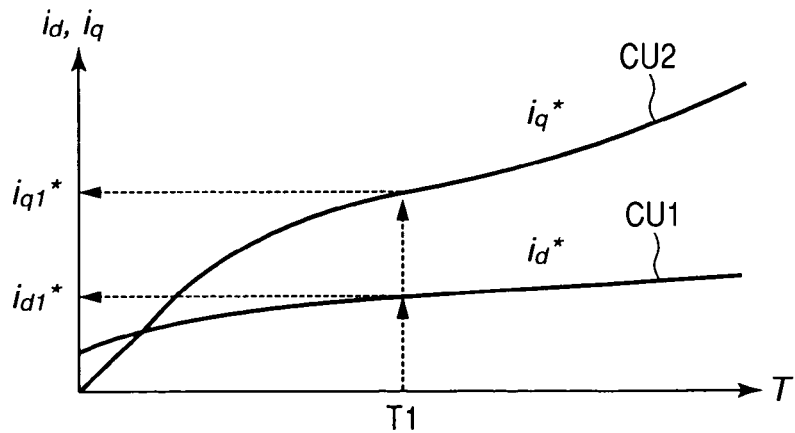
FIG. 20 is a graph schematically illustrating a d-axis current-torque characteristic curve and a q-axis current-torque characteristic curve according to the first embodiment.

The d-axis current-torque characteristic curve CU1 and the q-axis current-torque characteristic curve CU2 illustrated in FIG. 20 can be changed depending on various purposes for which the motor is used.

For example, the d-axis and q-axis current-torque characteristic curves CU1 and CU2 can be changed to determine a value of the d-axis command current $i_d$* and that of the q-axis command current $i_q$* by which copper loss is most reduced. The d-axis and q-axis current-torque characteristic curves CU1 and CU2 can be changed to determine a value of the d-axis command current $i_d^*$ and that of the q-axis command current $i_q^*$ by which the loss of the motor is most reduced at a desired angular velocity ω and the desired value of the torque T.

In addition, the d-axis and q-axis current-torque characteristic curves CU1 and CU2 can be changed to determine a value of the variable q-axis command current $i_q^*$ while the d-axis command current $i_d^*$ is kept constant. The d-axis and q-axis current-torque characteristic curves CU1 and CU2 can be changed to determine a value of the d-axis command current $i_d^*$ and that of the q-axis command current $i_q^*$ by which the responsibility of the motor more increases.

In FIG. 20, the d-axis and q-axis current-torque characteristics are represented by the curves CU1 and CU2. From a practical standpoint, the d-axis and q-axis current-torque characteristics have been stored in the command current determiner 596 as a data table (map) M. Specifically, the command current determiner 596 is programmed to:

reference the data table M using an input value of the torque demand T*; and uniquely determine, based on the reference result, a value of the d-axis command current $i_d^*$ corresponding to the input value of the torque demand T* and a value of the q-axis command current $i_q^*$ corresponding to the input value of the torque demand T*.

Note that the data table M has a limited capacity so that pieces of data representing the d-axis and q-axis current-torque characteristics are discrete. It is assumed that an input value of the torque demand T* corresponds to an interval between one value and its adjacent value of pieces of data of each of the d-axis and q-axis current-torque characteristics. In this assumption, it is possible to estimate a value of each of the d-axis command current $i_d^*$ and the q-axis command current $i_q^*$ corresponding to the input value of the torque demand T* by interpolation.

In this assumption, the command current determiner 596 can be programmed to:

create an approximate function of each of the d-axis and q-axis current-torque characteristics;

reference the approximate function using the input value of the torque demand T*; and determine a value of each of the d-axis command current $i_d^*$ and the q-axis command current $i_q^*$ corresponding to the input value of the torque demand T* based on the reference result.

In the control system CS, pieces of data representing the d-axis and q-axis flux-linkage numbers $\Psi_d$ and $\Psi_q$ defined at each operating point $(i_d, i_q)$ of the armature current can have been installed in a motor control program under which the microprocessor (control system CS) executes the tasks of the functional blocks illustrated in FIG. 4.

In the control system CS, pieces of data representing the d-axis and q-axis flux-linkage numbers $\Psi_d$ and $\Psi_q$ defined at each operating point $(i_d, i_q)$ of the armature current can have been stored in, for example, a database in place of the data tables T1 and T2. In this modification, the command current determiner 133 can receive on-line the pieces of data from the database and to generate at least one of the data table T1 and T2 or required values of the respective d-axis command current $i_d^*$ and the q-axis command current $i_q^*$ corresponding to the input value of the torque demand T* based on the received pieces of data from the database.

Next, a specific example of methods of the output torque of a target motor, such as a brushless motor, while using field weakening control will be described hereinafter.

The field weakening control is designed to control the amount of magnetic flux created in the motor, and therefore, can increase the rotational speed of the motor up to a predetermined high value even if the magnitude of the DC battery N95 of the three-phase inverter 59G.

In addition, the field weakening control is designed to control the winding voltage of the motor so as not to exceed the battery voltage and control the armature current so as not to exceed a constant value. This results that the motor output represented by the product of the winding voltage and the armature current becomes constant; this can implement constant output control. The constant output control allows the rotational speed of the motor to increase up to a predetermined high value without increase in the winding voltage of the motor. In other words, it is possible to control the output of the motor so as to increase the rotational speed thereof up to a predetermined high value without increase in the current capacity of each transistor of the inverter 59G. Thus, the inverter 59G can be reduced in size and manufacturing cost.

Such a motor output control based on the field weakening control will be described hereinafter.

First, the inductance data table T2 illustrated in FIG. 9 and the flux-linkage number data table T1 illustrated in FIG. 10 have been generated to be stored in the storage units 131 and 132, respectively. Any one of the inductance data table T2 and the flux-linkage number data table T1 can be generated to be stored in a corresponding one of the storage units 131 and 132. This allows the nonlinear electromagnetic characteristics of the target motor to be converted into numerical data.

Next, control of the motor output by the control system CS illustrated in FIG. 4 is carried out based on the data tables T1 and T2. The motor output control has a specific task to reference the data table T2 using the torque demand T* and determine the d-axis command current $i_d^*$ and q-axis command current $i_q^*$ based on the reference result.

Figures 21, 22:
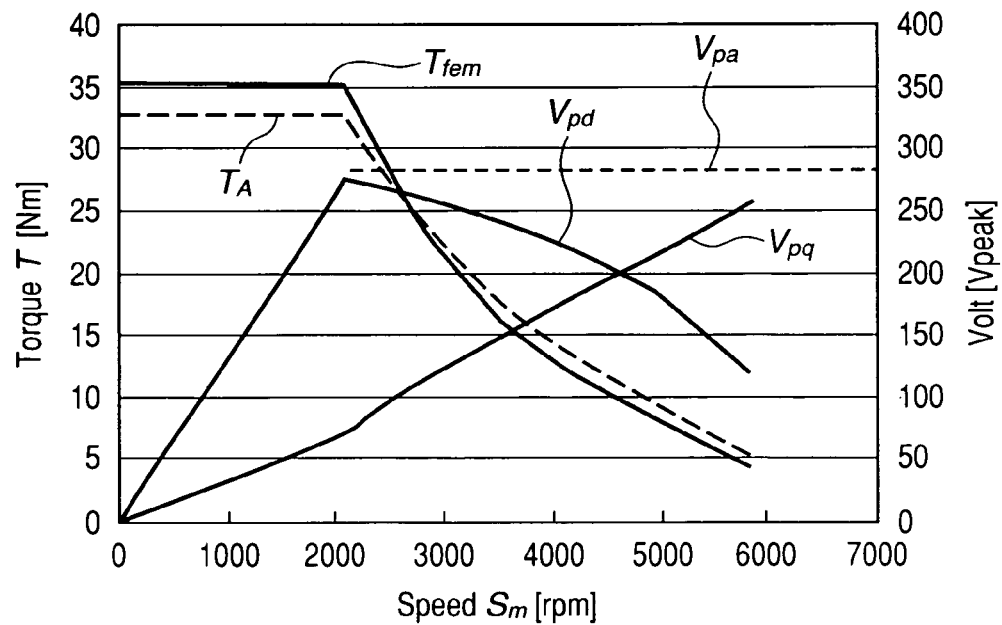
FIG. 21 is a view schematically illustrating a data table representing a relationship between values of an angular velocity and those of torque demand according to the first embodiment.
FIG. 22 is a graph schematically illustrating torque-speed characteristic curve and voltage-speed characteristic cue according to the first embodiment.

For example, pieces of data illustrated in FIG. 21 are stored in a data table T3 of the storage unit 132.

In FIG. 21, the horizontal axis of the data table T3 represents values $(\omega_1, \omega_2, \ldots \omega_m, \ldots, \omega_A)$ of the angular velocity ω, and the vertical axis thereof represents values $(T_1, T_2, \ldots, T_m, \ldots, T_B)$ of the torque demand T*. At an address in the data table T3 where each of the values of the horizontal axis and a corresponding one of the values of the vertical axis, an operating point $(i_d, i_q)$ of the armature current is located. The operating point $(i_d, i_q)$ of the armature current allows the magnitude of the flux linkage number Ψ and the motor voltage v corresponding to a pair of values of the angular velocity ω and the torque demand T* not to exceed an allowable voltage determined by the battery voltage of the inverter 59G.

The operating point $(i_d, i_q)$ of the armature current is calculated in accordance with the inductance data table illustrated in FIG. 9 or the flux-linkage number data table illustrated in FIG. 10 and the equations [1] to [10] such that the operating point $(i_d, i_q)$ of the armature current meets the condition in which the magnitude of the flux linkage number Ψ and the motor voltage v does not exceed the allowable voltage determined by the battery voltage of the inverter 59G.

A pair of values of the d-axis and q-axis inductances $(L_d, L_q)$ at each operating point $(i_d, i_q)$ of the armature current can be calculated based on the values illustrated in FIG. 9 by interpolation. Similarly, a pair of values of the d-axis and q-axis flux linkage numbers $(\Psi_d, \Psi_q)$ at each operating point $(i_d, i_q)$ of the armature current can be calculated based on the values illustrated in FIG. 10 by interpolation. The equation [1] or [8] allows the d-axis and q-axis voltages $(v_d, v_q)$ to be calculated. The output torque T can be calculated in accordance with the equation [2] or [9]. As a value of the output torque T corresponding to each operating point ($i_d$, $i_q$) of the armature current, a value of the torque $T_{fem}$ obtained based on the nonlinear infinite element method can be used.

The data table T3 allows the control system CS to execute the field weakening control so as to implement the constant output control of the target motor.

FIG. 22 schematically illustrates torque-speed characteristic curve and voltage-speed characteristic curve; these characteristic curves are obtained by subjecting a target motor, for example, illustrated in FIG. 1, to the field weakening control based on the data table T3. In FIG. 22, the horizontal axis represents the rotational speed [RPM] of the target motor, the left vertical axis represents the torque [Nm], and the right vertical axis represents the voltage [Volts (Peak-to-Peak)].

In FIG. 22, reference character $V_{pd}$ represents the d-axis voltage, reference character $V_{pq}$ represents the q-axis voltage, and reference character $V_{pa}$ represents a predetermined threshold voltage.

When the motor speed lies within a range higher than 2000 RPM, while the motor voltage takes on a value equal to or lower than the threshold voltage $V_{pa}$ of 280 [Volts (Peak-to-Peak)] illustrated by a dashed line, constant output characteristic curves when the operating point ($i_d$, $i_q$) of the armature current is determined to allow the magnitude of the flux linkage number $\Psi$ and the motor voltage v not to exceed the allowable voltage determined by the battery voltage of the inverter 59G are illustrated in FIG. 22.

At that time, reference character $T_A$ represents a torque curve obtained based on the data table T3 illustrated in FIG. 21, and reference character $T_{fem}$ represents a torque curve obtained using the nonlinear infinite element method at the operating point ($i_d$, $i_q$) of the armature current.

As illustrated in FIG. 22, when the motor speed increases to exceed, for example, 5000 [RPM], the q-axis voltage $V_{pq}$, which is desired to be small for normal motors, is higher than the d-axis voltage $V_{pd}$. This can determine the operating point ($i_d$, $i_q$) of the armature current so as to allow the magnitude of the flux linkage number $\Psi$ and the motor voltage v not to exceed the allowable voltage determined by the battery voltage of the inverter 59G.

Note that, for example, when a value of the torque demand T* is lower than the torque $T_A$, reduction of the q-axis current of the corresponding operating point ($i_d$, $i_q$) of the armature current commonly allows the motor output torque to decrease to a desired value while maintaining the motor voltage at a value lower than the threshold voltage $V_{pa}$.

Note that requirements to execute the constant output control of the target motor within a range under the flux weakening control include:

adjustment of the angular velocity ω and the torque T to respective desirable values; and control of each of the winding voltage and armature current so as not to exceed the current capacity of each transistor of the inverter 59G.

For this reason, there is a certain level of flexibility of determining the winding voltage v, the armature current i, and the current phase.

Specifically, as set forth above, it is possible to determine the winding voltage v, the armature current i, and the current phase so as to:

determine a value of the d-axis command current $i_d^*$ and that of the q-axis command current $i_q^*$ by which copper loss is most reduced;

determine a value of the d-axis command current $i_d^*$ and that of the q-axis command current $i_q^*$ by which the loss of the motor is most reduced at a desired angular velocity ω and the desired value of the torque T;

determine a value of the variable q-axis command current $i_q^*$ while the d-axis command current $i_d^*$ is kept constant; and determine a value of the d-axis command current $i_d^*$ and that of the q-axis command current $i_q^*$ by which the responsibility of the motor more increases.

An example of the vector diagram in the synchronous motor 110 illustrated in, for example, FIGS. 1 and 2, is illustrated in FIG. 19.

In FIG. 19, the horizontal axis represents the d-axis, and the vertical axis represents the q-axis. Reference characters $i_a$, $i_d$, $i_q$, $V_a$, $V_o$, $\Psi_a$, $\Psi_d$, and $\Psi_q$ represent armature current vector, d-axis current vector, q-axis current vector, winding voltage vector, resultant voltage vector, resultant flux-linkage number vector, d-axis flux-linkage number vector, and q-axis flux-linkage number vector, respectively. In addition, in FIG. 19, reference characters $L_d$, $L_q$, and ω respectively represents the d-axis inductance, the q-axis inductance, and the angular velocity ω of a target motor.

The d-axis and q-axis voltages $v_d$ and $v_q$ are expressed by the equation [1] or [8], specifically, expressed by d-axis and q-axis voltage components based on the flux linkage number, represented as "$-\omega\Psi d$" and "$\omega\Psi q$" on d-axis and q-axis voltage drop components due to winding resistance, represented by "$i_d \times R$" and "$i_q \times R$". The sum of the d-axis and q-axis voltage components is represented by the resultant voltage vector $V_o$. The sum of the resultant voltage vector $V_o$ and the voltage drop component $i_d \times Ra$ due to winding resistance Ra is represented by the winding voltage (terminal voltage) $V_a$. The phase in the armature current $i_a$ is represented by θc, and the power factor β of the motor 110 is represented by the following equation:

$$\beta = \cos(90° - \theta c + \theta m) \quad \text{[Equation 75]}$$

As described above, various state parameters representing the behaviors of the motor 110 can be expressed by the vector diagram illustrated in FIG. 19.

In the FIG. 19, the d-axis and q-axis inductances $L_d$ and $L_q$ are respectively represented by the equations a "$\Psi_d = L_d \times i_d$" and "$\Psi_q = L_q = i_q$" in accordance with the equations [6] and [7]. Thus, the vector diagram illustrated in FIG. 19 can be represented by the d-axis and q-axis flux linkage numbers $\Psi_d$ and $\Psi_q$ without using the d-axis and q-axis inductances $L_d$ and $L_q$.

When a motor integrated with a plurality of permanent magnets, the motor can be expressed, as one example, by a model defined by the equations [14] to [19]. Specifically, the flux linkages Φ can be divided into the flux linkages $\Phi_{md}$ and $\Phi_{mq}$ due to the permanent magnets and the flux linkages $\Phi_d$ and $\Phi_q$ due to the armature current.

Similarly, the flux linkage numbers Ψ can be divided into the flux linkage numbers $\Psi_{md}$ and $\Psi_{mq}$ due to the permanent magnets and the flux linkages $\Psi_d$ and $\Psi_q$ due to the armature current.

In addition, FIG. 18 schematically illustrates a basic electromagnetic model of a motor M. Input 251 to the motor M includes a winding voltage vector v and an armature current vector i. Output 252 of the motor M includes the angular velocity ω and the torque T. The various state parameters representing the behaviors of the motor 110 can be expressed by the equations set forth above using the winding voltage vector v, the armature current vector i, and the flux linkage number vector Ψ.

For example, the input power to the motor model M can be represented by the scalar product of the winding voltage vector v and the armature current vector i. The torque T of the motor model M can be represented by the vector product of the armature current vector i and the flux linkage number vector $\Psi$. The output power of the motor model M can be represented by the scalar product of the torque T and the angular velocity $\omega$. Note that, in FIG. 18, the inner loss of the motor model M is omitted for the purpose of simplification.

When the inductance L is represented as a complicated function of armature current in place of a proportional constant between armature current and the number of flux linkages, each of the equations set forth above and each of the control parameters required to control the motor output can be directly expressed based on the flux linkage number $\Psi$ without using the inductance L. This simplifies the motor control software, thus increasing the motor-control software execution speed of the microprocessor. As specific equations for representing the motor, the equations [8], [15], [17], [18], [19], and the like can be used.

As described hereinafter, as a more precise motor model, it is possible to consider leakage inductance, the number of d-axis and q-axis leakage flux linkages $\Psi_{kd}$ and $\Psi_{kq}$, and iron loss. In commonly highly-efficient motors, even if leakage magnetic flux, iron loss, and mechanical loss are negligible because the evaluation of operating characteristics, such as motor operating characteristics, and motor operation would not be effected on the leakage magnetic flux, iron loss, and mechanical loss.

Next, switching control of the motor control mode will be described hereinafter. There are various requirements for motor control depending on the use and/or the motor characteristics. During the operation of a motor installed in a device, various operating characteristics of the motor may be momentarily required. For example, high-response control in which the highest priority is given to response may be required, or control for achieving the maximum efficiency may be required. In addition, an intermediate control between the high-response control and the maximum efficiency control may be required, control in which the motor is driven at its high rotational speed may be required, or constant output control may be required.

When the motor control is compared to vehicle drive, a vehicle is required to be driven with the heist priority given to its performance when a great acceleration is requested, and driven with the heist priority given to its efficiency when a constant vehicle speed or regenerative control is requested.

In order to specifically meet the requirements, the motor control system CS is programmed to have:

a first function of grasping current one of the operating modes of the motor;

a second function of storing a data table required for the motor control system CS to cause it to operate in the current one of the operating modes of the motor; and a third function of switching another one of the operating modes from the current operating mode when need arises.

The first function can be simply configured to grasp exterior instructions. In addition, the first function can be configured to determine the operating states of the motor based on the motor torque operating modes of the motor;

operating modes of the motor;

angular velocity $\omega$, and determine the operating mode of the motor based on the determined operating states of the motor.

For example, when the torque T is higher than a threshold value, the vehicle is required to be driven with the heist priority given to its performance. In contrast, when the torque T is lower than the threshold value, the vehicle is required to be driven with the highest priority given to its efficiency.

Data tables required to implement the various operating modes, such as the data table representing the current-torque characteristic curves CU1 and CU2, and the data table T3 can have been prepared. A plurality of programs that cause the control system CS to operate in any one of the various operating modes corresponding to one of the prepared data tables have been prepared.

The third function is programmed to grasp the current operating mode based on information passed from the first function, select one of the plurality of programs corresponding to the information, and cause the control system CS to execute the selected one of the programs. This makes it possible to drive the motor while switching any one of the various operating modes to thereby meet momentary requests.

Next, a method of improving the control accuracy of a motor will be described hereinafter. In order to accurately control a motor, it is effective to calculate more precisely voltage signals and apply them to the motor.

In the control system CS illustrated in FIG. 4, the d-axis command current $i_d^*$ and q-axis command current $i_q^*$ are determined by the command current determiner 133 based on the torque demand T* and at least one of the data tables T1 and T2.

Thereafter, in accordance with the following equations, the d-axis feedforward voltage command FFd and q-axis feedforward voltage command FFq are generated by the feedforward voltage determiner 134 based on the d-axis and q-axis flux-linkage numbers $\Psi_d$ and $\Psi_q$ corresponding to the d-axis and q-axis command currents $i_d^*$ and $i_q^*$ and the detected rotational speed $\omega$:

$$FFd = Vd \qquad \text{[Equation 76]}$$

$$FFq = Vq \qquad \text{[Equation 77]}$$

On the other hand, the instantaneous U- and W-phase winding currents $i_u$ and $i_w$ detected by the current sensor and passed therefrom are converted by the converter 59H into the instantaneous d- and q-axis current components $i_d$ and $i_q$.

The difference between the d-axis current component $i_d$ from the d-axis command current $i_d^*$ is calculated by the d-axis current difference detector 59S.

As the compensating operation, the proportional term and the integral term are calculated by the d-axis current controller 136 based on the d-axis current difference so that the d-axis current control voltage command proportional to the current-loop gain $G_d$ is obtained to be passed to the d-axis voltage controller 59A.

The sum of the d-axis current control voltage command passed from the d-axis current controller 136 and the d-axis feedforward voltage command FFd is calculated by the d-axis voltage controller 59A. The calculated sum of the d-axis current control voltage is passed to the converter 59F as the d-axis command voltage $v_d^*$.

Similarly, the difference between the q-axis current component $i_q$ from the q-axis command current $i_q^*$ is calculated by the q-axis current difference detector 59C.

As the compensating operation, the proportional term and the integral term are calculated by the q-axis current controller 137 based on the q-axis current difference so that the q-axis current control voltage command proportional to the current-loop gain $G_q$ is obtained to be passed to the q-axis voltage controller 59E.

The sum of the q-axis current control voltage command passed from the q-axis current controller 137 and the q-axis feedforward voltage command FFq is calculated by the q-axis voltage controller 59B. The calculated sum of the q-axis current control voltage is passed to the converter 59F as the q-axis command voltage $V_q^*$.

These operations of the control system CS can precisely calculate the d-axis command voltage $v_d^*$ and the q-axis command voltage $v_q^*$. The precisely calculated d-axis command voltage $v_d^*$ and q-axis command voltage $V_q^*$ are converted into the U-, V-, and W-phase voltage commands $V_u^*$, $V_v^*$, and $V_w^*$ by the converter 59F to be applied to the three-phase windings of the motor 110 via the three-phase inverter 59G. This makes it possible to control the armature current to be supplied to the motor 110 within a wide range. Pieces of data to be used by these operations of the control system CS are based on the relationship between the d-axis and q-axis flux-linkage numbers $\Psi_d(i_d, i_q)$ and $\Psi_q(i_d, i_q)$ and corresponding each operating point $(i_d, i_q)$ of the armature current; this relationship has been computed on the basis of the nonlinear infinite element method set forth above.

Specifically, the pieces of data to be used by these operations of the control system CS have been precisely computed in view of the nonlinearity of the magnetic property of the motor 110, the magnetic saturation thereof, and/or transient voltage characteristics of the armature current. In contrast, in conventional methods, although the d-axis inductance $L_d$ and q-axis inductance $L_q$ have a nonlinear characteristic curve and do not a constant value, the d-axis inductance $L_d$ and q-axis inductance $L_q$ are assumed to be constant values; this may result that a significant error occurs in the most of the armature current range.

In the descriptions set forth above, the d-axis feedforward voltage command FFd and q-axis feedforward voltage command FFq are generated based on the d-axis and q-axis command currents $i_d^*$ and $i_q^*$, but they can be generated based on the instantaneous currents $i_d$ and $i_q$ in accordance with the data table T1 and the equation [8]. This can compute the d-axis feedforward voltage command FFd and q-axis feedforward voltage command FFq based on the instantaneous currents $i_d$ and $i_q$ close to the armature current to be actually supplied to the three-phase windings of the motor 110.

When the difference between the d-axis and q-axis current components $(i_d, i_q)$ and the d-axis and q-axis command currents $(i_d^*, i_q^*)$ are increased due to nonlinear characteristics of the inverter 59G and voltage saturation caused therein, the latter method can be more effective.

In addition, it is possible to generate the d-axis feedforward voltage command FFd and q-axis feedforward voltage command FFq based on intermediate values between the d-axis and q-axis command currents $i_d^*$ and $i_q^*$ and the instantaneous currents $i_d$ and $i_q$, respectively. Moreover, voltage saturation occurs in inverter 59G, the current values to be used to generate the d-axis feedforward voltage command FFd and q-axis feedforward voltage command FFq can be respectively switched from the d-axis and q-axis command currents $i_d^*$ and $i_q^*$ to the instantaneous currents $i_d$ and $i_q$. These modified motor-control operations can be implemented by slightly changing appropriate blocks in the control system CS.

In the control system CS, because each of the operating blocks therein is configured to execute allocated operations under sampling control, there may be time-delays among the respective operating blocks. Thus, it is effective to compensate the time-delays among the respective operating blocks. For example, when a calculation for motor control is executed, a timing at which the calculated result will be actually reflected on the armature current and/or winding voltage to be applied to the motor is estimated. Therefore, the calculated result is reflected on the motor control according to the estimated timing. This makes it possible to compensate a time-lag component that can be estimated, increasing the accuracy of the motor control.

Next, a method of improving the accuracy of the motor control by op fling the current-control loop gains at each operating point of the armature current will be described hereinafter.

An excessively increased current-control loop gain may cause oscillation phenomenon, deteriorating the accuracy of the motor control. In addition, an excessively increased current-control loop gain may cause an overcurrent to flow through, for example, each transistor of the inverter 59G; this may negatively affect it.

In contrast, an excessively decreased current-control loop gain may cause the responsibility of the motor with respect to the command current to be reduced, increasing current control error and deteriorating the motor-control capability of the control system CS.

In order to accurately control a motor, more properly motor model has been established in the control system CS, and simultaneously, it is important to calibrate the current-control loop gains at each operating point of the armature current so as to respond to the nonlinearity of the magnetic property of the motor and to variations in the battery voltage.

As described above, in the motor whose d-axis and q-axis inductances have nonlinear characteristic curves with respect to change in the armature current, the difference between the d-axis inductance and the q-axis inductance within an armature-current lower range may be greater by ten times than the difference between the d-axis inductance and the q-axis inductance within an armature-current higher range. For example, in hybrid vehicles, it is assumed that automatic vehicle positioning for entering a vehicle into a garage is executed by a motor. In this assumption, when the current-control loop gains $G_d$ and $G_q$ are determined to respective values that prevent an excessively high armature current at, for example, acceleration, in a low armature current range used for the automatic vehicle positioning, the current-control loop gains $G_d$ and $G_q$ are insufficient in magnitude due to several-times increased inductances $L_d$ and $L_q$. This may deteriorate the responsibility of the control system CS.

In addition, when the constant output control based on the field weakening control is executed within a high RPM region, adjustments to avoid the saturation of the battery voltage and to secure the stability of the armature current may become complicated.

In order to solve the problems, the control system CS is configured to, for example, change the current-control loop gains $G_d$ and $G_q$ according to the operating point $(i_d, i_q)$ of the armature current. This can control the current-control loop gains $G_d$ and $G_q$ without being effected by the magnitude of the operating point $(i_d, i_q)$ of the armature current.

How to specifically compute the current-control loop gains $G_d$ and $G_q$ is to use the data table T1 illustrated in FIG. 10. During the motor control, when the d-axis command current $i_d^*$ and q-axis command current $i_q^*$ are determined by the command current determiner 133, a narrow range of each of the d-axis and q-axis flux linkage numbers $\Psi_d$ and $\Psi_q$ corresponding to a narrow range of the d-axis command current $i_d^*$ and q-axis command current $i_q^*$ are readout from the data table T1.

The change rate of the row range $\Delta\Psi d$ of the d-axis flux linkage number $\Psi_d$ with respect to the narrow range $\Delta i_d$ of the d-axis command current $i_d^*$ is calculated in accordance with the following equation [78] as the d-axis current-control loop gain $G_d$ equivalent to the d-axis inductance $L_d$:

$$G_d = L_{rd} = \Delta\Psi_d / \Delta i_d \qquad \text{[Equation 78]}$$

Similarly, the change rate of the narrow range $\Delta\Psi_q$ of the q-axis flux linkage number $\Psi_q$ with respect to the narrow range $\Delta i_q$ of the q-axis command current $i_q^*$ is calculated in accordance with the following equation [79] as the q-axis current-control loop gain $G_q$ equivalent to the q-axis inductance $L_q$;

$$G_q = L_{rq} = \Delta \Psi_q / \Delta i_q \qquad \text{[Equation 79]}$$

The calculated d-axis and q-axis current-control loop gains $G_d$ and $G_q$ are used by the d-axis current controller 136 and the q-axis current controller 137, respectively. This allows, as gain of current control loop, inductances $L_{rd}$ and $G_{rq}$ of the motor to be canceled out by the d-axis and q-axis current-control loop gains $G_d$ and $G_q$. This can keep the loop gain of the current control loop constant independently of the magnitude of the armature current, making it possible to accurately execute the feedback control of the armature current to be supplied to the motor 110 within a wide range.

When the PWM frequency (ON and OFF frequency) of the PWM drive signal to be applied to each of the individual power transistor elements of the inverter 59G is changed so as to reduce switching loss of the inverter 59G and/or reduce iron loss of the motor 110, the variable determination of each of the d-axis and q-axis current-control loop gains $G_d$ and $G_q$ is effective.

Similarly, when the dead band of each of the high-side transistor elements N96 to N98 and each of the low-side transistor elements N9A to N9C and current sensitivity reduction are compensated, the variable determination of each of the d-axis and q-axis current-control loop gains $G_d$ and $G_q$ is also effective.

The current-control loop gains $G_d$ and $G_q$ can be computed based on the data table T2 illustrated in FIG. 9 in a similar manner as the data table T1. In place of the d-axis and q-axis command currents $i_d^*$ and $i_q^*$, the current-control loop gains $G_d$ and $G_q$ can be computed based on the instantaneous currents $i_d$ and $i_q$ in accordance with the data table T1 or T2.

In addition, it is possible to compute the current-control loop gains $G_d$ and $G_q$ based on intermediate values between the d-axis and q-axis command currents $i_d^*$ and $i_q^*$ and the instantaneous currents $i_d$ and $i_q$, respectively. Especially, when the armature current widely varies due to disturbance, such as variations in the battery voltage, the current values to be used to calculate the current-control loop gains $G_d$ and $G_q$ are preferably switched respectively from the d-axis and q-axis command currents $i_d^*$ and $i_q^*$ to the instantaneous currents $i_d$ and $i_q$.

It is also possible to compute the current-control loop gains $G_d$ and $G_q$ based on both the d-axis and q-axis command cents $i_d^*$ and $i_q^*$ and the instantaneous currents $i_d$ and $i_q$. It is further possible to compute the current-control loop gains $G_d$ and $G_q$ based on the selected either the d-axis and q-axis command currents $i_d^*$ and $i_q^*$ or the instantaneous currents $i_d$ and $i_q$ depending on motor control conditions.

Next, a method of reducing the amount of successive computing operations for the motor control set forth above so as to reduce the amount of real-time computing operations of the microprocessor will be described hereinafter.

As an example of the motor control set forth above, a method of successively computing the equations [76] to [78] based on the data tables T1 and T2 has been described. In the reducing method, the equations [76] to [78] have been already computed, and the result values of the equations [76] to [78] have been respectively stored in the data table T1 or data table T2 as elements thereof. This allows the amount of real-time computing operations of the microprocessor to be reduced.

Either the d-axis and q-axis feedforward voltage commands FFd and FFq or the d-axis and q-axis current-control loop gains $G_d$ and $G_q$ at each operating point ($i_d$, $i_q$) of the armature current can be calculated based on values of the inductances $L_d$ and $L_q$ of the data table T2 by interpolation; these values of the inductances correspond to a range close to each operating point ($i_d$, $i_q$) of the armature current.

Similarly, either the d-axis and q-axis feedforward voltage commands FFd and FFq or the d-axis and q-axis current-control loop gains $G_d$ and $G_q$ at each operating point ($i_d$, $i_q$) of the armature current can be calculated based on values of the flux linkage numbers $\Psi_d$ and $\Psi_q$ of the data table T1 by interpolation; these values of the inductances correspond to a range close to each operating point ($i_d$, $i_q$) of the armature current.

In addition, for either the d-axis and q-axis feedforward voltage commands FFd and FFq or the d-axis and q-axis current-control loop gas $G_d$ and $G_q$ at each operating point ($i_d$, $i_q$) of the armature current values of the inductances $L_d$ and $L_q$ of the data table T2 can be used; these values of the inductances correspond to values close to each operating point ($i_d$, $i_q$) of the armature current.

Similarly, for either the d-axis and q-axis feedforward voltage commands FFd and FFq or the d-axis and q-axis current-control loop gains $G_d$ and $G_q$ at each operating point ($i_d$, $i_q$) of the armature current, values of the flux linkage numbers $\Psi_d$ and $\Psi_q$ of the data table T1 can be used; these values of the inductances correspond to values close to each operating point ($i_d$, $i_q$) of the armature current.

Next, a method of controlling a precise motor model to which the d-axis and q-axis leakage flux linkage numbers $\Psi_{kd}$ and $\Psi_{kq}$ are added will be described hereinafter.

The flux leakage number means the number (ineffective number) of flux linkages to a corresponding winding without contributing creation of torque. For example, the number of flux linkages to the coil ends of the corresponding windings is defined as the flux leakage number. The magnitude in each of the d-axis and q-axis leakage flux linkage numbers $\Psi_{kd}$ and $\Psi_{kd}$ is changed depending on the type of the target motor. When each of the d-axis and q-axis leakage flux linkage numbers $\Psi_{kd}$ and $\Psi_{kd}$ is increased, this may influence on the output of the motor.

The equation 14 is deformed to include the d-axis and q-axis leakage flux linkage numbers $\Psi_{kd}$ and $\Psi_{kq}$ as follows:

$$vd = R \cdot id + p(\Psi d + \Psi kd) - \omega \cdot Lq \cdot iq - \omega \cdot \Psi mq \qquad \text{[Equation 80]}$$

$$vq = \omega \cdot \Psi d + R \cdot iq + p(\Psi q + \Psi kq) + \omega \cdot \Psi md \qquad \text{[Equation 81]}$$

At that time, the d-axis and q-axis leakage flux linkage numbers $\Psi_{kd}$ and $\Psi_{kg}$ have relationships with respect to d-axis and q-axis leakage inductances $L_{kd}$ and $L_{kq}$; these relationships are expressed by the following equations:

$$\Psi kd = Lkd \cdot id \qquad \text{[Equation 82]}$$

$$\Psi kq = Lkq \cdot iq \qquad \text{[Equation 83]}$$

Figure 27:
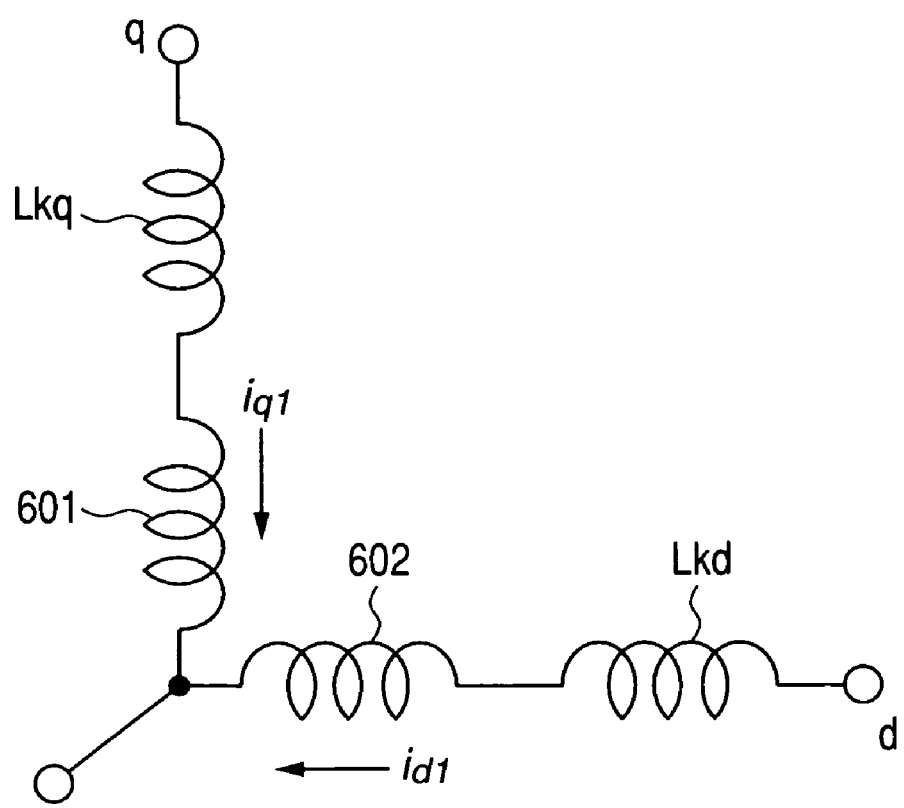
FIG. 27 is a view schematically illustrating a motor model constituted by d-axis and q-axis windings and d-axis and q-axis leakage inductances according to the first embodiment of the present invention.

Adding the d-axis and q-axis leakage inductances $L_{kd}$ and $L_{kq}$ to an equivalent circuit illustrated in FIG. 7 provides a motor model (see FIG. 27) consisting of d-axis and q-axis windings equivalent to the U-phase, V-phase, and W-phase windings illustrated in FIG. 6.

The equations 80 and 81 can be expressed by the following equation:

$$\begin{bmatrix} v_d \\ v_q \end{bmatrix} = \begin{bmatrix} R + p(L_d + L_{kd}) & -\omega L_q \\ \omega L_d & R + p(L_q - L_{kq}) \end{bmatrix} \begin{bmatrix} i_d \\ i_q \end{bmatrix} + \begin{bmatrix} -\omega \Psi_{mq} \\ \omega \Psi_{md} \end{bmatrix} \qquad \text{[Equation 84]}$$

As described above, adding the d-axis and q-axis leakage flux linkage numbers $\Psi_{kd}$ and $\Psi_{kg}$ or the d-axis and q-axis leakage inductances $L_{kd}$ and $L_{kq}$ to the motor model consisting of the d-axis and q-axis windings allows more precisely motor control to be implemented. Note that the output torque of the motor model including the d-axis and q-axis leakage flux linkage numbers $\Psi_{kd}$ and $\Psi_{kq}$ or the d-axis and q-axis leakage inductances $L_{kd}$ and $L_{kq}$ can be expressed by the equation 2, 10, 16, or 17, and therefore, on these equations, the output torque of the motor model has unaffected by the d-axis and q-axis leakage flux linkage numbers $\Psi_{kd}$ and $\Psi_{kq}$ or the d-axis and q-axis leakage inductances $L_{kd}$ and $L_{kq}$. However, in the leakage magnetic flux, magnetic energy is stored so that power factor may decrease and the magnetic circuit in the motor may be magnetically saturated; these problems may contribute to the reduction in the output torque of the motor and to the motor output limitation.

In the first embodiment, in the method of controlling the leakage flux linkage numbers using the equations [80] to [84], the d-axis and q-axis leakage flux linkage numbers $\Psi_{kd}$ and $\Psi_{kq}$ or the d-axis and q-axis leakage inductances $L_{kd}$ and $L_{kq}$ at each operating point ($i_d$, $i_q$) have been stored in the data table T1 or T2, or in another data table. This allows the method to easily use the d-axis and q-axis leakage flux linkage numbers $\Psi_{kd}$ and $\Psi_{kq}$ or the d-axis and q-axis leakage inductances $L_{kd}$ and $L_{kq}$.

Next, a method of more precisely controlling a motor in consideration of iron loss caused in the stator of the motor will be described hereinafter.

The equation 14 is deformed to include the iron loss as follows:

$$\begin{bmatrix} v_d \\ v_q \end{bmatrix} = \begin{bmatrix} R + r_m + pL_d & -\omega L_q + pK_{rm} \\ \omega L_d - pK_{rm} & R + r_m + pL_q \end{bmatrix} \begin{bmatrix} i_d \\ i_q \end{bmatrix} + \begin{bmatrix} -\omega \Psi_{mq} \\ \omega \Psi_{md} \end{bmatrix} \quad \text{[Equation 85]}$$

where rm represents an iron-loss resistance equivalent to the iron loss caused in the stator of the motor and has an inherent value defined by the material of the stator and the shape thereof, and Krm is represented by "$Krm=rm/\omega^2$", The equation [16] is deformed by the following equation:

$$T=Pn\{(Ld \cdot id + \Psi_{md})iq - (Lq \cdot iq + \Psi_{mq})id + Krm(id^2 + iq^2)\} \quad \text{[Equation 86]}$$

An efficiency η in the output Po of the motor is given by the following equation:

$$\eta = Po/(Po+W_L) \quad \text{[Equation 87]}$$

where $W_L$ represents electric loss; this electric loss $W_L$ is given by the following equation:

$$W_L = R(id^2+iq^2)+r_m(id^2+iq^2) \quad \text{[Equation 88]}$$

Reflecting the equations [85] and [86] to the control system CS illustrated in FIG. 4 allows more precise motor-control to be implemented. Specifically, it is possible to increase the accuracy of: the relationship between the torque T and the d-axis and q-axis currents ($i_d$ and $i_q$); each of the voltage equations [76] and [77], and the d-axis and q-axis gains $G_d$ and $G_q$ respectively included in the equations [78] and [79].

Second Embodiment

Next, how to apply the present invention to sensorless (encoder-less) motor control for sensorlessly detect the rotational position of the rotor and the angular velocity thereof will be described hereinafter as a second embodiment of the present invention. Like elements (blocks) between the control system CS and a control system CS1 illustrated in FIG. 28, to which like reference characters are assigned, are omitted or simplified in description.

In recent years, in order to reduce motor control systems in manufacturing cost and improve the reliability thereof, various types of sensorless (encoder-less) motor control have been widely used. As well as the first embodiment, in the second embodiment of the present invention, proper state parameters representing the behavior of a target motor have been generated to be stored in the data tables T1 and T2 of the control system CS1. Specifically, the control system CS1 is configured to detect the rotational position of the rotor using the information stored in at least one of the data tables T1 and T2.

Figure 28:
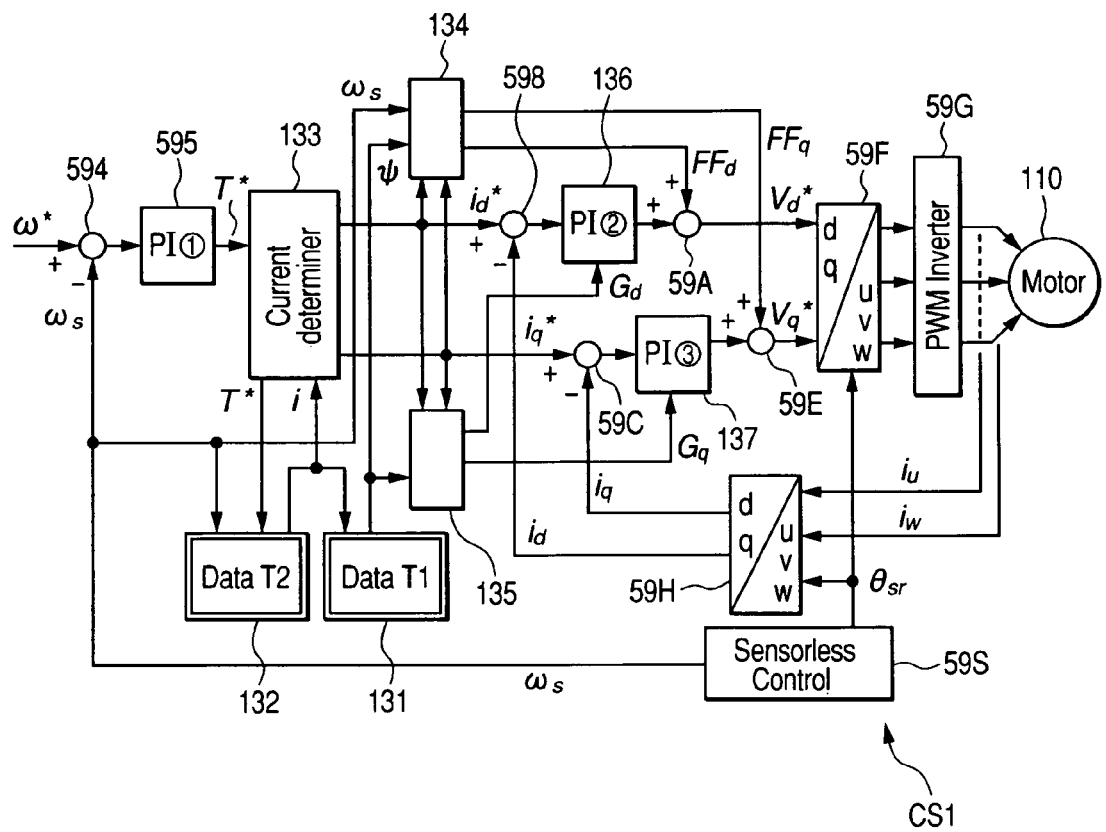
FIG. 28 is a block diagram schematically illustrating an example of the circuit structure of a control system for controlling an output of a motor illustrated in FIG. 1 according to a second embodiment of the present invention.

As illustrated in FIG. 28, in place of the encoder 592 and the interface 593, the control system CS1 is provided with a rotational position estimator 59S. The rotational position estimator 59S works to estimate a rotational position θsr and an angular velocity ωs, and the control system CS1 works to control the output of the motor 110 based on the estimated rotational position θsr and the estimated angular velocity ωs. The rotational position estimator 59S can be implemented by tasks to be executable by a microprocessor in accordance with a program as in the case of the other functional blocks of the control system CS1.

There are a plurality of methods of how to specifically estimate the rotational position of the rotor by the rotational position estimator 59S (microprocessor).

A first method is to estimate the rotational position of the rotor based on a zero-crossing point of the stator current (armature current). A second method is to detect a three-time harmonic wave of the stator voltage (winding voltage) so as to estimate the rotational position of the rotor based on the detected three-time harmonic wave of the stator voltage. A third method is to estimate the rotational position of the rotor based on the rate of change in the stator current, and a fourth method is to estimate the rotational position of the rotor by indirectly controlling the stator magnetic flux. A fifth method is to estimate the rotational position of the rotor by applying, to the motor, another voltage different from the motor drive voltage (stator voltage).

In addition, a sixth method, such as "sensorless position detecting method using an extended electromotive force", is to estimate the rotational position of the rotor as a function obtained by expanding the equations [14] and [15] using induced voltage components in the motor and inductance voltage components caused by the change in the armature current (drive current). In addition, how to specifically estimate the rotational position of the rotor of a motor is disclosed in detail in IEEJ Technical Report No. 1020, and also disclosed in references listed therein.

The motor-state parameters representing the behavior of a motor, such as the inductances, to be used in the conventional sensorless position detecting methods set forth above are constant values, or have broken line approximation curves with respect to the armature current (drive current). This is because electromagnetic information indicative of the non-linear characteristic curves of the inductances cannot accurately be obtained. This is one factor to cause the conventional sensorless position detecting methods to become more complicated.

In contrast, in the second embodiment of the present invention, the d-axis and q-axis flux-linkage numbers $\Psi d$ ($i_d$, $i_q$) and $\Psi q$ ($i_d$, $i_q$) at each operating point ($i_d$, $i_q$) are computed by a computer (microprocessor) based on the nonlinear infinite element method or the like to be stored in the control system CS1 (see FIG. 28). The d-axis and q-axis flux-linkage numbers $\Psi d$ ($i_d$, $i_q$) and $\Psi q$ ($i_d$, $i_q$) at each operating point ($i_d$, $i_q$) allows the control system CS1 to sensorlessly detect the rotational position of the rotor and the angular velocity thereof.

Note that the computation amount required to obtain the d-axis and q-axis flux-linkage numbers Ψd ($i_d$, $i_q$) and Ψq ($i_d$, $i_q$) at the respective operating points can be executed in a comparatively short time at a currently normal processing rate; this can place a little burden on the design development of the control system CS1. Similarly, the data capacity of the table T1 can also place little burden on the actual level of the storage capacity of a normal memory in actual high integration technologies.

The configuration of the control system CS1 allows the rotational position of the rotor and the angular velocity thereof to be accurately detected.

As well as the first embodiment, the d-axis and q-axis flux-linkage numbers Ψd ($i_d$, $i_q$) and Ψq ($i_d$, $i_q$) at each operating point ($i_d$, $i_q$) can be expressed by an approximate function like the equations [24] and [25]. The control system CS1 is programmed to determine the d-axis and q-axis flux-linkage numbers $\Psi_d(i_d, i_q)$ and $\Psi_q(i_d, i_q)$ at one specified operating point ($i_d$, $i_q$) based on the approximate function.

In the control system CS1, pieces of data representing the d-axis and q-axis flux-linkage numbers $\Psi_d$ and $\Psi_q$ defined at each operating point ($i_d$, $i_q$) of the armature current can have been installed in a motor control program under which the microprocessor (control system CS1) executes the tasks of the functional blocks illustrated in FIG. 28.

Figure 31:
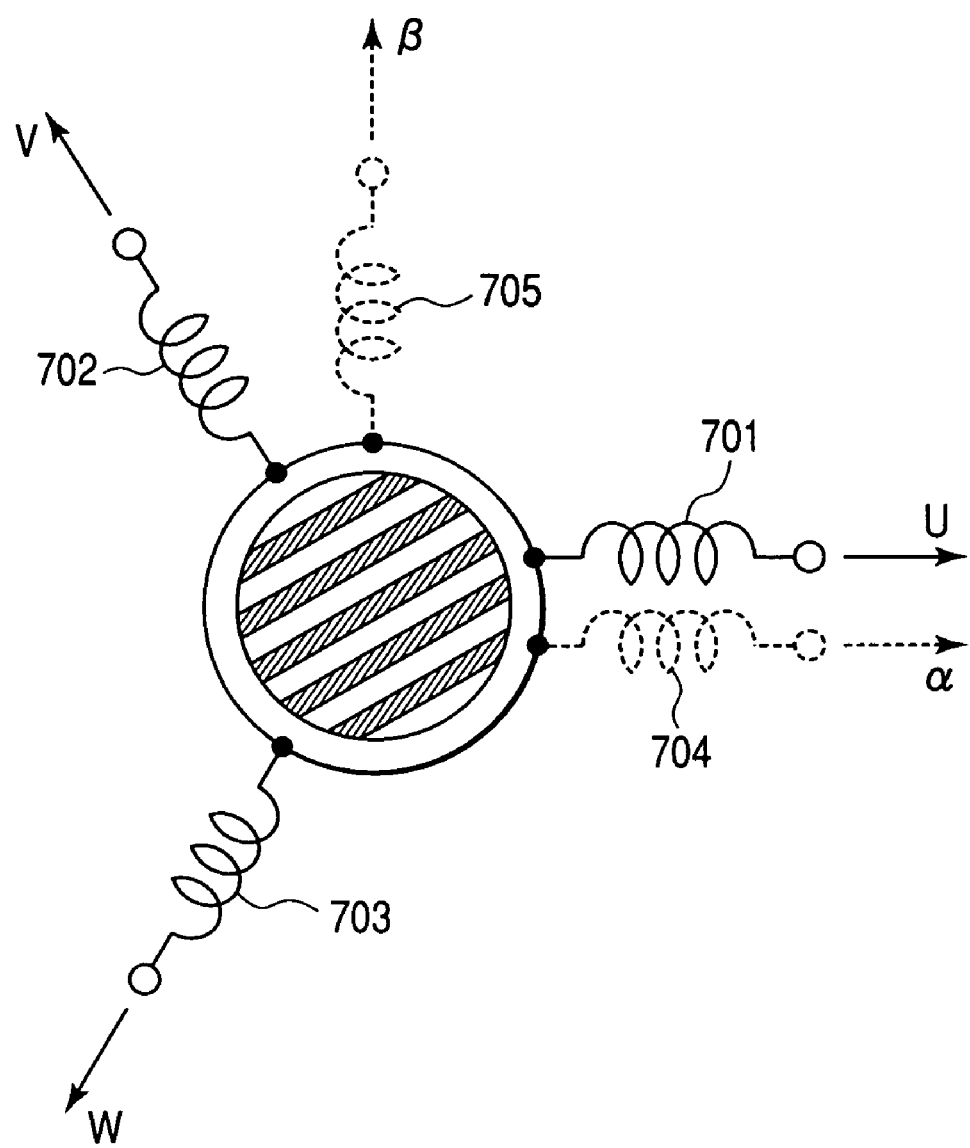
FIG. 31 is a view schematically illustrating a relationship between a u-v-w coordinate system and an $\alpha$-$\beta$ coordinate system according to each of the first and second embodiments of the present invention.

Next, three kinds of coordinate systems to be used in each of the first and second embodiments will be described hereinafter. The coordinate systems are classified broadly into stationary coordinate systems based on the stator and rotating coordinate systems based on the rotor. The stationary coordinate systems include the u-v-w coordinate system described hereinbefore and composed of U-axis, V-axis, and W-axis illustrated in FIG. 31 with the phase difference of 120 degrees electric angle therebetween, and the α-β coordinate system composed of α-axis and β-axis with the phase difference of 90 degrees electric angle. FIG. 31 schematically illustrates a two-pole motor model substantially equivalent to the motor model M1 illustrated in FIGS. 5 and 6.

Reference characters 701, 702, and 703 represent U-phase winding, V-phase winding, and W-phase winding of the motor model, respectively. These three-phase windings 701, 702, and 703 can be equivalently replaced with α-phase winding 704 and β-phase winding 705 illustrated by dashed lines.

On the other hand, the rotating coordinate system includes a d-q coordinate system. The d-q coordinate system is composed of the d-axis having a high magnetic permeability and the q-axis having a low magnetic permeability and leading in phase by 90 degrees electric angle leading with respect to the d-axis. Another rotating coordinate system can be defined in the rotor.

The d-axis and q-axis currents $i_d$ and $i_q$, the d-axis and q-axis voltages $v_d$ and $v_q$, the U-phase, V-phase, and W-phase currents $i_u$, $i_v$, and $i_w$, the U-phase, V-phase, and W-phase voltages $v_u$, $v_v$, and $v_w$, the α-axis and β-axis currents $i_α$ and $i_β$, and the α-axis and β-axis voltages $v_α$ and $v_β$ have correlative relationships thereamong; these correlative relationships can be expressed by the following equations [89] to [98]:

$$ia = mt;epmrl;\sqrt{frax};3;2rlxmx \times io \qquad \text{[Equation 89]}$$

$$ia = (id^2 + iq^2)^{0.5} \qquad \text{[Equation 90]}$$

$$io = \tfrac{2}{3} \times (iu^2 + iv^2 + iw^2)^{0.5} \qquad \text{[Equation 91]}$$

$$id = ia \times \cos(\theta c) \qquad \text{[Equation 92]}$$

$$iq = ia \times \sin(\theta c) \qquad \text{[Equation 93]}$$

$$iu = io \times \sin(\theta r + \theta c) \qquad \text{[Equation 94]}$$

$$iv = io \times \sin(\theta r + \theta c - 120°) \qquad \text{[Equation 95]}$$

$$iw = io \times \sin(\theta r + \theta c - 240°) \qquad \text{[Equation 96]}$$

$$i\alpha = ia \times \sin(\theta r + \theta c) \qquad \text{[Equation 97]}$$

$$i\beta = ia \times \sin(\theta r + \theta c - 90°) \qquad \text{[Equation 98]}$$

where $i_a$ represents an absolute value of a two-phase current, $i_o$ represents an amplitude of each of the three-phase currents on the u-v-w coordinate system.

Assuming that current is in phase with voltage and power factor is set to 1, the correlative relationships associated with the voltages can be expressed by the following equations [99] to [108]:

$$va = mt;epmrl;\sqrt{frax};3;2rlxmx \times vo \qquad \text{[Equation 99]}$$

$$va = (vd^2 + vq^2)^{0.5} \qquad \text{[Equation 100]}$$

$$vo = \tfrac{2}{3} \times (vu^2 + vv^2 + vw^2)^{0.5} \qquad \text{[Equation 101]}$$

$$vd = va \times \cos(\theta c) \qquad \text{[Equation 102]}$$

$$vq = va \times \sin(\theta c) \qquad \text{[Equation 103]}$$

$$vu = vo \times \sin(\theta r + \theta c) \qquad \text{[Equation 104]}$$

$$vv = vo \times \sin(\theta r + \theta c - 120°) \qquad \text{[Equation 105]}$$

$$vw = vo \times \sin(\theta r + \theta c - 240°) \qquad \text{[Equation 106]}$$

$$v\alpha = va \times \sin(\theta r + \theta c) \qquad \text{[Equation 107]}$$

$$v\beta = va \times \sin(\theta r + \theta c - 90°) \qquad \text{[Equation 108]}$$

where $v_a$ represents an absolute value of a two-phase voltage, $v_o$ represents an amplitude of each of the three-phase voltages on the u-v-w coordinate system.

As represented by the equations [89] to [108], each parameter of the motor required to control the motor can be replaced from one coordinate system to another coordinate system. Specifically, due to computing or measuring reasons, each parameter of the motor required to control the motor can be computed in different coordinate systems.

Next, how to execute the computing operations according to the first and second embodiments required to control the motor based on a Z-X coordinate system except for the d-q coordinate system will be described hereinafter.

When the armature current and winding voltage is computed on the Z-X coordinate system based on the data table T1 or T2, the armature current components on the Z-X coordinate system are converted into d-axis and q-axis current components ($i_d$, $i_q$). The command currents, command voltages, and the torque are computed based on the d-axis and q-axis flux linkage numbers and/or d-axis and q-axis inductances at the converted d-axis and q-axis current components ($i_d$, $i_q$). Thereafter, the computed command currents, command voltages, and the torque on the d-q coordinate system are converted into those on the Z-X coordinate system.

In another method, the relationship between the d-axis and q-axis flux-linkage numbers $\Psi_d$ and $\Psi_q$ and corresponding each operating point ($i_d$, $i_q$) of the armature current on the d-q coordinate system is converted into that between the flux-linkage numbers and corresponding each operating point of the armature current on another coordinate system.

For example, in the α-β coordinate system, the relationship between the α-axis and β-axis flux-linkage numbers $\Psi_α$ and $\Psi_\beta$ and corresponding each operating point ($i_\alpha$, $i_\beta$) of the armature current on the α-β coordinate system is stored in a data table DTX.

In the stationary coordinate systems, the flux linkage numbers are changed depending on the rotational position θr of the rotor, and therefore, the data table DTX is designed as a three-dimensional table such that the relationship between the α-axis and β-axis flux-linkage numbers $\Psi_\alpha(i_\alpha, i_\beta, \theta r)$ and $\Psi_\beta(i_\alpha, i_\beta, \theta r)$ and corresponding each operating point ($i_\alpha$, $i_\beta$, θr) on the α-β coordinate system is stored in the data table DTX.

For example, in FIG. 5, when the controlled phase angle θc is limited within a normally used range, it is possible to omit the α-axis and β-axis flux-linkage numbers $\Psi_\alpha(i_\alpha, i_\beta, \theta r)$ and $\Psi_\beta(i_\alpha, i_\beta, \theta r)$ corresponding to a range of the controlled phase angle θc except for the normally used range.

For example, in the u-v-w coordinate system, because, for example, the W-phase current $i_w$ is represented by "$i_w=-i_u-i_v$", the relationship between the U-axis and V-axis flux-linkage numbers $\Psi_u(i_u, i_v, \theta r)$, $\Psi_v(i_u, i_v, \theta r)$, and $\Psi_w(i_u, i_v, \theta r)$ and corresponding each operating point ($i_u$, $i_v$, θr) on the u-v-w coordinate system is stored in the data table DTX.

The data table whose size is higher than three-dimension can be created in a similar manner as the three-dimensional data table. The inductance tables in the α-β coordinate system or u-v-w coordinate system can be created in a similar manner as the flux-linkage number data table DTX.

When an armature current except for a sinusoidal waved current is supplied to a motor, such as a switched reluctance motor; generation of a data table corresponding to the armature current allows motor control with high accuracy to be implemented. Specifically, the relationship between the number of flux-linkages to each phase winding, each value of the armature current flowing through each winding, and each rotational position θr of the rotor is generated to be stored, in a data table; this data table allows the winding voltage, the armature current, and the output torque to be accurately controlled.

In the output torque of the motor is reluctance torque, the calculation for separating the magnetic energy and the motor output torque may be reduced in accuracy due to the nonlinear magnetic property of the motor. In this case, in addition to the number of flux-linkages to each phase winding at each value of the armature current, the value of the output torque T at each value of the armature current can be stored in the data table. This allows the output torque to be grasped from input power to the motor without separating between the magnetic energy and the motor output torque, making it possible to control the motor output with more higher accuracy.

Next, a first specific method of estimating the rotational position of the rotor to be executed by the control system CS1 according to the second embodiment will be described hereinafter with reference to FIG. 29. In the control system CS1, the stationary coordinate systems and the rotating coordinate system can be converted therebetween.

Figure 29:
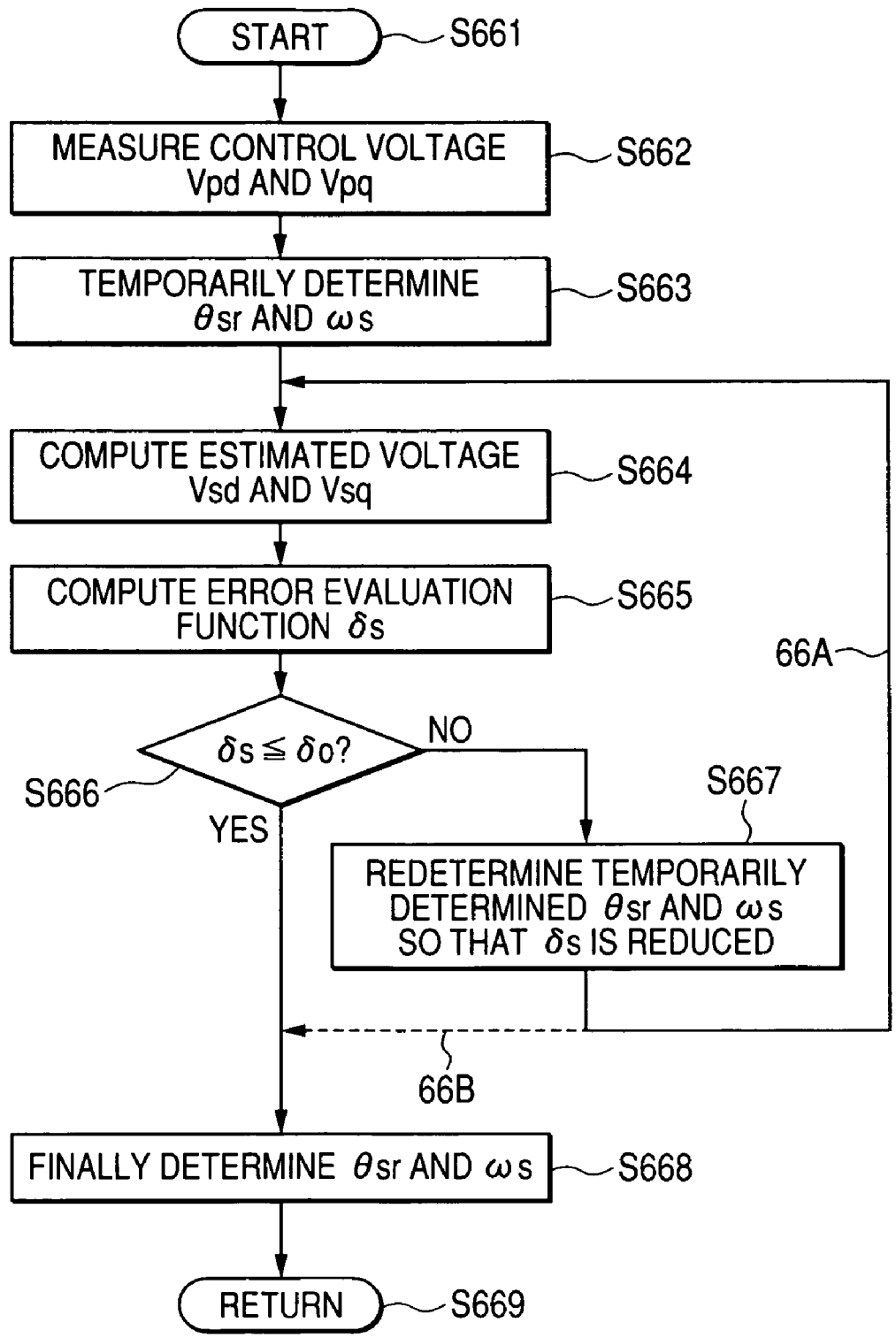
FIG. 29 is a flowchart schematically illustrating a first specific method of estimating a rotational position of a rotor to be executed by the control system according to the second embodiment of the present invention.

When, for example, a timer interrupt occurs in step S661 of FIG. 29, the microprocessor (control system CS1) measures the d-axis command voltage $v_d^*$ and the q-axis command voltage $v_q^*$ as d-axis and q-axis motor control voltages $V_{pd}$ and $V_{pq}$ at the estimated rotational position θsr and the estimated angular velocity ωs at the interrupt occurring timing in step S662. Note that, for example, the timer interrupt occurs every predetermined cycle.

In step S662, the microprocessor computes the U-phase, V-phase, and W-phase voltages $v_{u1}$, $v_{v1}$, and $v_{w1}$ based on the d-axis and q-axis measured motor control voltages $V_{pd}$ and $V_{pq}$. These U-phase, V-phase, and W-phase voltages $v_{u1}$, $v_{v1}$, and $v_{w1}$ can be measured. Simultaneously, the microprocessor measures the U-phase, V-phase, and W-phase currents $i_{u1}$, $i_{v1}$, and $i_{w1}$ to store them therein in step S662.

In step S663, the microprocessor temporarily determines the estimated rotational position θsr and the estimated angular velocity ωs at the timing when the d-axis and q-axis motor control voltages $V_{pd}$ and $V_{pq}$ are measured.

In step S664, the microprocessor computes d-axis and q-axis motor estimated voltages $V_{sd}$ and $V_{sq}$ based on the equation [1] or [8], at least one of the data tables T1 and T2, the estimated rotational position θsr, the estimated angular velocity ωs, and the U-phase, V-phase, and W-phase currents $i_{u1}$, $i_{v1}$, and $i_{w1}$. These computed d-axis and q-axis motor estimated voltages $V_{sd}$ and $V_{sq}$ can be converted into three-phase motor estimated voltages $v_{us1}$, $v_{vs1}$, and $v_{ws1}$.

Specifically, in the step S664, the electromagnetic state of the motor at each operating point of the armature current is precisely computed to be stored in each of the data tables T1 and T2 with consideration given to the nonlinearity of the electromagnetic state and magnetic saturation characteristic of the motor. For this reason, when each of the estimated rotational position θsr, the estimated angular velocity ωs includes a minor error, the computing in step S664 can be executed with more higher accuracy.

In step S665, the microprocessor computes error evaluation functions δsd and δsq to evaluate how much level of the estimation of each of the estimated rotational position θsr and the estimated angular velocity ωs is executed. For example, the error evaluation functions δsd and δsq are given by the following equations:

$$\delta sd = |V_{pd} - V_{sd}|$$ [Equation 109]

$$\delta sd = |V_{pq} - V_{sq}|$$ [Equation 110]

The error evaluation function δsd represents the difference between the measured d-axis motor control voltage $V_{pd}$ and the computed d-axis motor estimated voltage $V_{sd}$. Similarly, The error evaluation function δsq represents the difference between the measured q-axis motor control voltage $V_{pq}$ and the computed q-axis motor estimated voltage $V_{sq}$.

In step S666, the microprocessor determines whether the value of each of the error evaluation functions δsd and δsq is equal to or lower than a tolerance δso.

When it is determined that the value of each of the error evaluation functions δsd and δsq is equal to or lower than the tolerance δso, the microprocessor finally determines that the temporarily determined estimated rotational position θsr and estimated angular velocity ωs are substantially proper values in step S668, terminating the interruption in step S669.

Otherwise, when it is determined that the value of each of the error evaluation functions δsd and δsq is higher than the tolerance δso, the microprocessor proceeds to step S667. In step S667, the microprocessor corrects the temporarily determined estimated rotational position θsr and estimated angular velocity ωs so that each the error evaluation functions δsd and δsq is reduced to thereby predetermine the estimated rotational position θsr and the estimated angular velocity ωs, returns to step S664 via a path 66A. Thereafter, the operations in steps S664 to S667 are repeatedly executed until the determination in step S666 is affirmative.

In step S667, when the number of corrections exceeds a predetermined number, it is possible to forcibly terminate the interruption. In step S667, in order to allow each of the error evaluation functions δsd and δsq to rapidly converge, when the value of each of the error evaluation functions δsd and δsq is greatly different from the tolerance δso in step S666, it is possible to greatly correct the temporarily determined estimated rotational position θsr and estimated angular velocity ωs in step 8667, thereby reducing the number of corrections in step S667.

In addition, because the estimated angular velocity ωs is not rapidly changed, it is possible to continuously use the previously estimated angular velocity ωs. Moreover, the estimated rotational position θsr can be corrected at wide intervals between the angular range of 0 degrees to 360 degrees in step S667. When each of the error evaluation functions δsd and δsq is closer to the tolerance δ at one estimated value θsr, the estimated rotational position θsr can be corrected in step S667 at close intervals around the one estimated value θsr. These estimated rotational positions θsr at wide intervals between the angular range of 0 degrees to 360 degree can be previously prepared to be stored in a table.

The microprocessor can compute a correction value that should be added to each of the estimated rotational position θsr and the estimated angular velocity ωs based on the magnitude of a corresponding one of the error evaluation functions δsd and δsq. The microprocessor can therefore directly proceeds to step S668 without going to step S664 via the path 66A. These operations can simplify the operations of the microprocessor (control system CS).

Specifically, the microprocessor (control system CS) can select:

the first task to repeatedly correct each of the estimated rotational position θsr and the estimated angular velocity ωs until the value of each of the error evaluation functions δsd and δsq is equal to or lower than the tolerance δso; and the second task to determine that each of the estimated rotational position θsr and the estimated angular velocity ωs based on the magnitude of a corresponding one of the error evaluation functions δsd and δsq.

Moreover, the microprocessor can execute an intermediate task between the first and second tasks.

The microprocessor can deform the equations [1] to [25] to create a relational expression between the rotational position θr and each of the armature current and the winding voltage, and assign measured data to the relational expression to thereby compute the estimated rotational position θsr. Especially, because no inductances having nonlinear characteristics are contained in the equation [8], [9], [14], and [15], they are more accurate equations, and therefore, it is possible to derive the relational expression with more higher accuracy.

In the equations [109] and [110], the accuracy of each of the estimated rotational position θsr and the estimated angular velocity ωs is estimated based on the difference between the measured d-axis motor control voltage $V_{pd}$ and the computed d-axis motor estimated voltage $V_{sd}$ and the difference between the measured q-axis motor control voltage $V_{pq}$ and the computed q-axis motor estimated voltage $V_{sq}$. The accuracy of each of the estimated rotational position θsr and the estimated angular velocity ωs can be estimated based on the difference between measured three-phase voltages $v_{u1}$, $v_{v1}$, and $v_{w1}$ and respective estimated three-phase voltages $v_{us1}$, $v_{vs1}$, and $v_{ws1}$.

Next, a second specific method of estimating the rotational position θsr and the angular velocity value ωs based on the rate of change in the winding voltage with respect to narrow change in the armature current will be described hereinafter. This second method has the following steps of:

forcibly changing the armature current by forcibly superimposing a high frequency and low-level current on the armature current or by superimposing a pulse current thereon at a measurement timing;

measuring a change in the winding voltage depending on the change in the armature current;

computing an estimated change in the winding voltage depending on the change in the armature current based on the electromagnetic state of the motor at each operating point of the armature current that is precisely computed by the nonlinear infinite element method to be stored in each of the data tables T1 and T2; and determining the estimated rotational position θsr and the estimated angular velocity value ωs so that the difference between the measured change in the winding voltage depending on the change in the armature current and the estimated change in the winding voltage depending thereon.

As illustrated in FIG. 2, a motor has nonlinear magnetic characteristics and magnetic saturation. Especially, most of compact motors with high output and low manufacturing cost are designed to maximize the magnetic saturation region.

Specifically, FIG. 3 schematically illustrates a relationship between armature current i and the number of flux linkages Ψ created by the armature current. As illustrated in FIG. 3, the relationship shows a nonlinear characteristic curve 461. When an operating point 462 of the armature current i is located at the armature current $i=i_{X1}$, an average inductance $L_{ave}$ is represented as a gradient of a line 464.

A narrow-range inductance $L_{st}$ within a narrow current range between the operating point 462 and one adjacent operating point 466 located at the armature current $i=i_{X3}$ is represented as a gradient $L_{st}$ of a line 463; this gradient $L_{st}$ is expressed by the following equation:

$$Lst = (\Psi \times 3 - \Psi \times 1)/(i \times 3 - i \times 1) \qquad \text{[Equation 111]}$$

where "$i_{X3} - i_{X1}$" is referred to as "narrow current range" hereinafter.

The graph illustrated in FIG. 3 clearly shows the gradient of the line 464 corresponding to the inductance $L_{ave}$ is greatly different from the gradient $L_{st}$ of the line 463. Note that the equation 111 can be handled as the ratio of the changed ΔΨ in the flux linkage number with respect to the change Δi in the armature current.

Therefore, in the second method, when a high frequency and low-level current is forcibly superimposed on the armature current, the change in a high frequency voltage to be detected corresponds to the narrow change in the armature current. Therefore, the inductance corresponding to the change in the high frequency voltage is not the average inductance $L_{ave}$, but the inductance $L_{st}$ corresponding to a narrow range of the armature current. The second method can detect the rotational position θr of the rotor and the angular velocity ω thereof even if the output torque of the motor is zero and an effective current flowing in the motor is zero.

In addition, the second method can detect the rotational position θr of the rotor and the angular velocity ω thereof even if the RPM of the motor is located close to zero and an induced voltage component of the motor, that is, an effective change ratio dΨ/dt of the flux linkage number Ψ to a narrow time change is located close to zero.

Specific steps of the second method of estimating the rotational position of the rotor to be executed by the control system CS1 will be described hereinafter with reference to FIG. 30.

Figure 30:
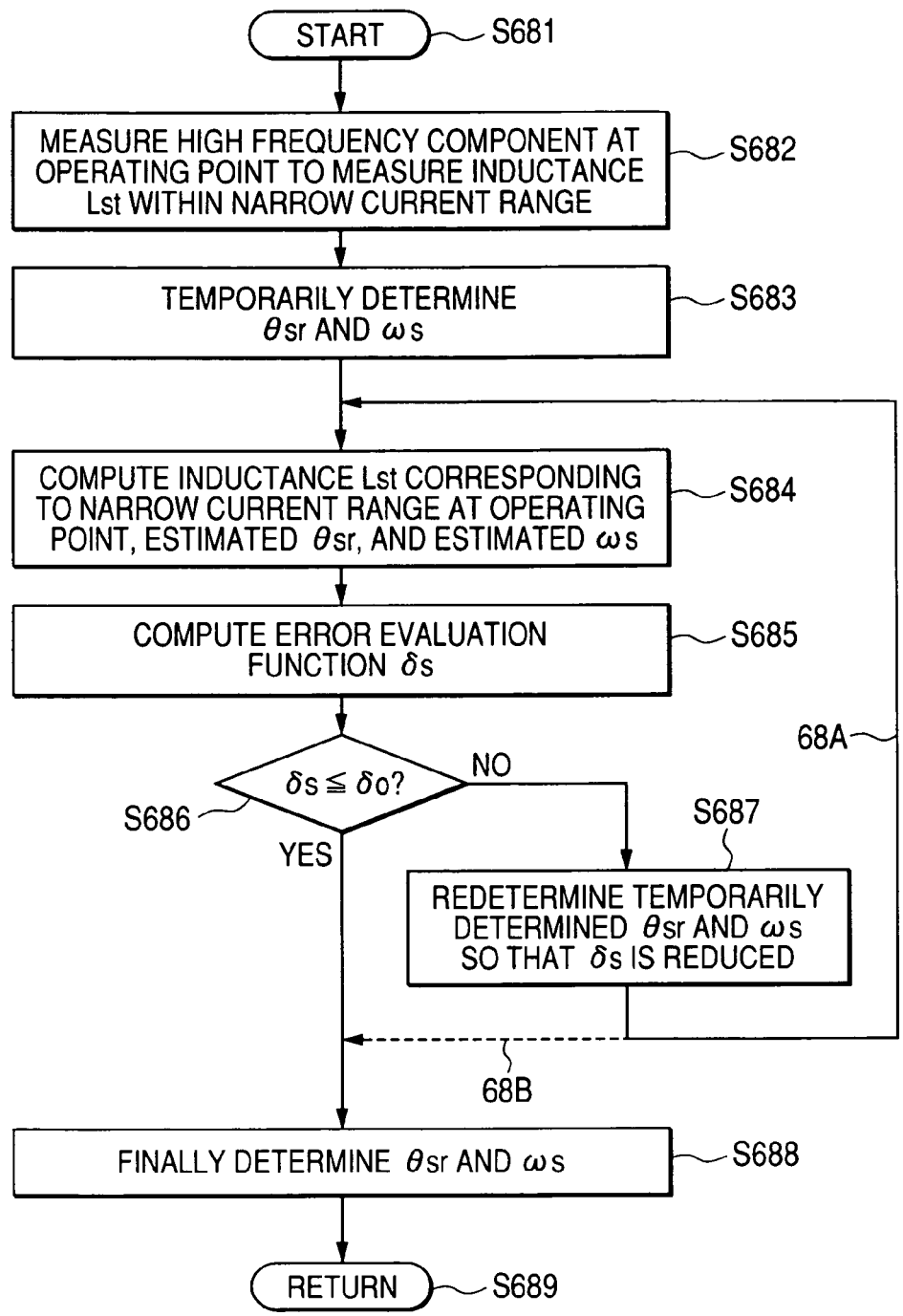
FIG. 30 is a flowchart schematically illustrating a second specific method of estimating a rotational position of a rotor to be executed by the control system according to the second embodiment of the present invention.

When, for example, a timer interrupt occurs in step S681 of FIG. 30, the microprocessor (control system CS1) superimposes, on the respective three-phase drive currents $i_{u4}$, $i_{v4}$, and $i_{w4}$, high frequency three phase currents $i_{u5}$, $i_{v5}$, and $i_{w5}$ each of which has an amplitude Δi represented by "$\Delta i = (i_{X3} - i_{X1})/2$" in step S682. The three-phase drive currents are supplied to the three-phase windings, respectively.

In addition, in step S682, the microprocessor measures the three phase winding voltages $v_{u4}$, $v_{v4}$, and $v_{w4}$ and three-phase high frequency components $v_{u5}$, $v_{v5}$, and $v_{w5}$ contained therein at the timing of the superimposing of the three-phase drive currents $i_{u4}$, $i_{v4}$, and $i_{w4}$.

In step S682, the microprocessor filters the three-phase drive currents $i_{u4}$, $i_{v4}$, and $i_{w4}$ to measure the frequency of the high frequency three phase currents $i_{u5}$, $i_{v5}$, and $i_{w5}$ to thereby obtain U-phase, V-phase, and W-phase inductances $L_{stu4}$, $L_{stv4}$, and $L_{stw4}$ corresponding to the narrow current range.

Note that, in the second embodiment, the high frequency three phase currents $i_{u5}$, $i_{v5}$, and $i_{w5}$ are respectively supplied to flow the U-phase, V-phase, and W-phase windings, but the high frequency three phase currents $i_{u5}$, $i_{v5}$ and $i_{w5}$ can be overlappedly supplied to flow from the U-phase terminal to the V-phase terminal and W-phase terminal. When the frequency of the high frequency signal is constant, it is possible to filter the three-phase drive currents $i_{u4}$, $i_{v4}$, and $i_{w4}$ to accurately detect the high frequency three phase currents $i_{u5}$, $i_{v5}$ and $i_{w5}$.

In place of the high frequency three phase currents $i_{u5}$, $i_{v5}$, and $i_{w5}$, high frequency three-phase voltages can be superimposed on the respective three phase winding voltages $v_{u4}$, $v_{v4}$, and $v_{w4}$ and high frequency three-phase currents can be measured.

As described above, superimposition of the pulse current on each of the three-phase drive currents $i_{u4}$, $i_{v4}$ and $i_{w4}$ allows the U-phase, V-phase, and W-phase inductances $L_{stu4}$, $L_{stv4}$, and $L_{stw4}$ corresponding to the narrow current range to be measured.

In step S683, the microprocessor computes an estimated rotational position θsr and an estimated angular velocity ωs at the timing when the three phase winding voltages $v_{u4}$, $v_{v4}$, and $v_{w4}$ are measured, and temporarily determines the estimated rotational position θsr and an estimated angular velocity ωs.

In step S684, the microprocessor computes d-axis and q-axis inductances $L_{std}$ and $L_{stq}$ corresponding to the narrow current range at the operating point ($i_d$, $i_q$), the estimated rotational position θsr, and the estimated angular velocity ωs.

Specifically, in step S684, the microprocessor uses the data table T1 or T2 to compute the d-axis and q-axis inductances $L_{std}$ and $L_{stq}$ each within a narrow range Δi in accordance with the equation [111] and the relationship illustrated in FIG. 3. Note that, when the table T2 is used, it is necessary to convert the equation [111] and the relationship illustrated in FIG. 3 based on the equation "Ψ=L×i".

An inductance $L_x$ at each phase angle θx with respect to the d-axis in the d-q coordinate system is represented by the following equations assuming that the d-axis inductance is represented by "$L_d$" and the q-axis inductance is represented by "$L_q$":

$$Lx=(Ld+Lq)/2+(Ld-Lq)/2\times\cos(2\times\theta x) \quad \text{[Equation 112]}$$

$$=Li+Lm\times\cos(2\times\theta x) \quad \text{[Equation 113]}$$

Three-phase inductances $L_u$, $L_v$, and $L_w$ at an operating point ($i_d$, $i_q$) of the armature current when the motor is located at the rotational position θr are computed in accordance with the following equations based on the data table T1 or 12:

$$Lu=(Ld+Lq)/2+(Ld-Lq)/2\times\cos(2\times\theta r) \quad \text{[Equation 114]}$$

$$Lv=(Ld+Lq)/2+(Ld-Lq)/2\times\cos(2\times(\theta r-120°)) \quad \text{[Equation 115]}$$

$$Lw=(Ld+Lq)/2+(Ld-Lq)/2\times\cos(2\times(\theta r-240°)) \quad \text{[Equation 116]}$$

Similarly, assigning the d-axis and q-axis inductances $L_{std}$ and $L_{stq}$ to the inductances $L_d$ and $L_q$ included in the equations [104], [105], and [106] allows three-phase inductances $L_{stu5}$, $L_{stv5}$, and $L_{stw5}$ within the narrow current range to be computed. Each of the three-phase inductances $L_{stu5}$, $L_{stv5}$, and $L_{stw5}$ within the narrow current range in each phase represents the gradient of the line 463 corresponding to the tangential line of the nonlinear characteristic curve 461 at the operating point 462.

Next, in step S685, the microprocessor computes error evaluation functions δstu, δstv, and δstw to evaluate how much level of the estimation of each of the estimated rotational position θsr and the estimated angular velocity ωs is executed. For example, the error evaluation functions δstu, δstv, and δstw are given by the following equations:

$$\delta stu=|L_{syu4}-L_{stu5}| \quad \text{[Equation 117]}$$

$$\delta stv=|L_{syu4}-L_{stu5}| \quad \text{[Equation 118]}$$

$$\delta stw=|L_{syu4}-L_{stu5}| \quad \text{[Equation 119]}$$

The error evaluation function δstu represents the difference between the measured U-phase inductance $L_{stu4}$ and the computed U-phase inductance $L_{stu5}$, and the error evaluation function δstv represents the difference between the measured V-phase inductance $L_{stv4}$ and the computed V-phase inductance $L_{stv5}$. Moreover, the error evaluation function δstw represents the difference between the measured W-phase inductance $L_{stw4}$ and the computed W-phase inductance $L_{stw5}$.

In step S666, the microprocessor determines whether the value of each of the error evaluation functions δstu, δstv, and δstw is equal to or lower than the tolerance δso.

When it is determined that the value of each of the error evaluation functions δstu, δstv, and δstw is equal to or lower than the tolerance δso, the microprocessor finally determines that the temporarily determined estimated rotational position θsr and estimated angular velocity ωs are substantially proper values in step S688, terminating the interruption in step S689.

Otherwise, when it is determined that the value of each of the error evaluation functions δstu, δstv, and δstw is higher than the tolerance δso, the microprocessor proceeds to step S687. In step S687, the microprocessor corrects the temporarily determined estimated rotational position θsr and estimated angular velocity ωs so that each the error evaluation functions δstu, δstv, and δstw is reduced to thereby predetermine the estimated rotational position θsr and the estimated angular velocity ωs, returns to step S684 via a path 68A. Thereafter, the operations in steps S684 to S687 are repeatedly executed until the determination in step S686 is affirmative.

In step S687, when the number of corrections exceeds a predetermined number, it is possible to forcibly terminate the interruption. In step S687, in order to allow each of the error evaluation functions δstu, δstv, and δstw to rapidly converge, when the value of each of the error evaluation functions δstu, δstv, and δstw is greatly different from the tolerance δso in step S686, it is possible to greatly correct the temporarily determined estimated rotational position θsr and estimated angular velocity ωs in step S687, thereby reducing the number of corrections in step S687.

In addition, because the angular velocity estimated value ωs is not rapidly changed, it is possible to continuously use the previously estimated value ωs. Moreover, the rotational position estimated value θsr can be corrected at wide intervals between the angular range of 0 degrees to 360 degrees in step S667. When each of the error evaluation functions δsd and δsq is closer to the tolerance δ at one estimated value θsr, the rotational position estimated value θsr can be corrected in step S667 at close intervals around the one estimated value θsr. These rotational position estimated values θsr at wide intervals between the angular range of 0 degrees to 360 degree can be previously prepared to be stored in a table.

The microprocessor can compute a correction value that should be added to each of the rotational position estimated value θsr and the angular velocity estimated value ωs based on the magnitude of a corresponding one of the error evaluation functions δsd and δsq. The microprocessor can therefore directly proceeds to step S668 without going to step S664 via the path 66A. These operations can simplify the operations of the microprocessor (control system CS).

Specifically, the microprocessor (control system CS) can select:

the first task to repeatedly correct each of the rotational position estimated value θsr and the angular velocity estimated value ωs until the value of each of the error evaluation functions δsd and δsq is equal to or lower than the tolerance δso; and the second task to determine that each of the rotational position estimated value θsr and the angular velocity estimated value ωs based on the magnitude of a corresponding one of the error evaluation functions δsd and δsq.

Moreover, the microprocessor can execute an intermediate task between the first and second tasks.

The first method can detect the rotational position of the rotor with high accuracy when the rotor is rotating at a certain level of RPM, and the second method can easily detect the rotational position of the rotor when the rotor is rotating at a low RPM or is being stopped.

Thus, as a third method, the microprocessor is programmed to execute the second method to detect the rotational position of the rotor when the rotor is rotating at an RPM lower than a predetermined threshold RPM range. When the RPM of the rotor increases to exceed the predetermined threshold RPM range, the microprocessor is programmed to switch from the second method to the first method to execute the switched first method, thereby detecting the rotational position of the rotor.

When the RPM of the rotor lies within the predetermined threshold RPM range, the microprocessor can be programmed to obtain, as the finally rotational position of the rotor, the average position between the rotational position of the rotor detected by execution of the first method and that of the rotor detected by execution of the second method.

The microprocessor can be programmed to:

assign a weight to the rotational position of the rotor detected by execution of the first method and to that of the rotor detected by execution of the second method based on the actual RPM of the rotor; and calculate the sum of the weighted rotational position of the rotor detected by execution of the first method and the weighted rotational position of the rotor detected by execution of the second method, thereby finally determining the rotational position of the rotor based on the result of the calculation.

The microprocessor can be programmed to simultaneously execute the first and second methods.

Next, such a sensorless position detecting method using an extended electromotive force will be described hereinafter.

Figure 32:
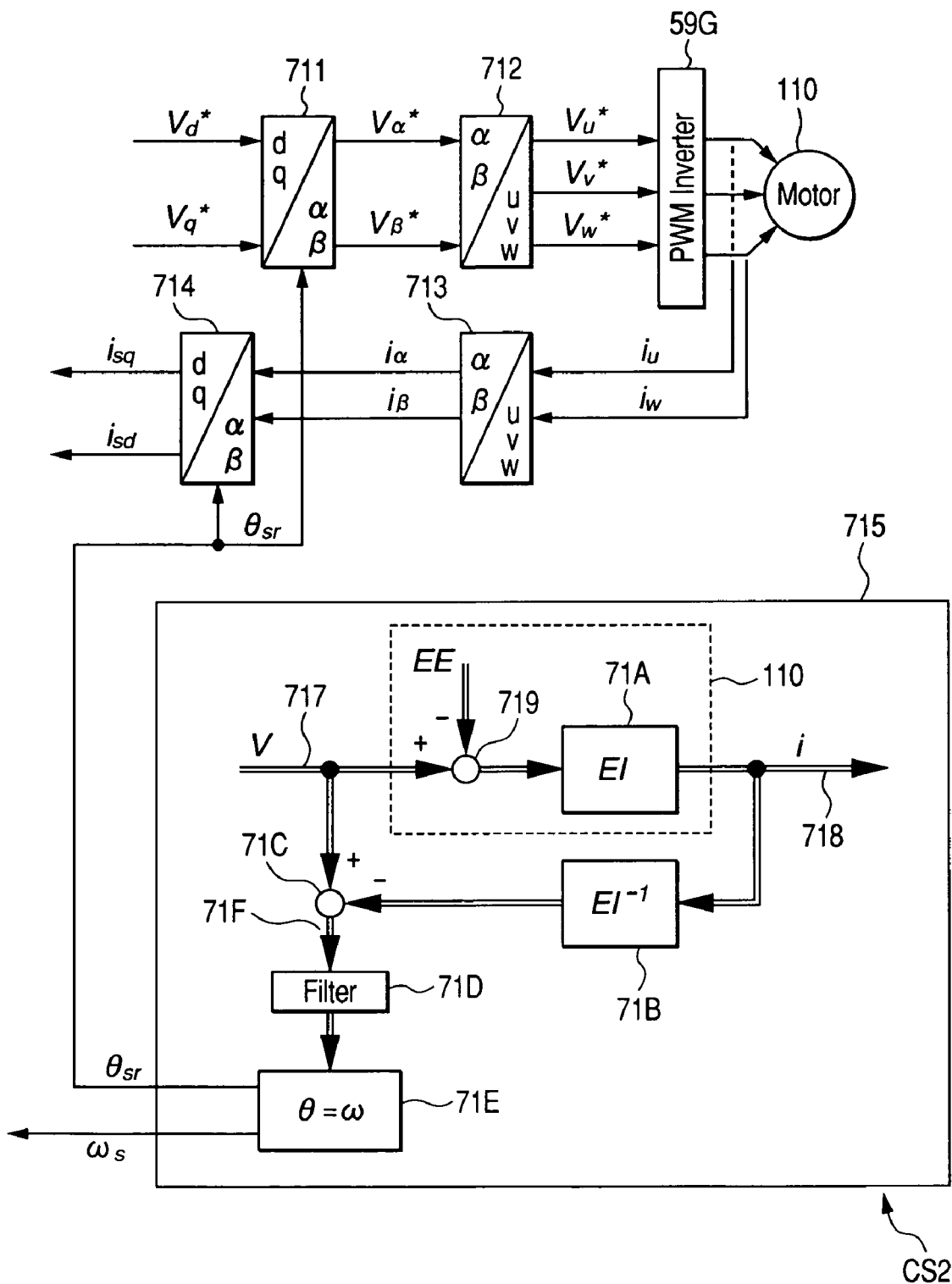
FIG. 32 is a block diagram schematically illustrating an example of the circuit structure of a control system according to a modification of the second embodiment of the present invention.

FIG. 32 schematically illustrates an example of the circuit structure of a control system CS2 for controlling an output of a motor illustrated in FIG. 1 with the use of the sensorless position detecting method based on the extended electromotive force according to a modification of the second embodiment.

As the motor coordinate systems, the d-q coordinate system, the α-β coordinate system, and the U-axis, V-axis, and W-axis coordinate systems are used.

The control system CS2 includes a first converter 711, a second converter 712, a third converter 713, a fourth converter 714, and a rotational position estimator 715. Like elements (blocks) between the control system CS1 illustrated in FIG. 28 and the control system CS2, to which like reference characters are assigned, are omitted or simplified in description.

The first converter 711 works to receive the d-axis command voltage $v_d^*$ and q-axis command voltage $v_q^*$ on the respective d and q awes passed respectively from the d-axis and q-axis voltage controllers 59A and 59E into α-axis and β-axis voltage commands $v_\alpha^*$ and $v_\beta^*$ in the α-β coordinate system based on the estimated rotational position θsr of the rotor. The first converter 711 also works to pass the converted α-axis and β-axis voltage commands $v_\alpha^*$ and $v_\beta^*$ to the second converter 712.

The second converter 712 works to convert the α-axis and β-axis voltage commands $v_\alpha^*$ and $v_\beta^*$ on the α-β coordinate system into U-, V-, and W-phase voltage commands $v_u^*$, $v_v^*$, and $v_w^*$ in the u-v-w phase coordinate system.

The third converter 713 works to receive the instantaneous U- and W-phase winding currents $i_u$ and $i_w$ passed from the current sensor and convert the instantaneous U- and W-phase winding currents $i_u$ and $i_w$ into instantaneous α-axis and β-axis current components $i_\alpha$ and $i_\beta$ on the α-β coordinate system. The fourth converter 714.

The fourth converter 714 works to receive the instantaneous α-axis and β-axis current components $i_\alpha$ and $i_\beta$ passed from the third converter 713 and to convert the instantaneous α-axis and β-axis current components $i_\alpha$ and $i_\beta$ into instantaneous d-axis and q-axis current components $i_d$ and $i_q$ on the d-q coordinate system based on the estimated rotational position θsr of the rotor.

The rotational position estimator 715 serves as an observer for computing the estimated rotational position θsr and the estimated angular velocity ωs and passing the estimate rotational position θsr to each of the first and fourth converters 711 and 714 and the estimated angular velocity ωs to the speed difference detector 594 illustrated in FIG. 28.

In the rotational position estimator 715, reference numeral 717 represents a voltage vector v consisting of the α-axis and β-axis voltage commands $v_\alpha^*$ and $v_\beta^*$, and circled dashed lines to which reference numeral 110 is assigned represents the motor 110. Reference numeral 718 represents a current vector i consisting of the α-axis and β-axis current components $i_\alpha$ and $i_\beta$.

A voltage equation for the motor model 110 is represented as follows:

$$\begin{bmatrix} v_d \\ v_q \end{bmatrix} = \begin{bmatrix} R + pL_d & -\omega L_q \\ \omega L_d & R + pL_q \end{bmatrix} \begin{bmatrix} i_d \\ i_q \end{bmatrix} + \omega K_E \begin{bmatrix} 0 \\ 1 \end{bmatrix} \quad \text{[Equation 120]}$$

where reference character $K_E$ represents the number of flux linkages directed in the q-axis. The number of flux linkages directed in the d-axis can be added to the voltage equation [120]. The voltage equation [120] is converted from the d-q coordinate system into the α-β coordinate system and thereafter deformed to provide the following equation:

$$\begin{bmatrix} v_\alpha \\ v_\beta \end{bmatrix} = \{(R + pL_d)I - \omega(L_d - L_q)J\} \begin{bmatrix} i_\alpha \\ i_\beta \end{bmatrix} + \quad \text{[Equation 121]}$$

$$\left\{ (L_d - L_q)(\omega i_d - i_q) + \begin{bmatrix} -\sin\theta \\ \cos\theta \end{bmatrix} \right\}$$

where reference character $$I = \begin{bmatrix} 1 & 0 \\ 0 & 1 \end{bmatrix},$$

and reference character $$J = \begin{bmatrix} 0 & -1 \\ 1 & 0 \end{bmatrix}.$$

The first term of the equation [121] represents an impedance term EI without including the rotor rotational position θr, and the second term represents an extended electromotive force term EE including the rotor rotational position θr.

Deformation of the equation [121] is disclosed in S. Ichikawa et al. "*Sensorless Control of Synchronous Reluctance Motors Using an Extended Electromotive Force and Inductance Measuring Method Suitable therefor*" IEEE Transactions on Volume 53, Issue 2, April 2005 No. 1. p. 16-25 and also disclosed in references listed therein.

In the rotational position estimator 715 illustrated in FIG. 32, subtracting the extended electromotive force term EE from the input voltage vector v by an adder and subtractor 719 allows a voltage component of the impedance term EI of the equation [121] to be output from the adder and subtractor 719. When a block 71A is assumed to be an impedance "$\{(R+pL_d)I-\omega(L_d-L_q)J\}$" described in the coefficient of the current vector i, the current vector i consisting of the α-axis and β-axis current components $i_\alpha$ and $i_\beta$ is output from the block 71A.

When a block 71B is assumed to be an inverse of the impedance "$\{(R+pL_d)I-\omega(L_d-L_q)J\}$", a voltage component of the impedance term EI of the equation [121] is output from the block 71B.

Thus, when the voltage vector v (717) consisting of the α-axis and β-axis voltage commands $v_\alpha^*$ and $v_\beta^*$ is assumed to be input to the adder and subtractor 719 and the current vector i consisting of the α-axis and β-axis current components $i_\alpha$ and $i_\beta$ is assumed to be output from the block 71A, an output 71F of an adder and subtractor 71C provides the extended electromotive force term EE. Specifically, the rotational position estimator 715 is configured to compute the second term (extended electromotive force term) EE of the equation [121] including the rotational position θr of the rotor.

Reference numeral 71D represents a filter for eliminating noise components contained in the output 71F of the adder and subtractor 71C.

Reference numeral 71E represents a rotational position detector for detecting the estimated rotational position θsr and the estimated angular velocity ωs.

Specifically, the output of the filter 71D represents α-axis and β-axis voltage components $v_{1\alpha}$ and $v_{1\beta}$ corresponding to the equation [121], and therefore, the α-axis and β-axis voltage components $v_{1\alpha}$ and $v_{1\beta}$ are represented by the following equations:

$$v1\alpha=\{(L_d-L_a)(\omega i_d-i_a)+\omega K_E\}(-\sin\theta r) \quad \text{[Equation 122]}$$

$$v1\beta=\{(L_d-L_a)(\omega i_d-i_a)+\omega K_E\}(\cos\theta r) \quad \text{[Equation 123]}$$

The estimated rotational position θr is computed in accordance with the following equation [124] based on the equations [122] and [123]:

$$\theta sr=\tan^{-1}(-v1\alpha/v1\beta) \quad \text{[Equation 124]}$$

The estimated angular velocity ωs of the rotor is computed as the rate of change in the estimated rotational position θr in accordance with the following equation:

$$\omega s=d\theta sr/dt \quad \text{[Equation 125]}$$

In the second embodiment of the present invention, the equations [109] to [125] are computed based on at least one of the data table T1 and the data table T2 or on approximate expressions created by the data tables T1 and T2; this makes it possible to implement the sensorless position detection with high accuracy. The increase in the accuracy of the sensorless position detection allows the rotor position control gain and the rotor angular velocity control gain to increase, making it possible to improve the control responsibility of the motor.

In the second embodiment of the present invention, the motor parameters representing the behavior of the motor and included in the equations [109] to [123] required to implement the sensorless position detection greatly depend on the rotational position θr of the rotor and the operating point ($i_d$, $i_q$) of the armature current. For this reason, computing of the equations [109] to [123] based on the more properly determined estimated rotational position θr of the rotor allows the result of each of the equations [124] and [125] to become more accurate, and therefore, the result of each of the equations [124] and [125] can converge with increase in the number of the computing of a corresponding one of the equations [124] and [125].

Next, a method of controlling a motor using the sensorless rotational-position detection without using rotational position detectors, such as encoders and resolvers, while keeping high safety and high reliability will be described hereinafter.

In conventional control systems, even if the accuracy of the detected rotational position of the rotor by the sensorless position detection, the current control loop of the feedback control of the armature current is carried out on the rotating coordinate system (d-q coordinate system). This may have a bad effect on the reliability and safety of the motor control.

For extreme example, when the estimated rotational position θr based on the sensorless position detection includes a position error θe of, for example, 180 degrees electric angle, the control of each phase current may not become negative feedback control but positive feedback control. This may cause the current-control feedback loop to become divergent, and therefore, cause an overcurrent with a limited level to flow through, for example, each transistor of the inverter 59G.

Even if the position error θe included in the estimated rotational position θr has a comparatively low value, a current error $\Delta i_d$ corresponding to the position error θe may occur; this may cause the motor control to become unstable. For example, the current error $\Delta i_e$ may cause an overshoot of an armature current to be reduced, making it possible to reduce the problems caused by the current error $\Delta i_e$.

Figure 33:
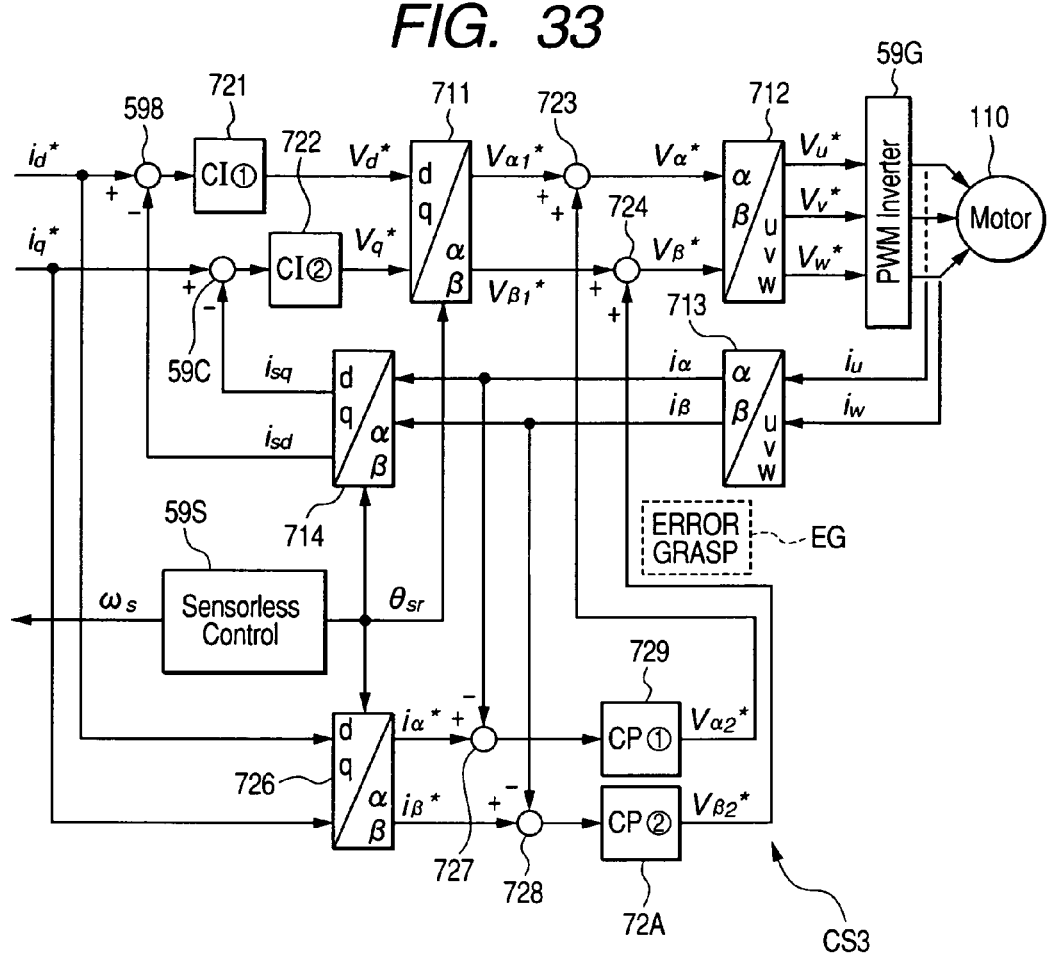
FIG. 33 is a block diagram schematically illustrating an example of the circuit structure of a control system according to another modification of the second embodiment of the present invention.
Figure 34:
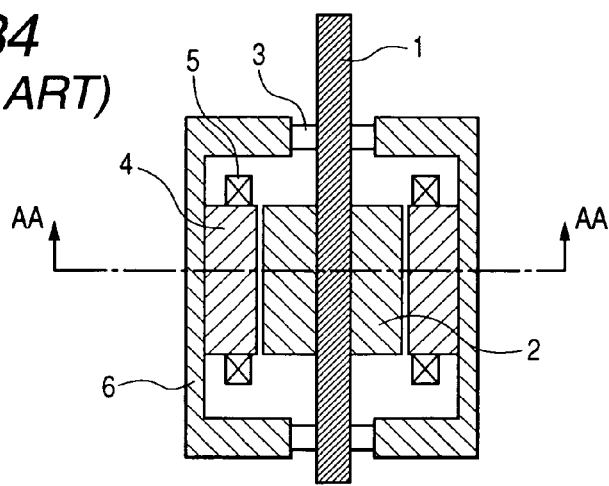
FIG. 34 is a partially axial cross section schematically illustrating an example of the structure of such a conventional motor.

FIG. 33 schematically illustrates an example of the circuit structure of a control system CS3 according to another modification of the second embodiment. Like elements (blocks) between each of the control systems CS1 and CS2 illustrated in FIGS. 28 and 32 and the control system CS3 illustrated in FIG. 33, to which like reference characters are assigned, are omitted or simplified in description.

The control system CS3 is composed of a d-axis voltage controller 721, a q-axis voltage controller 722, an adder 723, an adder 724, a coordinate converter 726, an α-axis current difference detector 727, a β-axis current difference detector 728, an α-axis voltage controller 729, and a β-axis voltage controller 72A.

The d-axis voltage controller 721 works to receive the d-axis current difference calculated by the d-axis current difference detector 598 and to execute a compensating operation by calculating a proportional term and an integral term based on the received d-axis current difference so as to obtain a d-axis current control command voltage $v_d^*$. The obtained d-axis current control command voltage $v_d^*$ is passed to the first converter 711.

The q-axis voltage controller 722 works to receive the q-axis current difference calculated by the q-axis current difference detector 59C and to execute a compensating operation by calculating a proportional term and an integral term based on the received q-axis current difference so as to obtain a q-axis current control command voltage $v_d^*$. The obtained q-axis current control command voltage $v_q^*$ is passed to the first converter 711.

The adder 723 works to calculate, as an α-axis voltage command $v_\alpha^*$, the sum of an α-axis voltage command $v_{\alpha 1}^*$ passed from the first converter 711 and an α-axis voltage command $v_{\alpha 2}^*$ passed from the α-axis voltage controller 729, thereby passing, to the second converter 712, the calculated α-axis voltage command $v_\alpha^*$.

The adder 724 works to calculate, as β-axis voltage command $v_\beta^*$, the stun of a β-axis voltage command $v_{\beta 1}^*$ passed from the first converter 711 and β-axis voltage command $v_{\beta 2}^*$ passed from the β-axis voltage controller 72A, thereby passing, to the second converter 712, the calculated β-axis voltage command $v_\beta^*$.

The coordinate converter 726 works to:
receive the d-axis command current $i_d^*$ and q-axis command current $i_q^*$ based on the torque demand T*;
convert the d-axis command current $i_d^*$ and q-axis command current $i_q^*$ into α-axis and β-axis current components $i_\alpha^*$ and $i_\beta^*$; and
pass the converted α-axis and β-axis current components $i_\alpha^*$ and $i_\beta^*$ to the α-axis current difference detector 727 and β-axis current difference detector 728, respectively.

The α-axis current difference detector 727 works to subtracts the α-axis current component $i_\alpha$ from the α-axis command current $i_\alpha^*$ to calculate an α-axis current difference therebetween.

The β-axis current difference detector 728 works to subtracts the β-axis current component $i_\beta$ from the β-axis command current $i_\beta^*$ to calculate a β-axis current difference therebetween.

The α-axis voltage controller 729 works to receive the α-axis current difference calculated by the α-axis current difference detector 727. The α-axis current controller 729 also works to execute a compensating operation by calculating a proportional term and an integral term based on the received α-axis current difference so as to obtain the α-axis voltage command $v_{\alpha 2}^*$. The obtained α-axis current voltage command $v_{\alpha 2}^*$ is passed to the adder 723.

The β-axis voltage controller 72A works to receive the β-axis current difference calculated by the β-axis current difference detector 728. The β-axis current controller 72A also works to execute a compensating operation by calculating a proportional term and an integral term based on the received β-axis current difference so as to obtain the β-axis voltage command $v_{\beta 2}^*$. The obtained β-axis current voltage command $v_{\beta 2}^*$ is passed to the adder 724.

As compared with the configuration of the control system CS1 illustrated in FIG. 28, the configuration of the control system CS2 illustrated in FIG. 33 is additionally provided with:

means for generating the α-axis and β-axis current components $i_\alpha$ and $i_\beta$ on the α-β coordinate system corresponding to the coordinate converter 726;

means for feeding the measured α-axis and β-axis current components $i_\alpha$ and $i_\beta$ back to the respective α-axis voltage controller 729 and the β-axis voltage controller 72A corresponding to the third converter 713;

means for compensating the difference between the measured α-axis current components $i_u$ and the α-axis current command $i_\alpha^*$ to calculate the α-axis current difference therebetween so as to obtain the α-axis voltage command $v_{\alpha 2}^*$ based on the difference;

means for compensating the difference between the measured β-axis current components $i_\beta$ and the β-axis current command $i_\beta^*$ to calculate the β-axis current difference therebetween so as to obtain the β-axis voltage command $v_{\beta 2}^*$ based on the difference; and mans for feeding the α-axis voltage command $v_{\alpha 2}^*$ back to the adder 723; and means for feeding the β-axis voltage command $v_{\alpha 2}^*$ back to the adder 723.

Specifically, the control system CS3 is provided with a first feedback current control loop based on the d-q coordinate system (see 6 elements 713, 714, 598, 59C, and 726) and a second feedback current control loop based on the α-β coordinate system (see elements 713, 726, 727, 728, 729, 72A 723, and 724). This allows the first and second feedback current control loops to be parallely used or to be selectively used depending on the operating mode of the motor.

Next, a relationship between the current control characteristic of the motor and the coordinate system will be described hereinafter.

For example, while the rotor of an AC (Alternating Current) inductance motor is being rotated, the control system CS3 causes an armature current (drive current), such as three-phase currents, to flow through three-phase windings of the stator. The three-phase currents flowing through the three-phase windings of the stator create electromotive force to be applied to the rotor; this creates torque.

Thus, when electromagnetic effects of the electromotive force is seen from the rotating coordinate system, such as the d-q coordinate system, it is possible to handle the electromagnetic effects of the electromotive force as direct current motors; this can simply handle the armature current and winding voltage to be controlled.

For example, in the proportional compensating control and integral compensating control, the integral compensating control for synchronous reluctance motors can be applied for DC motors. The integral compensating control is carried out within a low frequency range of the armature current so as to reduce the difference between the armature current and a command current as much as possible.

In the rotating coordinate system, as described above, when the sensorless position detection control is carried out, the magnitude of the position error θe of the estimated rotational position θr of the rotor may be indefinite. Therefore, when the rotational position θr of the rotor is indefinite, execution of the armature current control on the rotating coordinate system requiring the accurate rotational position $\theta r$ of the rotor may deteriorate the accuracy of the armature current control.

In contrast, in the stationary coordinate system, such as the u-v-w coordinate system or the $\alpha$-$\beta$ coordinate system, the armature current control eliminates the necessity of the information of the rotational position of the rotor, but handles an alternating current. This may make difficult that the compensating control within a low frequency range of the armature current lower than the angular frequency of the rotor is carried out.

Next, a specific method of how to parallely use the first and second feedback current loops will be described hereinafter.

On the d-q-coordinate system, the d-axis voltage controller 721 and the q-axis voltage controller 722 are configured to execute the compensating controls of the respective d-axis and q-axis currents each within a low frequency range. The first converter 711 is configured to convert the d-axis current control command voltage $v_d^*$ and q-axis current control command voltage $v_q^*$ passed from the d-axis and q-axis voltage controllers 721 and 722 into the $\alpha$-axis voltage command $v_{\alpha 1}^*$ and the $\beta$-axis voltage command $v_{\beta 1}^*$ each corresponding to the low frequency range of the armature current.

In contrast, on the $\alpha$-$\beta$ coordinate system, the $\alpha$-axis voltage controller 729 and the $\beta$-axis voltage controller 72A are configured to execute the compensating controls of the respective $\alpha$-axis and $\beta$-axis currents each within a high frequency range of the armature current, thereby obtaining the $\alpha$-axis and $\beta$-axis voltage commands $v_{\alpha 2}^*$ and $v_{\beta 2}^*$, respectively.

The $\alpha$-axis voltage command $v_{\alpha 1}^*$ and the $\beta$-axis voltage command $v_{\beta 1}^*$ corresponding to the low frequency range of the armature current and the $\alpha$-axis voltage command $v_{\alpha\beta}^*$ and $\beta$-axis voltage command $v_{\beta 2}^*$, corresponding to the high frequency range are added to each other by the respective adders 723 and 724, thus obtaining the $\alpha$-axis voltage command $v_\alpha^*$ and the $\beta$-axis voltage command $v_\beta^*$.

The specific method set forth above can use both the advantage of the d-q coordinate system and that of the $\alpha$-$\beta$ coordinate system; thus improving the responsibility and stability of each of the first and second feedback current loops. In addition, the current error can be reduced by executing the integral compensating control within the low frequency range of the armature current. The compensating control includes the proportional control, the integral control, a differential control, and a combination of at least two of them. For example, the d-axis voltage controller 721 and the q-axis voltage controller 722 can be simply configured to execute only the respective integral compensating controls, and the $\alpha$-axis voltage controller 729 and the $\beta$-axis voltage controller 72A can be simply configured to execute only the respective proportional compensating controls.

Next, a specific method of how to use the first and second feedback current loops when the magnitude of the position error $\theta e$ of the estimated rotational position $\theta r$ of the rotor may become excessive within a range of the armature current will be described hereinafter.

The control system CS3 includes a position error grasping unit EG for grasping the range of the armature current within which the magnitude of the position error $\theta e$ of the estimated rotational position $\theta r$ of the rotor becomes excessive or the estimated rotational position $\theta r$ is indefinite.

When the position error grasping unit EG works to grasp the magnitude of the position error $\theta e$ of the estimated rotational position $\theta r$ of the rotor becomes excessive, the control system CS3 is configured to cause the output of each of the $\alpha$-axis voltage controller 729 and the $\beta$-axis voltage controller 72A to become zero or a minor value. Simultaneously, the control system CS3 works to supply the $\alpha$-axis command current $i_\alpha^*$ and the $\beta$-axis command current $i_\beta^*$ on the $\alpha$-$\beta$ coordinate system to the $\alpha$-axis and $\beta$-axis current difference detectors 727 and 728, respectively, thereby controlling the $\alpha$-axis and $\beta$-axis current components $i_\alpha$ and $i_\beta$. The values of the $\alpha$-axis command current $i_\alpha^*$ and the $\beta$-axis command current $i_\beta^*$ can be determined according to an instruction indicative of the motor operating mode.

The armature current control on the $\alpha$-$\beta$ coordinate system can be implemented on the u-v-w coordinate system or another stationary coordinate system so that the block diagram illustrated in FIG. 33 can be changed.

In the first and second embodiments and their various modifications, the present invention is applied to the three-phase AC motors, but can be applied to single phase motors, two-phase motors, four-phase motors, fifth-phase motors, seven-phase motors, and multiphase motors higher than seven-phase. When installed in a small-capacity device, the two-phase motor or three-phase motor is preferably used. In contrast, in view of torque ripples, the multiphase motors higher than the three-phase are preferably used. Similarly, when installed in a large-capacity device, multiphase motors higher than the three-phase are preferably used in terms of the maximum limited current.

The present invention can be applied to multi-pole motors, and to motors with each phase coil wound in full pitch and distributed winding, in short pitch, concentrated, and non-overlapping winding, and the like.

In the first and second embodiments and their various modifications, surface permanent magnet rotors are frequently described, but, in the present invention, various types of rotors illustrated in FIGS. 52 to 56, rotors each with at least one armature winding, craw pole rotors whose each claw will be alternately north and south can be used. When permanent magnet rotors are used, various types and shaped of permanent magnets can be used.

Figure 57:
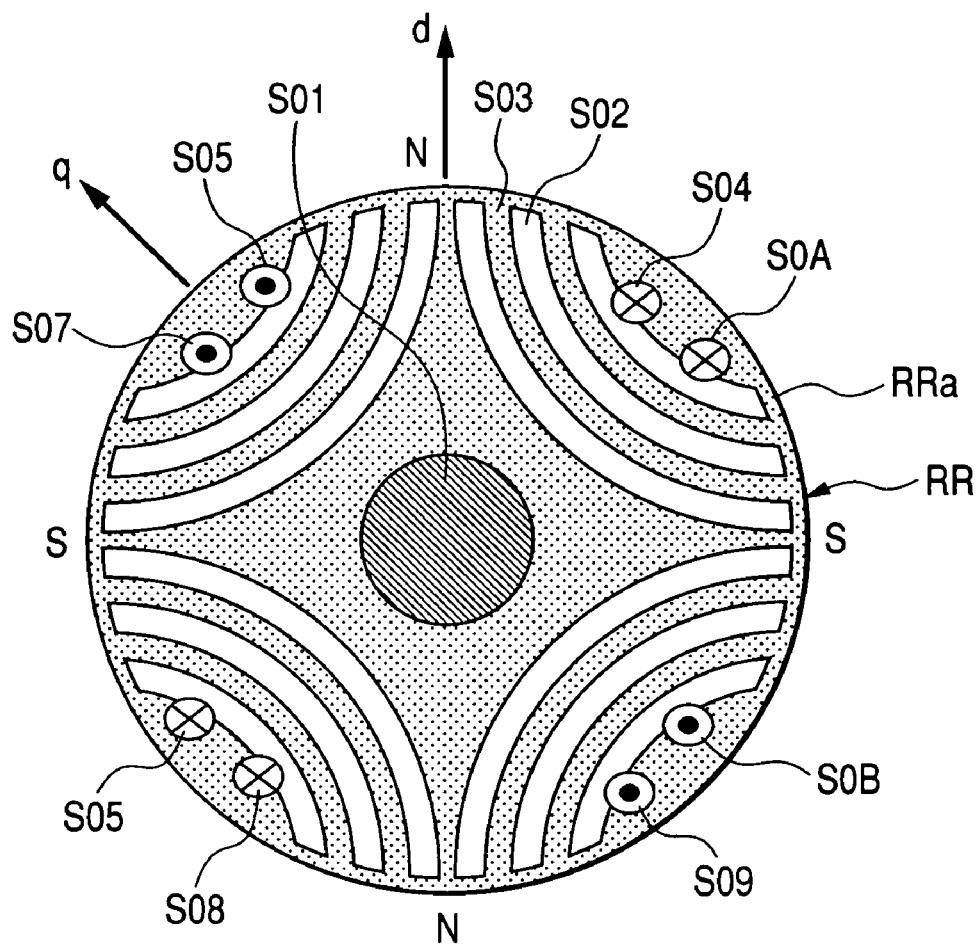
FIG. 57 is a lateral cross sectional view schematically illustrating an improved four-pole rotor of a synchronous reluctance motor according to a modification of each of the first and second embodiments.
Figure 58:
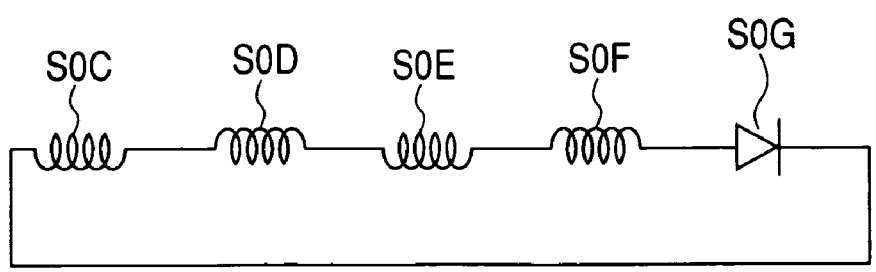
FIG. 58 is a closed circuit diagram equivalent to each coil of the rotor illustrated in FIG. 57.

FIG. 57 schematically illustrates an improved four-pole rotor RR of a synchronous reluctance motor SRM. The rotor RR consists of a substantially annular shaped rotor core RRa, a rotor shaft S01 fixed to the inner periphery of the rotor core RRa, and a plurality of groups of flux barriers (slits) 502 formed in the rotor core RRa.

The plurality of groups of the flux barriers S02 are penetrated through the rotor core RRa in the axial direction thereof.

Specifically, the plurality of groups of the flux barriers S02 are symmetrically arranged with respect to the axial direction thereof such that:

each of the plurality of groups of the flux barriers S02 is circumferentially spaced apart from another adjacent group thereof;

the flux barriers of each of the groups are aligned in a corresponding radial direction of the rotor core RRa at intervals therebetween; and both ends of each of the flux barriers of each of the groups extend toward the outer periphery of the rotor core RRa with predetermined thin edges thereof left between the both ends and the outer periphery.

The groups of the flux barriers S02 provide thin magnetic paths S03 therebetween such that the thin magnetic paths S03 are separated from each other.

The rotor RR includes a plurality of coils S04-S05, S0A-S0B, S08-S09, and S06-S07. The coil S04-S05 is wound around one North pole in a direction so as to increase magnetic fluxes directed in the North pole, and the coil S0A and S0B is wound around one South pole adjacent to the one North pole, the winding direction of the coil being determined so as to increase magnetic fluxes directed in the South pole.

Similarly, the coil S08-S09 is wound around the other North pole opposing the one North pole in a predetermined winding direction to increase the magnetic fluxes directed in the other North pole. The coil S06 and S07 is wound around the other South pole opposing the one South pole in a predetermined winding direction to increase the magnetic fluxes directed in the other South pole.

Each of the cols consists of a plurality of windings S0C, S0D, S0E, S0F, and a diode S0G; these windings S0C, S0D, S0E, S0F, and the diode S0G are connected to each other in series (see FIG. 57). The diode S0G determines a direction of current when it flows through each of the coils.

The diode S0G can be arranged between adjacent two windings of the coil to separate the windings S0C, S0D, S0E, S0P into two groups such that the diode S0G constitutes a dosed winding circuit.

When an armature current is supplied to flow trough the three-phase windings, the flow of the armature current induces a field current flowing through each of the coils S04-S05, S0A-S0B, S08-S09, and S06-S07. The field current flowing through each of the coils allows a magnetic field to be created therearound.

Figure 59:
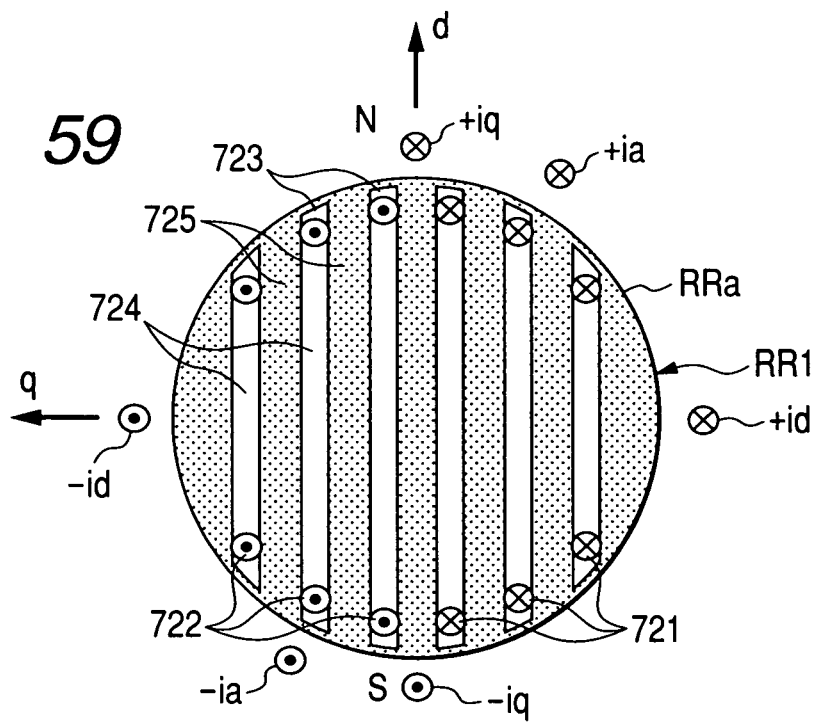
FIG. 59 is a lateral cross sectional view schematically illustrating the rotor illustrated in FIG. 57 being simplified to a two-pole rotor.

FIG. 59 schematically illustrates the rotor RR illustrated in FIG. 57 being simplified to a two-pole rotor RR1.

In the two-pole rotor RR1, a plurality of flux barriers 724, such as slits or resin members with high magnetic resistance, are so formed in the rotor core RRa of the rotor RR1 as to be arranged at intervals therebetween in parallel to one diameter of the rotor core RRa. These flux barriers 724 cause the rotor core RRa to have a salient structure, and provide thin magnetic paths (soft magnetic paths) 725 therebetween such that the thin magnetic paths 725 are separated from each other. One of a plurality of windings 721 and a corresponding one of a plurality of windings 722 are installed in different slits to increase the North pole and South pole opposing thereto.

In FIG. 59, an armature current (a stator current) is modeled as a d-axis current +id, −id and a q-axis current +iq, −iq.

When a motor, such as an induction motor or a synchronous reluctance motor that has been commonly used for various fields is driven by a three-phase inverter and three-phase windings of the stator of the motor, a current flowing through one phase winding repeatedly works to:

provide field energy to the motor with rotation thereof; and return field energy to a battery of the three-phase inverter.

The amount of combined three-phase currents allow constant field energy to be maintained inside the motor so that the motor is rotated by the constant field energy. The energy transferred between the battery of the inverter and the motor has been well known as reactive power. When the motor has an ideal condition such that the resistance thereof motor is assumed to be zero, the reactive power has little influence on the inverter and motor. However, the resistance of the motor is actually not assumed to be zero, the reactive power may cause the loss in the inverter and/or the iron loss of the motor.

In order to address the existence of the reactive power, the configuration of the synchronous reluctance motor SRM having the improved rotor RR illustrated in FIGS. 57 and 59 allows the reactive power transferring through the three-phase stator windings to decrease. This makes it possible to reduce the loss in the inverter and the iron loss of the motor due to the reactive power, thereby increasing the motor efficiency.

Figure 60:
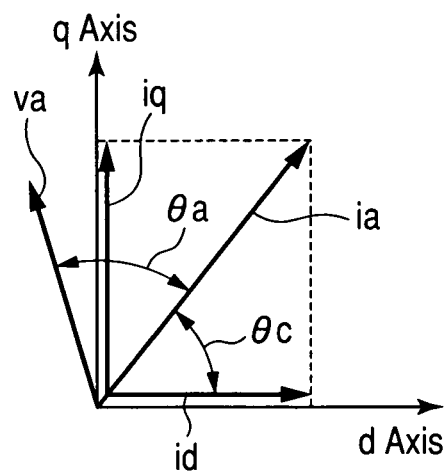
FIG. 60 is a vector diagram schematically illustrating d-axis and q-axis current vectors of the rotor illustrated in FIG. 59 and a resultant vector of the d-axis and q-axis current vectors.

FIG. 60 schematically illustrates d-axis and q-axis current vectors id and iq of the rotor RRa illustrated in FIG. 59 and a resultant vector ia of the d-axis and q-axis current vectors id and iq.

Specifically, the resultant vector ia of the d-axis current vector id that is the exciting current vector and the q-axis current vector that is the torque current vector is supplied to the three-phase windings of the stator. A voltage vector corresponding to the resultant vector ia is represented as "va". Power factor is represented by "cos θa". In order to improve the motor efficiency and the inverter efficiency, it is effective to reduce the phase difference θa between the stator current ia and the stator voltage vector va.

For example, the field energy supplied to the motor is held inside the motor without being regenerated; this allows the transfer of the field energy between the battery of the inverter and the motor, in other words, the reactive power to be reduced.

Figure 61:
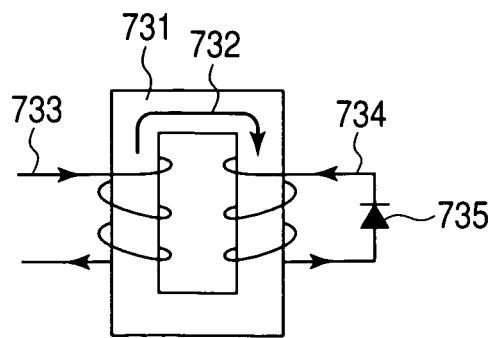
FIG. 61 is a circuit diagram schematically illustrating a model of a magnetic circuit of the motor illustrated in FIG. 59.

Specifically, FIG. 61 schematically illustrates a model equivalent to a magnetic circuit of the motor RR1 illustrated in FIG. 1. The model is composed of a magnetic circuit 731 indicative of the field energy, a stator winding 733, a rotor winding 734, and a diode 735. A current flowing through the stator winding 733 is equivalent to the d-axis current vector id; this current supplies magnetic energy to the magnetic circuit 731 so that a field flux 732 is created therein. The magnetic energy is not regenerated to the battery.

When the current flowing through the stator winding 733 is reduced, a voltage is generated at the rotor winding 734 in the direction of the diode 735; this voltage works to cause a current to flow through the rotor winding 734 so as to counteract the reduction in the field flux 732. This allows the filed flux 732 to be maintained constant even if the supply of the stator exciting current is interrupted. In other words, even if how to supply the stator current to the stator winding is chanted, the field flux 732 can be kept constant. This allows how to supply the stator current to the stator winding to be devised.

For example, the inverter supplies the exciting current id to the motor within a very short period td to provide magnetic energy thereto, and mainly supplies the torque current iq to the motor within the remaining period tq. This causes the average torque of the motor to be reduced up to "tq/(td+tq)" as compared torque equivalent to the torque current iq. However, control of the exciting current id to be relatively low practically presents no problem.

In contrast, because the armature current is reduced from the resultant current ia to be equal to or lower than the torque current iq, the burden of the inverter and the copper loss of the stator can be reduced. This results that the inverter capacity can be reduced and the motor efficiency can be improved. The improvement of the motor efficiency allows the motor to be reduced in size.

In order to more improve the motor illustrated in FIGS. 57 and 59, a plurality of permanent gets are installed in the rotor. This can improve the power factor, thus more increasing the motor efficiency, the peak torque, and inverter driving efficiency. Each of the permanent magnets can be installed in a part of a corresponding one of the slits 724. The direction of each of the permanent magnets can be selectively aligned with the d-axis direction, the q-axis direction, or the intermediate direction therebetween depending on the desired motor characteristics.

The control systems according to the first and second embodiments can effectively execute the output of the motor illustrated in FIGS. 57 and 59 based on at least one of the data tables T1 and T2 with high accuracy.

As described above, in each of the first and second embodiments of the present invention, it is possible to model the motor characteristics including nonlinear magnetic characteristics and magnetic saturation characteristic with the use of a control parameter of an inductance or the number of flux linkages at each operating point of the armature current to be supplied to the stator of the motor within the overall range of the armature current. This can implement the motor control with high responsibility and high accuracy.

The motor characteristics are accurately computed using the nonlinear infinite element method, and therefore the control parameter of the inductance or the number of flux linkages at each operating point of the armature current can be computed.

Specifically, based on the selected up to 100 operating points (10 points of the d-axis current $i_d$ and 10 points of the q-axis current $i_q$) of the d-axis and q-axis currents $i_d$ and $i_q$, the d-axis and q-axis flux-linkage numbers $\Psi_d(i_d, i_q)$ and $\Psi_q(i_d, i_q)$ at the respective up to 100 operating points are computed by the computer.

Note that the computation amount required to obtain the d-axis and q-axis flux-linkage numbers $\Psi_d(i_d, i_q)$ and $\Psi_q(i_d, i_q)$ at the respective up to 100 operating points can be executed in a comparatively short time at a currently normal processing rate; this can place a little burden on the design development of the control system CS.

Similarly, assuming that each of the d-axis and q-axis flux-linkage numbers $\Psi_d(i_d, i_q)$ and $\Psi_q(i_d, i_q)$ has 2 bytes in data size, the data capacity of the table T1 requires substantially 400 bytes. Specifically, the data capacity of the table T1 can place little burden on the actual level of the storage capacity of a normal memory installed in the control system CS. The leakage flux, the iron loss, and the other control information have been stored in the data table T1 or T2, or in another data table.

It is possible to more precisely simulate a target motor in development phase based on the motor model. This can continuously carry out a continuous procedure from development phase of a target motor up to control and load operation of the target motor, making it possible to reduce the development period and the development cost.

The basic concept of each of the first and second embodiments and each of the equations have been described in M. Nashiki et al. "*Inductance Calculation and New Modeling of a Synchronous Reluctance Motor Using Flux Linkage*" IEEJ Transactions on Industry Applications, February 2007.

While there has been described what is at present considered to be the embodiments and their modifications of the present invention, it will be understood that various modifications which are not described yet may be made therein, and it is intended to cover in the appended claims all such modifications as fall within the true spirit and scope of the invention.

What is claimed is:

1. A control method for a motor that rotates based on flux linkages to a winding member of the motor when the winding member is energized by a drive current, the method comprising:

storing magnetic-state information indicative of a relationship between each of a plurality of predetermined operating points of the drive current and a magnetic-state parameter associated with the flux linkages;

obtaining at least one of command information associated with an operating state of the motor and detection information associated with the operating state of the motor;

referencing the magnetic-state information with the use of the obtained at least one of the command information and detection information to obtain a value of the magnetic-state parameter based on a result of the reference; and controlling an output of the motor based on the obtained value of the magnetic-state parameter.

2. A control method according to claim 1, wherein the magnetic-state parameter is a plurality of values of the number of the flux linkages to the winding member, and each of the predetermined operating points of the drive current corresponds to one of the values of the number of the flux linkages.

3. A control method according to claim 1, wherein the magnetic-state parameter is an inductance associated with the winding member, and the inductance is composed of a plurality of inductance values each corresponding to one of the plurality of predetermined operating points of the drive current, the inductance having a nonlinear characteristic with respect to change in the drive current.

4. A control method according to claim 1, wherein the motor is integrated with at least one permanent magnet.

5. A control method according to claim 2, wherein each of the plurality of predetermined operating points of the drive current is associated with a value, the value being obtained by converting one of the values of the number of the flux linkages corresponding to each of the plurality of predetermined operating points of the drive current.

6. A control method according to claim 2, wherein each of the plurality of predetermined operating points of the drive current is associated with an approximate function of a corresponding one of the values of the number of the flux linkages.

7. A control method according to claim 2, wherein each of the values of the number of flux linkages is computationally obtained using an infinite element method.

8. A control method according to claim 2, wherein the obtaining includes, when the detected actual value of the drive current is mismatched with each of the operating points of the drive current, computing one of the values of the number of the flux linkages corresponding to the detected actual value of the drive current by interpolation.

9. A control method according to claim 2, wherein each of the operating points of the drive current is composed of a d-axis current component $i_d$ and a q-axis current component $i_q$ on a d-q as coordinate system defined in the motor, the d-q-axis coordinate system being rotated with rotation of the motor, each of the values of the number of the flux linkages to the winding member is composed of one of values of the number $\Psi_d$ of d-axis flux linkages and one of values of the number $\Psi_q$ of q-axis flux linkages in the d-q-axis coordinate system, and the d-axis and q-axis current components ($i_d$ and $i_q$) of each of the operating points of the drive current correspond to one of the values of the number $\Psi_d$ of the d-axis flux linkages and one of the values the number $\Psi_q$ of the q-axis flux linkages, and wherein the controlling is configured to control the output of the motor based on, as the obtained value of the magnetic-state parameter, one of the values of the number $\Psi_d$ of the d-axis flux linkages and one of the values of the number $\Psi_q$ of the q-axis flux linkages.

10. A control method according to claim 2, wherein each of the operating points of the drive current is composed of three-phase current components on a three-phase coordinate system defined in the motor, the three-phase coordinate system being kept stationary independently of rotation of the motor, each of the values of the number of the flux linkages to the winding member is composed of the number of U-axis flux linkages to a U-axis, the number of V-axis flux linkages to a V-axis, and the number of W-axis flux linkages to a W-axis in the three-phase coordinate system, and the three-phase current components of each of the operating points of the drive current correspond to the number of U-axis flux linkages, the number of V-axis flux linkages, and the number of W-axis flux linkages.

11. A control method according to claim 9, wherein the motor is designed to have a plurality of slots such that the winding member is composed of three-phase coils each wound in corresponding at least one of the slots, further comprising:

obtaining, when the drive current composed of the d-axis and q-axis current components ($i_{d1}$ and $i_{q1}$) is supplied to flow through each of the three-phase coils, the product ($\Phi_n \times N_S$) of a magnetic flux component $\Phi_n$ linked to each of the three-phase coils wound in a corresponding at least one of the slots and the number $N_S$ of turns of a corresponding one of the three-phase coils;

selecting two-phase coils from the three-phase coils, these two-phase coils allowing a d-axis magnetic flux component to be detectable, each of the two-phase coils including at least a first pair of first and second windings wound in two of the slots to form a closed loop and a second pair of third and fourth windings wound in another two of the slots to form a closed loop;

calculating, as the number of flux linkages of the first pair of first and second windings to the d-axis, a first difference between the number of flux linkages to the first winding and the number of flux linkages to the second winding;

calculating, as the number of flux linkages of the second pair of third and fourth windings to the d-axis, a second difference between the number of flux linkages to the third winding and the number of flux linkages to the fourth winding;

integrating the calculated first and second differences to obtain a total number of flux linkages; and multiplying the total number of flux linkages by ($1/\sqrt{2}$) so as to obtain the number $\Psi_d(i_{d1} i_{q1})$ of d-axis flux linkages at the d-axis and q-axis current components ($i_{d1}$ and $i_{q1}$) of the drive current;

selecting two-phase coils from the three-phase coils, these two-phase coils allowing a q-axis magnetic flux component to be detectable, each of the two-phase coils including at least a fifth pair of fifth and sixth windings wound in two of the slots to form a closed loop and a sixth pair of seventh and eighth windings wound in another two of the slots to form a closed loop;

calculating, as the number of flux linkages of the fifth pair of fifth and sixth windings to the d-axis, a third difference between the number of flux linkages to the fifth winding and the number of flux linkages to the sixth winding;

calculating, as the number of flux linkages of the sixth pair of seventh and eighth winding to the d-axis, a fourth difference between the number of flux linkages to the seventh winding and the number of flux linkages to the eighth winding;

integrating the calculated third and fourth differences to obtain a total number of flux linkages; and multiplying the total number of flux linkages by ($1/\sqrt{2}$) so as to obtain the number $\Psi_q(i_{d1} i_{q1})$ of q-axis flux linkages at the d-axis and q-axis current components ($i_{d1}$ and $i_{q1}$) of the drive current, wherein the obtained number $\Psi_d(i_{d1} i_{q1})$ and number $\Psi_q(i_{d1} i_{q1})$ of d-axis and q-axis flux linkages at the d-axis and q-axis current components ($i_{d1}$ and $i_{q1}$) of the drive cent are stored as the magnetic-state information.

12. A control method according to claim 9, wherein the motor is composed of a stator having a U-phase pole, a V-phase pole, and a W-phase pole, and of a rotor rotatable in relation to the stator, the d-q axis coordinate system is defined in the rotor so that the d-q-axis coordinate system is rotated with rotation of the rotor, and the winding member is composed of three-phase coils each concentratedly wound in short pitch so that the three-phase coils are nonoverlapped with each other, further comprising:

obtaining, when the drive current composed of the d-axis and q-axis current components ($i_{d1}$ and $i_{q1}$) is supplied to flow through each of the three-phase coils, a flux distribution inside the motor while the q-axis of the rotor is fixed to be directed to the U-phase pole of the stator;

selecting a first pair of first and second windings wound around the V-phase pole to form a closed loop;

calculating, as the number of flux linkages of the first pair of first and second windings to the d-axis, a first difference $\Psi_A - \Psi_B$ between the number $\Psi_A$ of flux linkages to the first winding and the number $\Psi_B$ of flux linkages to the second winding;

selecting a second pair of third and fourth windings wound around the W-phase pole to form a closed loop;

calculating, as the number of flux linkages of the second pair of third and fourth windings to the d-axis, a second difference $\Psi_{WA} - \Psi_{WB}$ between the number $\Psi_{WA}$ of flux linkages to the third winding and the number $\Psi_{WB}$ of flux linkages to the fourth winding;

integrating the calculated first and second differences to obtain a total number of flux linkages; and multiplying the total number of flux linkages by ($1/\sqrt{2}$) so as to obtain the number $\Psi_d(i_{d1} i_{q1})$ of d-axis flux linkages at the d-axis and q-axis current components ($i_{d1}$ and $i_{q1}$) of the drive current;

calculating, as the number of flux linkages of the first pair of first and second windings to the q-axis, a third difference $\Psi_B - \Psi_A$ between the number $\Psi_A$ of flux linkages to the first winding and the number $\Psi_B$ of flux linkages to the second winding;

calculating, as the number of flux linkages of the second pair of third and fourth windings to the q-axis, a fourth difference $\Psi_{WB} - \Psi_{WA}$ between the number $\Psi_{WA}$ of flux linkages to the third winding and the number $\Psi_{WB}$ of flux linkages to the fourth winding;

integrating the calculated third and fourth differences to obtain a total number of flux linkages; and multiplying the total number of flux linkages by ($1/\sqrt{2}$) so as to obtain the number $\Psi_q(i_{d1} i_{q1})$ of q-axis flux linkages at the d-axis and q-axis current components ($i_{d1}$ and $i_{q1}$) of the drive current, wherein the obtained number $\Psi_d(i_{d1} i_{q1})$ and number $\Psi_q(i_{d1} i_{q1})$ of d-axis and q-axis flux linkages at the d-axis and q-axis current components ($i_{d1}$ and $i_{q1}$) of the drive current are stored as the magnetic-state information.

13. A control method according to claim 9, wherein the motor is composed of a stator having a plurality of U-phase poles arranged on a same circle, a plurality of V-phase poles arranged on a same circle, and a plurality of W-phase poles arranged in a same circle, and of a rotor rotatable in relation to the stator, the d-q axis coordinate system is defined in the rotor so that the d-q-axis coordinate system is rotated with rotation of the rotor, and the winding member is composed of three-phase coils each forms a loop, further comprising:

obtaining, when the drive current composed of the d-axis and q-axis current components ($i_{d1}$ and $i_{q1}$) is supplied to flow through each of the three-phase coils, a flux distribution inside the motor while the q-axis of the rotor is fixed to be directed to the U-phase pole of the stator;

selecting a first pair of first and second windings wound around the V-phase poles to form a closed loop;

calculating, as the number of flux linkages of the first pair of first and second windings to the d-axis, a first difference $\Psi_A-\Psi_B$ between the number $\Psi_A$ of flux linkages to the first winding and the number $\Psi_B$ of flux linkages to the second winding;

selecting a second pair of third and fourth windings wound around the W-phase poles to form a closed loop;

calculating, as the number of flux linkages of the second pair of third and fourth windings to the d-axis, a second difference $\Psi_{WA}-\Psi_{WB}$ between the number $\Psi_{WA}$ of flux linkages to the third winding and the number $\Psi_{WB}$ of flux linkages to the four winding;

integrating the calculated first and second differences to obtain a total number of flux linkages; and multiplying the total number of flux linkages by $(1/\sqrt{2})$ so as to obtain the number $\Psi_d(i_{d1}\ i_{q1})$ of d-axis flux linkages at the d-axis and q-axis current components ($i_{d1}$ and $i_{q1}$) of the drive current;

calculating, as the number of flux linkages of the first pair of first and second windings to the q-axis, a third difference $\Psi_B-\Psi_A$ between the number $\Psi_A$ of flux linkages to the first winding and the number $\Psi_B$ of flux linkages to the second winding;

calculating, as the number of flux linkages of the second pair of third and fourth windings to the q-axis, a fourth difference $\Psi_{WB}-\Psi_{WA}$ between the number $\Psi_{WA}$ of flux linkages to the third winding and the number $\Psi_{WB}$ of flux linkages to the fourth winding;

integrating the calculated third and fourth differences to obtain a total number of flux linkages; and multiplying the total number of flux linkages by $(1/\sqrt{2})$ so as to obtain the number $\Psi_q(i_{d1}\ i_{q1})$ of q-axis flux linkages at the d-axis and q-axis current components ($i_{d1}$ and $i_{q1}$) of the drive current, wherein the obtained number $\Psi_d(i_{d1}\ i_{q1})$ and number $\Psi_q(i_{d1}\ i_{q1})$ of d-axis and q-axis flux linkages at the d-axis and q-axis current components ($i_{d1}$ and $i_{q1}$) of the drive current are stored as the magnetic-state information.

14. A control method according to claim 11, further comprising:

obtaining a ratio of the number $\Psi_d(i_{d1}\ i_{q1})$ of d-axis flux linkages to the d-axis current component $i_{d1}$ as a d-axis proportional coefficient LLd ($i_{d1}\ i_{q1}$) of the number $\Psi_d(i_{d1}\ i_{q1})$ of d-axis flux linkages at the d-axis and q-axis current components ($i_{d1}$ and $i_{q1}$) of the drive current; and obtaining a ratio of the number $\Psi_q(i_{d1}\ i_{q1})$ of q-axis flux linkages to the q-axis current component $i_{q1}$ as a q-axis proportional coefficient LLq ($i_{d1}\ i_{q1}$) of the number $\Psi_q(i_{d1}\ i_{q1})$ of q-axis flux linkages at the d-axis and q-axis current components ($i_{d1}$ and $i_{q1}$) of the drive current.

15. A control method according to claim 12, further comprising:

obtaining a ratio of the number $\Psi_d(i_{d1}\ i_{q1})$ of d-axis flux linkages to the d-axis current component $i_{d1}$ as a d-axis proportional coefficient LLd ($i_{d1}\ i_{q1}$) of the number $\Psi_d(i_{d1}\ i_{q1})$ of d-axis flux linkages at the d-axis and q-axis current components ($i_{d1}$ and $i_{q1}$) of the drive current; and obtaining a ratio of the number $\Psi_q(i_{d1}\ i_{q1})$ of q-axis flux linkages to the q-axis current component $i_{q1}$ as a q-axis proportional coefficient LLq ($i_{d1}\ i_{q1}$) of the number $\Psi_q(i_{d1}\ i_{q1})$ of q-axis flux linkages at the d-axis and q-axis current components ($i_{d1}$ and $i_{q1}$) of the drive current.

16. A control method according to claim 13, further comprising:

obtaining a ratio of the number $\Psi_d(i_{d1}\ i_{q1})$ of d-axis flux linkages to the d-axis current component $i_{d1}$ as a d-axis proportional coefficient LLd ($i_{d1}\ i_{q1}$) of the number $\Psi_d(i_{d1}\ i_{q1})$ of d-axis flux ages at the d-axis and q-axis current components ($i_{d1}$ and $i_{q1}$) of the drive current; and obtaining a ratio of the number $\Psi_q(i_{d1}\ i_{q1})$ of q-axis flux linkages to the q-axis current component $i_{q1}$ as a q-axis proportional coefficient LLq ($i_{d1}\ i_{q1}$) of the number $\Psi_q(i_{d1}\ i_{q1})$ of q-axis flux linkages at the d-axis and q-axis current components ($i_{d1}$ and $i_{q1}$) of the drive current.

17. A control method according to claim 2, her comprising:

generating first torque-related information indicative of a relationship between an output torque of the motor and the drive current based on the first information; and storing the first torque-related information.

18. A control method according to claim 2, further comprising:

generating second torque-related information indicative of a relationship between an output torque of the motor, the number of revolutions of the motor, and the drive current based on the first information; and storing the second torque-related information.

19. A control method according to claim 2, wherein the controlling is configured to:

calculate, based on the stored magnetic-state information, at least one of an output torque of the motor, a drive voltage to be supplied to the winding member, and a ratio of change in the number of the flux linkages with respect to change in the drive current; and control the output of the motor based on at least one of the calculated output torque of the motor, the drive voltage, and the ratio of change in the number of the flux linkages with respect to change in the drive currents.

20. A control method according to claim 1, further comprising:

storing command-current related information indicative of a relationship between a plurality of command current values and a characteristic of the output of the motor; and referencing, in response to instruction indicative of an operating point on the characteristic of the output of the motor, the stored command-current related information to determine one of the plurality of command current values based on a result of the reference, wherein the controlling is configured to control the output of the motor based on the determined one of the plurality of command current values.

21. A control method according to 1, further comprising:

determining a voltage command value to be supplied to the winding member based on the stored magnetic-state information, wherein the controlling is configured to control the output of the motor based on the determined command voltage value.

22. A control method according to claim 9, wherein, assuming that a loop gain of a d-axis current control loop is referred to as "Gd", a loop gain of a q-axis current control loop is referred to as "Gq", a ratio of change in the number $\Psi_d$ of d-axis flux linkages with a narrow range $\Delta i_d$ around each of the operating point ($i_d\ i_q$) is referred to as "$\Delta \Psi_d/\Delta i_d$", and a ratio of change in the number $\Psi_q$ of q-axis flux linkages with a narrow range $\Delta i_q$ around each of the operating point ($i_d\ i_q$) is referred to as "$\Delta \Psi_q/\Delta i_q$", the controlling is configured to:

respectively adjust the loop gains Gd and Gq to first and second values, the first and second values of the loop gains Gd and Gq being proportional to the change ratios $\Delta\Psi_d/\Delta i_d$ and $\Delta\Psi_q/\Delta i_q$, respectively;
control the output of the motor based on the adjusted first and second values of the loop gains Gd and Gq.

23. A control method according to claim 9, assuming that a loop gain of a d-axis current control loop is referred to as "Gd", a loop gain of a q-axis current control loop is referred to as "Gq", a d-axis feedforward voltage amount is referred to as "FFd", and q-axis feedforward voltage amount is referred to as "FFq", further comprising:
generating, based on the stored magnetic-state information, control-loop related information indicative of a relationship between each of the plurality of predetermined operating points of the drive current and at least one of a pair of the loop gains Gd and Gq and a pair of the d-axis and q-axis feedforward voltage amounts FFd and FFq,
wherein the controlling is configured to control the output of the motor based on the generated control-loop related information.

24. A control method according to claim 9, wherein the controlling is configured to control the output of the motor based on, in addition to one of the values of the number $\Psi_d$ of the d-axis flux linkages and one of the values of the number $\Psi_q$ of the q-axis flux linkages, at least one of:
the number of leakage flux linkages to the d-axis;
the number of leakage flux linkages to the q-axis;
a d-axis leakage inductance; and
a q-axis leakage inductance.

25. A control method according to claim 9, wherein the controlling is configured to control the output of the motor based on, in addition to one of the values of the number $\Psi_d$ of the d-axis flux linkages and one of the values of the number $\Psi_q$ of the q-axis flux linkages, an iron loss component associated with each of the plurality of operating point of the drive current and an angular velocity of the motor.

26. A control method according to claim 9, wherein the controlling is configured to:
reduce a difference between a d-axis command current value obtained based on one of the values of the number $\Psi_d$ of the d-axis flux linkages and a d-axis current component of the detected actual value of the drive current;
reduce a difference between a q-axis command current value obtained based on one of the values of the number $\Psi_q$ of the q-axis flux linkages and a q-axis current component of the detected actual value of the drive current; and
compensate a time-lag caused during each of the difference reductions.

27. A control method according to claim 1, wherein the controlling is configured to:
sensorlessly detect at least one of a rotational position of the motor and an angular velocity thereof based on the stored magnetic-state information.

28. A control method according to claim 2, wherein the controlling further comprises:
estimating a rotational position of the motor;
detecting an actual value of a drive voltage to be supplied to the winding member at the estimated rotational position of the motor, the detected actual value of the drive current corresponding to the estimated rotational position of the motor;
calculating at least one of an estimated drive voltage and an estimated drive current based on the stored magnetic-state information and the estimated rotational position of the motor;
calculating a difference between the at least one of the estimated drive voltage and the estimated drive current and a corresponding at least one of the detected actual value of the drive voltage and that of the drive current; and
adjusting the estimated rotational position of the motor such that the calculated difference becomes reduced.

29. A control method according to claim 2, wherein the controlling further comprises:
estimating a rotational position of the motor;
superimposing a predetermined frequency current component on the drive current;
detecting an actual value of a drive voltage to be supplied to the winding member at the estimated rotational position of the motor, the detected actual value of the drive current on which the predetermined frequency current component is superimposed corresponding to the estimated rotational position of the motor;
measuring a first inductance within a narrow range of the drive current based on the predetermined frequency current component of the drive current and a frequency voltage component of the drive voltage corresponding to the predetermined frequency current component;
calculating, based on the estimated rotational position and the stored magnetic-state information according to a command current value for the drive current, a second inductance within a narrow range around the command current value; and
calculating a difference between the first inductance and the second inductance; and
adjusting the estimated rotational position of the motor such that the calculated difference becomes reduced.

30. A control method according to claim 2, wherein the controlling further comprises:
estimating a rotational position of the motor;
representing a voltage equation of the motor, the voltage equation including a first voltage term related to the estimated rotational position and a second voltage term having little influence on the estimated rotational position;
calculating a voltage value corresponding to the second voltage term based on the stored magnetic-state information, an impedance of the motor, and the detected actual value of the drive current;
detecting a drive voltage to be supplied to the winding member of the motor;
subtracting the voltage value from the detected drive voltage; and
determining the estimated rotational position of the motor based on a result of the subtraction and the voltage equation of the motor.

31. A control method according to claim 2, wherein the controlling is configured to:
sensorlessly detect at least one of a rotational position of the motor and an angular velocity thereof based on the stored magnetic-state information;
control, on a rotating coordinate system, the output of the motor based on the obtained value of the magnetic-state parameter, the rotating coordinate system being rotated with rotation of the motor; and
control, on a stationary coordinate system defined in the motor, the output of the motor based on the obtained value of the magnetic-state parameter, the stationary coordinate system being kept stationary independently of rotation of the motor.

32. A control system for a motor that rotates based on flux linkages to a winding member of the motor when the winding member is energized by a drive current, the system comprising:

a storing unit that stores magnetic-state information indicative of a relationship between each of a plurality of predetermined operating points of the drive current and a magnetic-state parameter associated with the flux linkages;

an obtaining unit to obtain at least one of command information associated with an operating state of the motor and detection information associated with the operating state of the motor;

a reference unit to reference the magnetic-state information with the use of the obtained at least one of the command information and detection information to obtain a value of the magnetic-state parameter based on a result of the reference; and a controller to control an output of the motor based on the obtained value of the magnetic-state parameter.

33. A control system according to claim 32, wherein the magnetic-state parameter is a plurality of values of the number of the flux linkages to the winding member, and each of the predetermined operating points of the drive current corresponds to one of the values of the number of the flux linkages.

34. A control system according to claim 32, wherein the magnetic-state parameter is an inductance associated with the winding member, and the inductance is composed of a plurality of inductance values each corresponding to one of the plurality of predetermined operating points of the drive current, the inductance having a nonlinear characteristic with respect to change in the drive current.

35. A control system according to claim 33, wherein each of the operating points of the drive current is composed of a d-axis current component $i_d$ and a q-axis current component $i_q$ on a d-q axis coordinate system defined in the motor, the d-q-axis coordinate system being rotated with rotation of the motor, each of the values of the number of the flux linkages to the winding member is composed of one of values of the number $\Psi_d$ of d-axis flux linkages and one of values of the number $\Psi_q$ of q-axis flux linkages in the d-q-axis coordinate system, and the d-axis and q-axis current components ($i_d$ and $i_q$) of each of the operating points of the drive current correspond to one of the values of the number $\Psi_d$ of the d-axis flux linkages and one of the values the number $\Psi_q$ of the q-axis flux linkages, and wherein the controller is configured to control the output of the motor based on, as the obtained value of the magnetic-state parameter, one of the values of the number $\Psi_d$ of the d-axis flux linkages and one of the values of the number $\Psi_q$ of the q-axis flux linkages.

36. A control system according to claim 32, wherein the controller is configured to:

sensorlessly detect at least one of a rotational position of the motor and an angular velocity thereof based on the stored magnetic-state information.

* * * * *